United States Patent
Lyons et al.

(10) Patent No.: US 9,556,554 B2
(45) Date of Patent: Jan. 31, 2017

(54) FLEXIBLE FABRIC HAVING SUPERHYDROPHOBIC SURFACE

(71) Applicant: Research Foundation of the City University of New York, New York, NY (US)

(72) Inventors: Alan Michael Lyons, New Providence, NJ (US); QianFeng Xu, Staten Island, NY (US)

(73) Assignee: Research Foundation of the City University of New York, New York, NY (US)

( * ) Notice: Subject to any disclaimer, the term of this patent is extended or adjusted under 35 U.S.C. 154(b) by 354 days.

(21) Appl. No.: 14/221,059

(22) Filed: Mar. 20, 2014

(65) Prior Publication Data

US 2016/0160436 A1    Jun. 9, 2016

Related U.S. Application Data

(63) Continuation-in-part of application No. 14/058,707, filed on Oct. 21, 2013, which is a continuation-in-part
(Continued)

(51) Int. Cl.
*D06M 15/227*  (2006.01)
*B08B 17/06*  (2006.01)
(Continued)

(52) U.S. Cl.
CPC .......... *D06M 15/227* (2013.01); *B08B 17/065* (2013.01); *B29C 41/22* (2013.01);
(Continued)

(58) Field of Classification Search
CPC ....... B08B 17/065; B82Y 30/00; B82Y 40/00; Y10S 977/707; B32B 27/04; B32B 5/00; B32B 5/14; B32B 5/145; B32B 5/16; Y10T 428/24421; D06M 15/227; B29C 59/025; B29C 70/64
See application file for complete search history.

(56) References Cited

U.S. PATENT DOCUMENTS

| | | |
|---|---|---|
| 8,240,320 B2 | 8/2012 | Mertins et al. |
| 9,040,145 B2 | 5/2015 | Lyons et al. |

(Continued)

FOREIGN PATENT DOCUMENTS

KR    100749082 B1    8/2007

OTHER PUBLICATIONS

ISA/US; ISR/Written Opinion for PCT/US15/21785; Dec. 11, 202015; US.
(Continued)

*Primary Examiner* — Aaron Austin
*Assistant Examiner* — Jasper Saberi
(74) *Attorney, Agent, or Firm* — Peter J. Mikesell; Schmeiser, Olsen & Watts, LLP

(57) ABSTRACT

The disclosure relates to a superhydrophobic surface. Methods of fabrication are disclosed including laminating an optically transparent polymer sheet with hydrophobic nanoparticles such that the nanoparticles are partially embedded and partially exposed. The resulting assembly remains optically transparent. Additional methods include the lamination of nanoparticles to flexible fabrics and the production of molded articles using nanoparticle-treated molds.

19 Claims, 39 Drawing Sheets

Related U.S. Application Data of application No. 13/796,908, filed on Mar. 12, 2013, now Pat. No. 9,040,145, which is a continuation-in-part of application No. PCT/US2012/026942, filed on Feb. 28, 2012.

(60) Provisional application No. 61/803,648, filed on Mar. 20, 2013, provisional application No. 61/716,708, filed on Oct. 22, 2012, provisional application No. 61/609,634, filed on Mar. 12, 2012, provisional application No. 61/555,888, filed on Nov. 4, 2011, provisional application No. 61/447,515, filed on Feb. 28, 2011, provisional application No. 61/447,508, filed on Feb. 28, 2011.

(51) Int. Cl.

| | | |
|---|---|---|
| *B82Y 40/00* | (2011.01) | |
| *B82Y 30/00* | (2011.01) | |
| *B32B 27/04* | (2006.01) | |
| *B32B 5/00* | (2006.01) | |
| *B29C 41/22* | (2006.01) | |
| *B29C 59/02* | (2006.01) | |
| *B29L 31/00* | (2006.01) | |

(52) U.S. Cl.
CPC ............ *B32B 5/00* (2013.01); *B32B 27/04* (2013.01); *B82Y 30/00* (2013.01); *B82Y 40/00* (2013.01); *B29C 59/025* (2013.01); *B29L 2031/00* (2013.01); *Y10S 977/707* (2013.01)

(56) References Cited

U.S. PATENT DOCUMENTS

| | | |
|---|---|---|
| 2002/0066473 A1 | 6/2002 | Levy et al. |
| 2005/0229328 A1 | 10/2005 | Tran |
| 2006/0008618 A1 | 1/2006 | Wang et al. |
| 2007/0013106 A1 | 1/2007 | Lee et al. |
| 2007/0298216 A1 | 12/2007 | Jing et al. |
| 2009/0246473 A1 | 10/2009 | Lee et al. |
| 2009/0269560 A1 | 10/2009 | Dhinojwala et al. |
| 2010/0028615 A1 | 2/2010 | Hwang et al. |
| 2010/0103763 A1 | 4/2010 | Ponzielli |
| 2011/0217544 A1* | 9/2011 | Young ............... B29C 37/0032 428/327 |
| 2014/0011013 A1 | 1/2014 | Jin et al. |
| 2014/0106127 A1 | 4/2014 | Lyons et al. |
| 2014/0264167 A1 | 9/2014 | Solovyov et al. |

OTHER PUBLICATIONS

Lim, Ho Sun et al., "UV-Drive nReversible Switching of a Roselike Vanadium Oxide Film between Superhydrophobicity and Superhydrophobity and Superhydrophilicity", J. Am. Chem. Soc. 2007, 129, 4128-4129, two pages.

Zhang, Xintong et al., "Preparation and Photocatalytic Wettability Conversion of TiO2-Based Superhydrophobic Surfaces", 2006 American Chemical Society, 10.1021/1a0618869, Langmuir 2006, 22, 9477-9479, three pages.

Blossey, Ralph, "Self-cleaning surfaces—virtual realities", Nature Materials. vol. 2, May 2003, pp. 301-306, 6 pages.

KIPO (ISA/KR), International Search Report (ISR) from corresponding PCT/priority application No. PCT/US2012/026942 as completed Sep. 27, 2012 (total 3 pages).

Xu, Fabricating Superhydrophobic Polymer Surfaces with Excellent Abrasion Resistance by a Simple Lamination Templating Method; ABS Appl. Mater. Interfaces, 2011, 3, 3508-3514; Jul. 28, 2011.

Karunakaran; Highly Transparent Superhydrophobic Surfaces from the Coassembly of Nanoparticles; Langmuir 2011; 27, 4594-4602; Feb. 28, 2011.

Xu, Organic-Inorganic Composite Nanocoatings with Superhydrophobicity, Good Transparency, and Thermal Stability; acsnano.org; v 4, No. 4, 2201-2209, 2010.

Xu, Superhydrophobic and transparent coatings based on removable polymeric spheres, J. of Materials Chemistry, 19, 655-660, 2009.

Xu, Transparent, Superhydrophobic Surfaces from One-Step Spin Coating of Hydrophobic Nanoparticles; ACS Appl. Mater. Interfaces, 4, 1118-1125, Jan. 31, 2012.

Ebert, Transparent, Superhydrophobic, and Wear-REsistant Coatings on Glass and Polymer Substrates Using SiO2, ZnO and ITO nanoparticles; Langmuir, 28, 11391-11399; Jul. 5, 2012.

Quere; Wetting and Roughness, Annu. Rev. Mater. Res. 2008:38:71-99; Jul. 9, 2008.

Caputo, Gianvito et al., "Reversibly Light-Swuitchable Wettability of Hybrid Organic/Inorganic Surfaces with Dual Micro-/Nanoscale Roughness", Adv. Funct. Mater. 2009, 19, DOI: 10.1002/adfm.200800909, pp. 1149-1157.

Jin, Ren-Hua et al., "Biomimetically Controlled Formation of Nanotextured Silica/Titania Films on Arbitrary Substrates and Their Tunable Surface Function", Adv. Mater. 2009, 21, DOI: 10.1002/adma.200803393, pp. 3750-3753.

Feng, Xinjian et al., "The Fabrication and Switchable Superhydrophobicity of TiO2 Nanorod Films", Angew. Chem. Int. Ed. 2005, 44, DOI: 10.1002/anie.200501337, pp. 5115-5118.

* cited by examiner

FIG. 38A
FIG. 38B
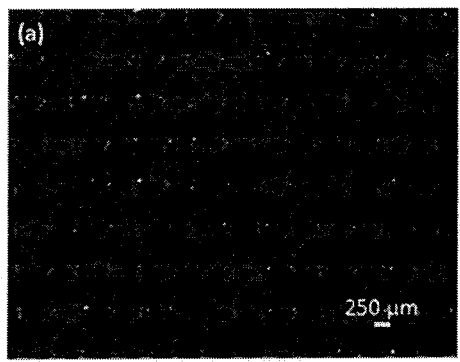
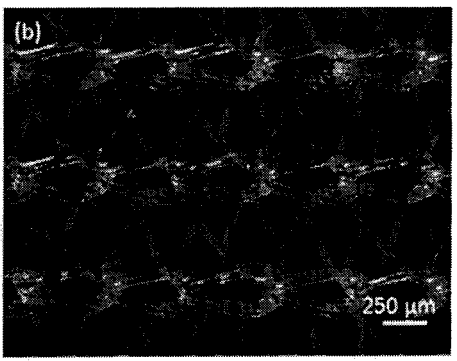
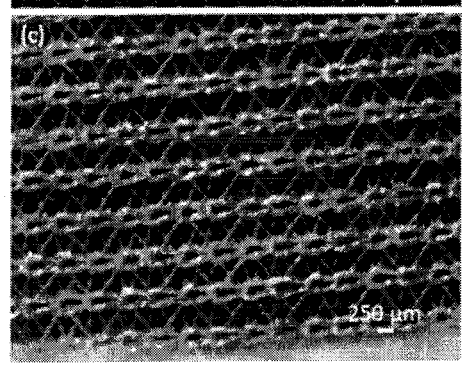
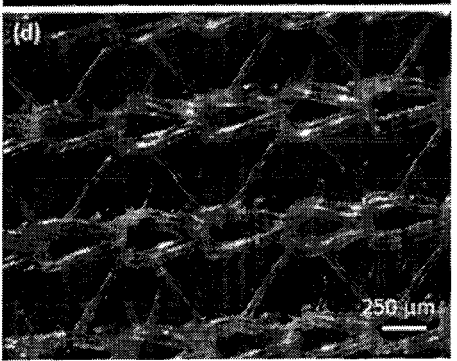
FIG. 38C
FIG. 38D

FIG. 39A 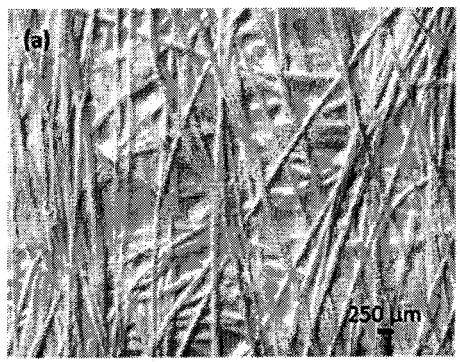 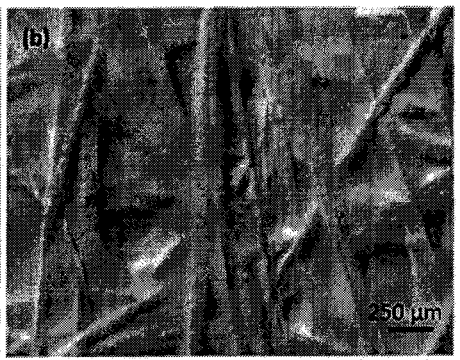 FIG. 39B
FIG. 39C 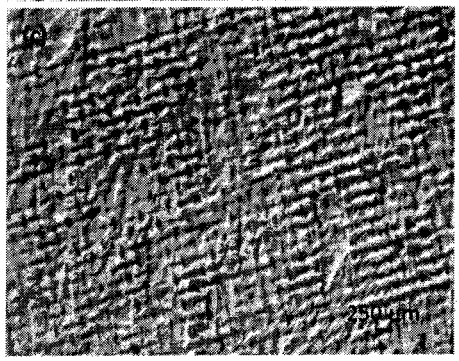 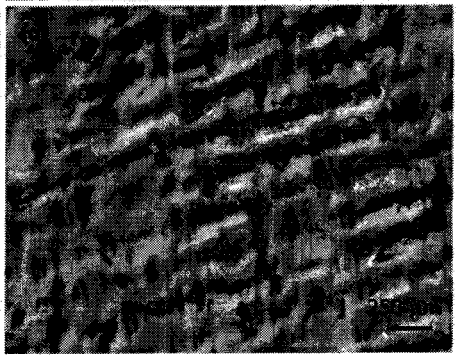 FIG. 39D

FIG. 40A   FIG. 40B
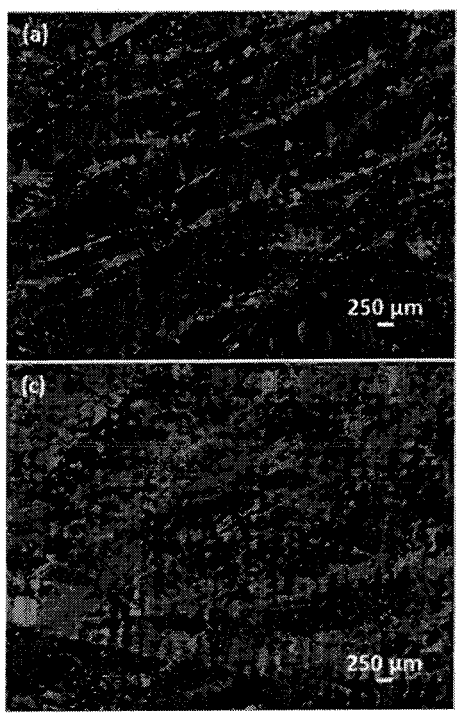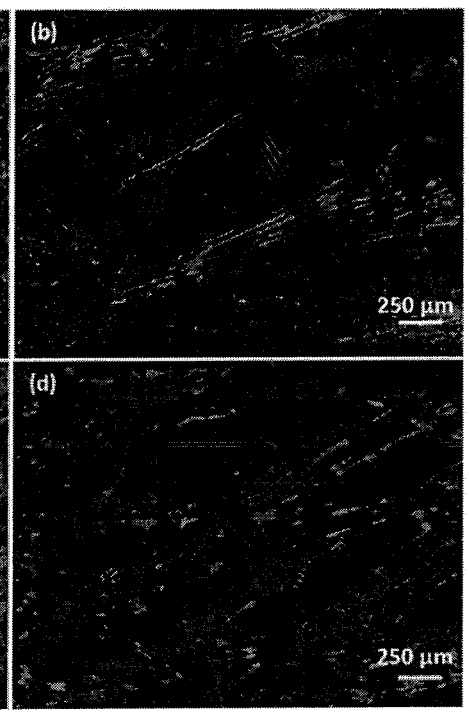
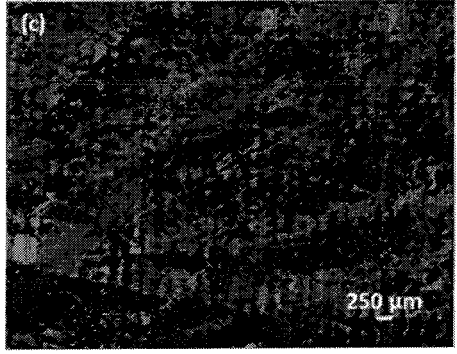
FIG. 40C   FIG. 40D FIG. 44A
FIG. 44B
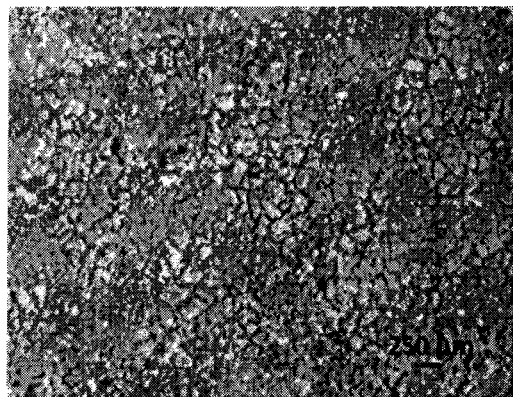 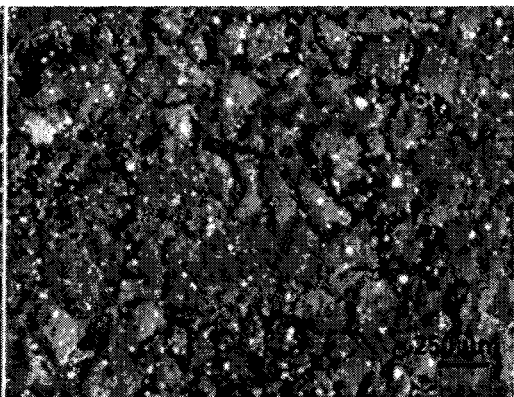
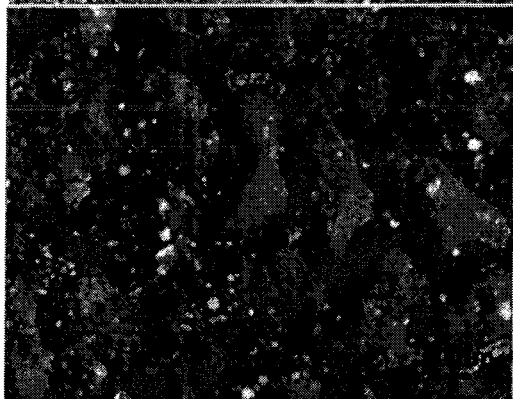 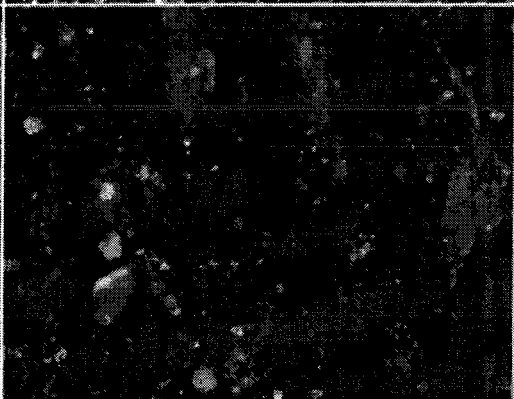
FIG. 44C
FIG. 44D

FLEXIBLE FABRIC HAVING SUPERHYDROPHOBIC SURFACE

CROSS-REFERENCE TO RELATED APPLICATIONS

This application claims priority to and the benefit of U.S. provisional patent application Ser. No. 61/803,648 (filed Mar. 20, 2013) and is a continuation-in-part of Ser. No. 14/058,707 (filed Oct. 21, 2013) which claims priority to 61/716,708 (filed Oct. 22, 2012) and is a continuation-in-part of U.S. patent application Ser. No. 13/796,908 (filed Mar. 12, 2013) which claims priority to 61/609,634 (filed Mar. 12, 2012), and is a continuation-in-part of international PCT patent application Serial No. PCT/US2012/026942 (filed Feb. 28, 2012) which claims priority to U.S. provisional patent applications 61/555,888 (filed Nov. 4, 2011); 61/447,515 (filed Feb. 28, 2011) and 61/447,508 (filed Feb. 28, 2011). The content of each of these applications is incorporated herein by reference in its entirety.

STATEMENT REGARDING FEDERALLY FUNDED RESEARCH OR DEVELOPMENT

This invention was made with government support under contract number 1215288 awarded by the National Science Foundation (NSF). The government has certain rights in the invention.

FIELD OF THE INVENTION

This disclosure relates to polymers that have a superhydrophobic surface as well as related methods and articles.

BACKGROUND

Superhydrophobic surfaces having a water contact angle greater than 150° and a water slip-off angle less than 10° can have many potential applications, such as from small non-wetting micro/nanoelectronics to large self-cleaning industrial equipment.

Numerous methods and materials have been developed to fabricate superhydrophobic surfaces. For practical applications, such surfaces should exhibit mechanical and chemical stability as well as abrasion resistance. For example, if a superhydrophobic surface is touched by a bare hand, the touched area of the surface could be contaminated by salt and oil and therefore could have an increased surface energy, which reduces the surface hydrophobicity. In addition, the force exerted by touching could damage the fragile rough structure of the surface, which could result in permanent loss of its superhydrophobicity. However, despite ongoing efforts, most reported artificial superhydrophobic surfaces suffer from poor mechanical and/or chemical stability.

In addition to mechanical and/or chemical stability, a commercially viable superhydrophobic surface should exhibit a reliable resistance to water pressure. In practice, a static pressure could be generated by immersing a hydrophobic surface under water and a dynamic pressure could be generated by applying water droplets or water streams onto a hydrophobic surface. Recent research shows that even a lotus leaf can be wetted within one hour after immersed under water at a depth of 0.55 m (i.e., under a water pressure of about 0.78 psi).

SUMMARY OF THE INVENTION

This disclosure includes the unexpected discovery that a polymer having a superhydrophobic surface (e.g., having a water contact angle of at least about 150°) can be prepared in a facile method by laminating the polymer sheet with a template (e.g., a mesh) or a layer of a nanomaterial (e.g., nanoparticles or nanofibers). The superhydrophobic surface thus formed has excellent mechanical properties, chemical resistance, abrasion resistance, and/or static and dynamic water pressure resistance. The method is a simple, low-cost process that is compatible with large scale manufacturing.

BRIEF DESCRIPTION OF THE DRAWINGS

The present invention is disclosed with reference to the accompanying drawings, wherein:

FIG. 1 is an illustration showing an exemplary method of using plate lamination for preparing a polymer sheet having a superhydrophobic surface by laminating the polymer sheet with a template while

FIG. 3A is an illustration showing another exemplary method of using roll lamination for preparing a polymer sheet having a superhydrophobic surface by laminating the polymer sheet with a layer of nanoparticles or nanofibers while

FIG. 5 is an illustration of an exemplary polymer sheet having a superhydrophobic surface while

FIG. 19 illustrates six panels (a-f) of SEM images of surfaces fabricated in Example 1 by using mesh 1 (M1) at different temperatures under the same pressure: (a,b) surface SI, 1 15° C. (c,d) surface S2, 120° C., and (e,f) surface S3, 125° C. Panels b, d, and f are higher magnification views of panels a, c, and e, respectively while

FIG. 23 depicts eight panels (a-h) of SEM images of Samples 1-3 in Example 2 after different treatments using UHMWPE as polymer substrate: (a, b) being the SEM images of an original UHMWPE substrate in Sample 1, (c, d) being the SEM images of the UHMWPE substrate in Sample 2 after heating to 154° C. and cooling to 25° C. (but without coating with a layer of nanoparticles), (e, f) being the SEM images of the UHMWPE substrate in Sample 3 (which was coated with a layer of nanoparticles) after heating to 154° C. and cooling to room temperature 25° C., and being before etched with a 49% HF acid for 8 hours, and (g, h) being SEM images of the UHMWPE substrate in Sample 3 after being etched with a 49% HF acid for 8 hours; Panels b, d, f, and h are higher-magnification views of panels a, c, e, and g, respectively while

FIG. 31 is a depiction of a water contact angle on an exemplary surface while

FIGS. 38A-D are microstructures of the untreated (38A, 38B) and treated (38C, 38D) nylon fabrics;

FIGS. 39A-D are microstructures of the untreated (39A, 39B) and treated (39C, 39D) housewrap materials (polymer coating side);

FIGS. 40A-D are microstructures of the untreated (40A, 40B) and treated (40C, 40D) housewrap materials (polymer coating side);

FIG. 42A is a top view of a mold while

FIG. 44A-D are microstructures of a molded product shown at different magnifications.

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
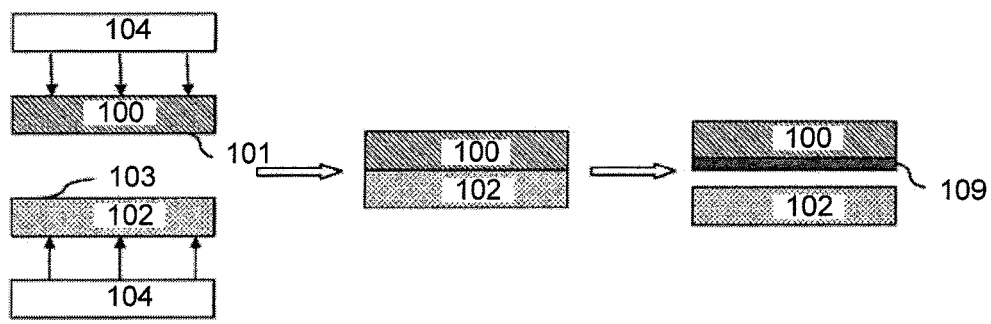

This disclosure generally relates to polymers having a superhydrophobic surface (e.g., having a water contact angle of at least about 150°), as well as methods of preparing such polymers. In particular, a coating is provided that is both superhydrophobic and transparent. Such a coating has important applications in the fields of solar cells; automobile windows; building glass and optical lenses.

Generally transparency and superhydrophocity are two competitive properties. Superhydrophobicity prefers high roughness. However, the high roughness can cause significant light scattering that reduces transparency. Most superhydrophobic surfaces are opaque or translucent. Both properties can be simultaneously achieved by reducing surface roughness to be much smaller than the light wavelength. When a high ratio of air to solid interface is maintained and the surface roughness is controlled to be less than 100 nm, superhydrophobicity and transparency in the visible region of the spectrum can be simultaneously achieved.

Prior art methods for producing similar transparent surfaces are expensive, require many steps and are limited to producing small areas. Additionally, the resulting nano-scale surfaces are extremely fragile and are often damaged by touching.

In general, the methods disclosed herein include laminating a polymer sheet having a surface to a template having a textured surface or a layer of a nanomaterial (e.g., nanoparticles or nanofibers) to convert the surface of the polymer sheet to a hydrophobic surface having a water contact angle of at least about 150°.

The polymer sheet described herein can include either a thermoplastic polymer or a thermoset polymer (or its precursors). In some embodiments, the polymer sheet described herein preferably includes a thermoplastic polymer. Exemplary of suitable polymers that can be used in the polymer sheet include polyolefins (e.g., polyethylenes or polypropylenes), polyacrylates (e.g., poly(methyl methacrylate)s), poly(vinyl chloride)s, polystyrenes, poly(tetrafluoroethylene)s, polysiloxanes, polycarbonates, or epoxy polymers. Examples of suitable polyethylenes include low density polyethylenes, high density polyethylenes, linear low density polyethylenes, and ultra-high molecular weight polyethylenes. In some embodiments, the polymer sheet described herein can be made of two or more (e.g., three, four, or five) different polymers, such as two or more different polymers described above. In some embodiments, a liquid polymer (e.g., a polysiloxane) can be combined with at least one inorganic material (e.g., inorganic particles, inorganic microparticles, inorganic nanoparticles, particle agglomerates, inorganic fibers (e.g., glass fibers), or inorganic nanofibers) to form a paste, which can be used in the methods described herein to form a polymer sheet having a superhydrophobic surface.

In some embodiments, the polymer used in the polymer sheet described herein does not include a hydrophilic group (e.g., OH, COOH, or $NH_2$). In such embodiments, the polymer used in the polymer sheet described herein is not a hydrophilic polymer or a water-soluble polymer.

In some embodiments, the polymer sheet described herein can be made from a polymer composite material. For example, the polymer sheet can further include at least one inorganic material (e.g., inorganic particles, inorganic microparticles, inorganic nanoparticles, particle agglomerates, inorganic fibers (e.g., glass fibers), or inorganic nanofibers). As used herein, the term "microparticles" generally refers to particles having an average diameter ranging from about 1 micrometers to about 1000 micrometers. As used herein, the term "nanoparticles" generally refers to particles having an average diameter ranging from about 1 nm to about 1000 nm. Examples of suitable inorganic material include $SiO_2$ particles (e.g., $SiO_2$ nanoparticles), $TiO_2$ particles (e.g., $TiO_2$ nanoparticles), $Al_2O_3$ particles (e.g., $Al_2O_3$ nanoparticles), and/or carbon particles (e.g., carbon nanoparticles) or fibers (e.g., carbon nanofibers).

In some embodiments, the polymer sheet described herein has a thickness of at least about 25 micrometers (e.g., at least about 50 micrometers, at least about 100 micrometers, at least about 150 micrometers, at least about 200 micrometers, at least about 250 micrometers, at least about 300 micrometers, at least about 350 micrometers, or at least about 400 micrometers) and/or at most about 1 cm (e.g., at most about 7.5 mm, at most about 5 mm, at most about 2.5 mm, at most about 1 mm, at most about 750 micrometers, at most about 700 micrometers, at most about 650 micrometers, or at most about 600 micrometers). For example, the polymer sheet can have a thickness ranging from about 200 micrometers to about 600 micrometers.

In some embodiments, the polymers comprise surfaces with multi-level hierarchical structures. These multi-level hierarchical structures include fine structure (e.g. nanoparticles with sizes from 1 to 100 nm), medium structures (e.g. agglomerates of multiple nanoparticles with sizes from 100-300 nm), and large structures (e.g. micro-roughness of multiple agglomerates with sizes of 300 nm to 3 microns). In one embodiment, the agglomerates range in size from 20 to 200 nm. As described in further detail elsewhere in this specification, a layer of nanoparticles is disposed on a polymer. Predetermined lamination conditions are then applied to selectively percolate the polymer through gaps/pores between nanoparticles in the nanoparticle layer. The polymer filaments that extend through these pores partially embeds the nanoparticles in the polymer while leaving at least some of the nanoparticles partially exposed. By carefully controlling the lamination conditions (e.g. temperature, pressure, time, etc) partially embedded nanoparticles can be formed and the length and diameter of the polymer filaments can be controlled. In one embodiment, the polymer filaments range in length from about 1 microns to about 100 microns and in diameter from 50 nm to 500 nm.

FIG. 1 is an illustration showing an exemplary method of using plate lamination for preparing a polymer sheet having a superhydrophobic surface by laminating the polymer sheet with a template. As shown in FIG. 1, a polymer sheet having a superhydrophobic surface can be prepared by first disposing a polymer sheet 100 having a surface 101 and a template 102 having a textured surface 103 between two plates 104 such that surface 101 faces textured surface 103. For example, one can first mount polymer sheet 100 on template 102 as shown in FIG. 1, and then place the article thus formed between two plates 104 so that polymer sheet 100 is in contact with one of plates 104 and template 102 is in contact with the other of plates 104.

In general, template 102 having a textured surface 103 can be a mesh, a fabric (e.g., a porous fabric), or a porous membrane, or a sandpaper. Template 102 can generally be made from any suitable material, such as a polymer (e.g., a nylon), a fabric, or a metal (e.g., stainless steel). For example, template 102 can be a metal woven mesh. In general, plates 104 can also be made from any suitable material, such as a metal (e.g., stainless steel).

In some embodiments, template 102 can be porous to allow the polymer in polymer sheet 100 to penetrate the pores to form a continuous polymer layer at the back side of template 102 and to minimize air trapped in between polymer sheet 100 and template 102. In some embodiments, template 102 (e.g., a mesh) can have an average pore size (e.g., pore diameter, pore length, or pore width) of at least about 2 micrometers (e.g., at least about 5 micrometers, at least about 10 micrometers, at least 25 micrometers, at least about 50 micrometers, or at least about 100 micrometers) to at most about 800 micrometers (e.g., at most about 600 micrometers, at most about 400 micrometers, at most about 200 micrometers, or at most about 100 micrometers). For example, template 102 can be a nylon mesh having a pore diameter of about 40 micrometers and a wire width of about 40 micrometers.

In some embodiments, when template 102 is a mesh, template 102 can have an average depth of pores of at least about 2 micrometers (e.g., at least about 5 micrometers, at least about 10 micrometers, at least 25 micrometers, at least about 50 micrometers, or at least about 100 micrometers) to at most about 800 micrometers (e.g., at most about 600 micrometers, at most about 400 micrometers, at most about 200 micrometers, or at most about 100 micrometers).

In the above embodiments, template 102 can be fully porous such that the polymer in polymer sheet 100 can infiltrate template 102 without trapping air. Without wishing to be bound by theory, it is believed that if air is trapped in template 102 (e.g., in a template made by etching holes into a silicon or metal substrate), the gas pressure would prevent the polymer from fully infiltrating into the template pattern and replicating its structure. This would create a region without the appropriate roughness and thus not fully superhydrophobic. In some embodiments, a template that has rough features but is not fully porous could be used. For example, during roll lamination, a fully porous template may not be necessary since the contact region under pressure between the polymer and template can be narrow (about 3 mm wide), which would reduce the incidence of gas being trapped. In other embodiments, the lamination process can be conducted under vacuum and there is no gas present during lamination. In such embodiments, templates with blind holes could be used without the risk of trapped gas causing surface defects.

After polymer sheet 100 and template 102 are placed between plates 104, polymer sheet 100 and template 102 can be laminated together by applying a certain pressure to plates 104 at an elevated temperature for a certain period of time.

In general, the pressure, temperature, and time required during the lamination process are sufficient to reduce the viscosity of the polymer in polymer sheet 100 such that the polymer can penetrate the pores of template 102. In some embodiments, template 102 is completely embedded in polymer sheet 100 during the lamination step such that the polymer in polymer sheet 100 forms a continuous polymer layer on the back side of template 102. In some embodiments, when the polymer in polymer sheet 100 is semicrystalline or crystalline, the lamination temperature is higher than (e.g., at least about 1° C. higher than, at least about 3° C. higher than, at least about 5° C. higher than, at least about 10° C. higher than, or at least about 50° C. higher than) the melting temperature of the polymer. For example, when polymer sheet 100 is made from a LDPE having a melting point of 110° C., the lamination temperature can be about 113° C. In some embodiments, when the polymer in polymer sheet 100 is noncrystalline or amorphous, the lamination temperature is higher than (e.g., at least about 1° C. higher than, at least about 3° C. higher than, at least about 5° C. higher than, at least about 10° C. higher than, or at least about 50° C. higher than) the glass transition temperature of the polymer. In some embodiments, when the polymer in polymer sheet 100 is a thermoset polymer or its precursor, the lamination temperature is higher than (e.g., at least about 1° C. higher than, at least about 3° C. higher than, at least about 5° C. higher than, at least about 10° C. higher than, or at least about 50° C. higher than) softening temperature of the polymer. In some embodiments, the lamination temperature can be at least about 100° C. (e.g., at least about 120° C., at least about 140° C., or at least about 160° C.) and/or at most about 250° C. (e.g., at most about 220° C., at most about 200° C., or at most about 180° C.). Without wishing to be bound by theory, it is believed that, if the lamination temperature is too low (e.g., lower than the melting temperature of the polymer), the polymer in polymer sheet 100 may not flow through the pores of template 102 to form a continuous layer on the back side of template and therefore the polymer may not be stretched and torn when template 102 is peeled off polymer sheet 100. As a result, the aspect ratio of the embossed features may not be sufficient to create roughness adequate to allow surface 101 to exhibit superhydrophobicity.

In some embodiments, the lamination pressure can be at least about 0.5 psi (e.g., at least about 1 psi, at least about 5 psi, at least about 10 psi, at least about 20 psi, at least about 30 psi, at least about 50 psi, at least about 100 psi, or at least about 200 psi) and/or at most about 10000 psi (e.g., at most about 8000 psi, at most about 7000 psi, at most about 6000 psi, at most about 5000 psi, at most about 2500 psi, or at most about 1000 psi).

In some embodiments, the lamination time is at least about 0.1 second (e.g., at least about 0.5 second, at least about 1 second, at least about 30 seconds, or at least about 1 minute) and/or at most about 2 hours (e.g., at most about 1.5 hours, at most about 1 hour, at most about 45 minutes, at most about 30 minutes, at most about 15 minutes, at most about 10 minutes, or at most about 5 minutes).

After the lamination process, the laminated material (i.e., polymer sheet 100 laminated with template 102) can generally be cooled down to a suitable temperature (e.g., room temperature such as 25° C.) in air. In some embodiments, when the polymer in polymer sheet 100 is semicrystalline or crystalline, the laminated material can be cooled below the melting temperature of the polymer before separating polymer sheet 100 and template 102. In some embodiments, polymer sheet 100 and template 102 can be separated at a temperature above the glass transition temperature or softening temperature of the polymer in polymer sheet 100 as it can be difficult to separate them below its glass transition or softening temperature when polymer sheet 100 hardens. Without wishing to be bound by theory, it is believed that plates 104 can be easily removed as no chemical bonds are formed between polymer sheet 100 and plate 104 or between template 102 and plate 104.

In general, after template 102 is separated from polymer sheet 100 (e.g., by peeling template 102 from polymer sheet 100), surface 101 on polymer sheet 100 is converted into a superhydrophobic surface 109 (e.g., having a water contact angle of at least about 150°). Without wishing to be bound by theory, it is believed that, because the polymer in polymer sheet 100 penetrates the pores in template 102 during the lamination process, template 102 is at least partially embedded by the polymer at surface 101 of polymer sheet 100. As a result, peeling off template 102 from polymer sheet 100 gives surface 101 a sufficient roughness, thereby converting surface 101 into a superhydrophobic surface 109. Further, without wishing to be bound by theory, it is believed that the roughness on surface 109 can be caused by the pores in template 102 (i.e., as the polymer in polymer sheet 100 penetrates the pores during lamination) and/or the roughness of the material (e.g., the wires, filaments, or fabrics) that forms template 102.

In some embodiments, template 102 can be coated with a layer of inorganic nanoparticles before template 102 is laminated with polymer sheet 100. Template 102 thus formed can then be used to form a superhydrophobic surface on polymer sheet 100 by using the same method shown in FIG. 1.

Examples of suitable inorganic nanoparticles that can be coated onto template 102 include $SiO_2$ nanoparticles, $TiO_2$ nanoparticles, $Al_2O_3$ nanoparticles, and carbon nanoparticles. In some embodiments, the inorganic nanoparticles can have an average diameter of at least about 3 nm (e.g., at least about 5 nm, at least about 10 nm, at least about 30 nm, at least about 50 nm, at least about 100 nm, or at least about 150 nm) and/or at most about 1000 nm (e.g., at most about 800 nm, at most about 600 nm, at most about 400 nm, or at most about 300 nm).

In some embodiments, the inorganic nanoparticles can be surface treated (e.g., by reacting the nanoparticles with a suitable agent such as silane) to reduce their hydrophilicity. An example of such inorganic nanoparticles is silane-treated $SiO_2$ nanoparticles.

In some embodiments, the inorganic nanoparticles can be coated onto template 102 by a method known in the art. For example, the coating can be carried out by dispersing the inorganic nanoparticles in an aqueous solvent (e.g., water or a mixture of water and an alcohol such as methanol) to form a dispersion, applying the dispersion onto template 102, and drying the dispersion. As another example, the inorganic nanoparticles can be disposed directly on template 102 in a solid form (e.g., as a powder).

Without wishing to be bound by theory, it is believed that the inorganic nanoparticles on template 102 can generate nanostructures on surface 101 of polymer sheet 100, thereby adding additional roughness on surface 101 and facilitating formation of a superhydrophobic surface. In addition, without wishing to be bound by theory, it is believed that surface 101 treated with template 102 coated with a layer of inorganic nanoparticles can have improved superhydrophobic properties (e.g., an increased water contact angle or an decreased water slip-off angle), improved abrasion resistance, and improved water pressure resistance.

In some embodiments, the lamination pressure described above depends on whether template 102 or polymer sheet 100 is coated with a layer of nanoparticles. When template 102 or polymer sheet 100 is coated with a layer of nanoparticles, without wishing to be bound by theory, it is believed that, if the lamination pressure is too high (e.g., more than 10,000 psi), the extent of polymer infiltration into the porous nanoparticle layer could be significantly increased and can force the nanoparticles to be fully embedded into the polymer sheet, thereby reducing the roughness (e.g., the micro-texture at a scale of about 100 microns) generated by the nanoparticles on the surface of the polymer sheet, which reduces the hydrophobicity of the surface.

Further, in such embodiments, without wishing to be bound by theory, it is believed that, if the lamination pressure is too low (e.g., lower than 0.5 psi), the nanoparticles are not embedded into the polymer sheet, thereby reducing the roughness generated by the nanoparticles on the surface of the polymer sheet.

In general, a polymer sheet having a superhydrophobic surface (e.g., having a water contact angle of at least about 150°) can also be prepared by laminating the polymer sheet with a layer of a nanomaterial (e.g., nanoparticles or nanofibers). In such embodiments, the lamination process can be performed by plate lamination, autoclave lamination, or roll lamination.

Figure 2:
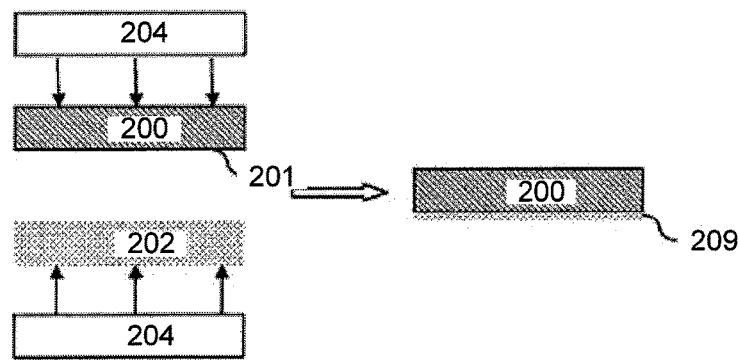
FIG. 2 is an illustration showing an exemplary method of using plate lamination for preparing a polymer sheet having a superhydrophobic surface by laminating the polymer sheet with a layer of a nanomaterial (e.g., nanoparticles or nanofibers)

FIG. 2 is an illustration showing an exemplary method of using plate lamination for preparing a polymer sheet having a superhydrophobic surface by laminating the polymer sheet with a layer of a nanomaterial. As shown in FIG. 2, a polymer sheet having a superhydrophobic surface can be prepared by first disposing a polymer sheet 200 having a surface 201 and a layer 202 containing a nanomaterial (e.g., nanoparticles or nanofibers) between two plates 204. For example, one can apply layer 202 onto one of plates 204, and then sequentially place polymer sheet 200 and the other of plates 204 on top of layer 202 so that polymer sheet 200 is in contact with layer 202 and one of plates 204.

In some embodiments, polymer sheet 200 and plates 204 can be the same as those described above in FIG. 1. In some embodiments, when layer 20 includes inorganic nanoparticles (e.g., $SiO_2$ nanoparticles or $TiO_2$ nanoparticles), the inorganic nanoparticles can be the same as those described in connection with the methods shown in FIG. 1 above.

Layer 202 can generally be disposed on one of plates 204 by a known method. For example, layer 202 can be disposed on one of plates 204 by dispersing a nanomaterial (e.g., nanoparticles or nanofibers) in an aqueous solvent (e.g., water or a mixture of water and an alcohol such as methanol) to form a dispersion, disposing the dispersion onto one of plates 204, and then drying the dispersion. As another example, layer 202 can be disposed on one of plates 204 by directly applying a nanomaterial in a solid form (e.g., as a powder) onto plate 204. In such embodiments, plate 204 can be covered with a substrate having a textured surface (e.g., a piece of paper or a rigid substrate having a textured surface) onto which the solid nanomaterial can be applied. In general, layer 202 thus formed is porous such that the polymer in polymer sheet 200 can penetrate the pores in layer 202 during the lamination process. Without wishing to be bound by theory, it is believed that using a substrate having a textured surface to cover plate 204 can facilitate retaining the nanomaterial on plate 204 and/or can impart a large scale of surface roughness to surface 201 on polymer sheet 200, which can improve the superhydrophobic properties after a superhydrophobic surface is formed. In some embodiments, layer 202 can be disposed (e.g., by a solution coating or coating in a solid form) on polymer sheet 200. The coated polymer sheet can then be disposed between two plates 204 before lamination.

In general, layer 202 can have any suitable thickness. In some embodiments, layer 202 can have a thickness of at least about 1 micrometers (e.g., at least about 5 micrometers, at least about 10 micrometers, at least about 20 micrometers, or at least about 40 micrometers) and/or at most about 5 nm (e.g., at most about 3 mm, at most about 1 mm, at most about 500 micrometers, at most about 100 micrometers, at most about 70 micrometers, at most about 60 micrometers, or at most about 50 micrometers).

After polymer sheet 200 and layer 202 are placed between plates 204, polymer sheet 200 and layer 202 can be laminated together by applying a certain pressure to plates 204 at an elevated temperature for a certain period of time. In general, the pressure, temperature, and time required during the lamination process are sufficient to allow the polymer in polymer sheet 200 to penetrate into the pores of the nanomaterial (e.g., nanoparticles) such that at least some of the nanomaterial is partially embedded in polymer sheet 200 and partially exposed to air on surface 201. In some embodiments, the lamination temperature is higher than (e.g., at least about 1° C. higher than, at least about 3° C. higher than, at least about 5° C. higher than, at least about 10° C. higher than) the melting temperature (or the glass transition or softening temperature) of the polymer in polymer sheet 200. For example, when polymer sheet 200 is made from a LDPE having a melting point of 119° C., the lamination temperature can be from about 120° C. to about 130° C. In some embodiments, the lamination temperature can be at least about 100° C. (e.g., at least about 120° C., at least about 140° C., or at least about 160° C.) and/or at most about 250° C. (e.g., at most about 220° C., at most about 200° C., or at most about 180° C.). In some embodiments, the lamination time and pressure can be the same as those described in connection with the methods shown in FIG. 1 above.

After the lamination process, the laminated material (i.e., polymer sheet 200 laminated with layer 202) can generally be cooled down to a suitable temperature in air. For example, the laminated material can be cooled down to a temperature below the melting temperature but above the glass transition temperature of the polymer in polymer sheet 200. Plates 24 can subsequently be removed to form polymer sheet having a superhydrophobic surface 209. Without wishing to be bound by theory, it is believed that plates 204 can be easily removed as no chemical bonds are formed between polymer sheet 200 and plate 204 or between layer 202 and plate 204. In addition, without wishing to be bound by theory, it is believed that, as layer 202 does not include a template and the nanomaterial in layer 202 is embedded in (i.e., partially or fully) polymer sheet 200, no addition step (e.g., peeling off a template as shown in FIG. 1) is needed to form a superhydrophobic surface on polymer sheet 200.

Figure 3A:
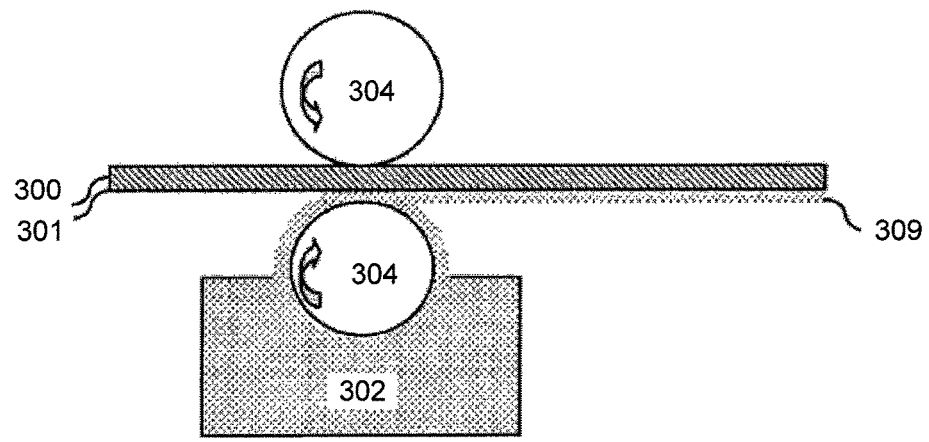

In some embodiments, a polymer sheet having a superhydrophobic surface can be prepared by using roll lamination to laminate the polymer sheet together with a layer of a nanomaterial. FIG. 3A is an illustration showing an exemplary method of such an embodiment. As shown in FIG. 3A, while polymer sheet 300 having surface 301 is being fed between upper and lower rollers 304, a nanomaterial 302 (e.g., nanoparticles or nanofibers) in a container (e.g., a box) can be absorbed onto the surface of a lower roller 304 and then laminated onto polymer sheet 300 at the nip section of rollers 304. After the roll lamination is completed, surface 301 is generally converted into superhydrophobic surface 309. In some embodiments, polymer sheet 300 and nanomaterial 302 can be the same as those described with respect to FIG. 2 above.

In some embodiments, roll lamination can be carried out by feeding a carrier film (e.g., kraft paper) coated with a nanomaterial (e.g., nanoparticles or nanofibers) into two rollers at the same time as a polymer sheet such that the nanomaterial on the carrier film faces the polymer sheet. As a result, the carrier film and polymer sheet are laminated together in the nip section. After exiting the nip, the carrier film and the polymer sheet can be separated to form a polymer sheet having a superhydrophobic surface, which can be then be rolled onto a roller separately from the carrier film and stored for future use. In some embodiments, the roll lamination described above can be carried out in a roll-to-roll method.

Figure 3B:
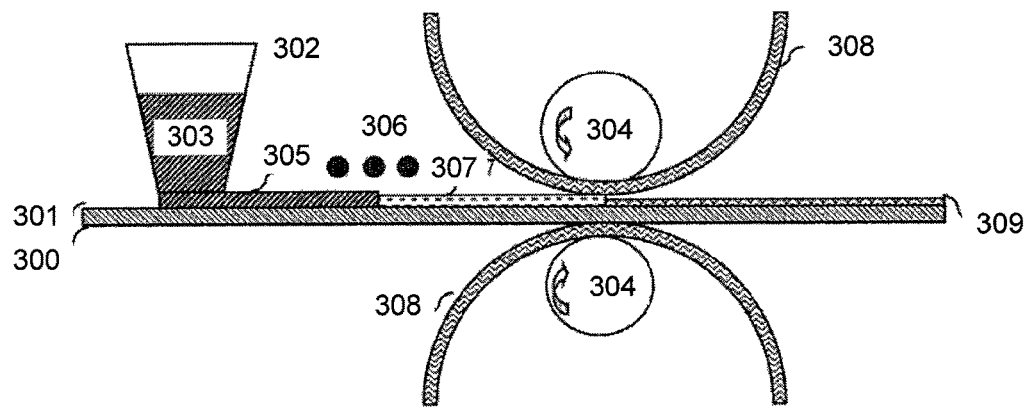
FIG. 3B is an illustration showing another exemplary method of roll lamination.

FIG. 3B is an illustration showing another exemplary roll lamination process. As shown in FIG. 3B, roll lamination can be carried out by coating a solution (e.g. with a solvent containing water or a mixture of water and an alcohol, or other suitable solvents) of nanoparticles 303 stored in coater 302 onto polymer sheet 300 to form a nanoparticle layer 305 on polymer surface 301. The solution is then passed through a drying stage 306 to remove the solvent, thereby forming layer 307 containing dried and porous nanoparticles. The coated polymer sheet 300 is then brought into a laminator having upper and lower rollers 304. Upon applying heat and pressure, the polymer in polymer sheet 300 flows into the pores between nanoparticles in layer 307 to create a superhydrophobic surface 309. In some embodiments, a release layer 308 can be placed between layer 307 and upper roller 304 to prevent the nanoparticles in layer 307 from adhering onto upper roller 304. Similarly, a second release layer 308 can be placed between polymer sheet 300 and lower roller 304 to prevent polymer 300 from adhering onto lower roller 304.

Figure 4:
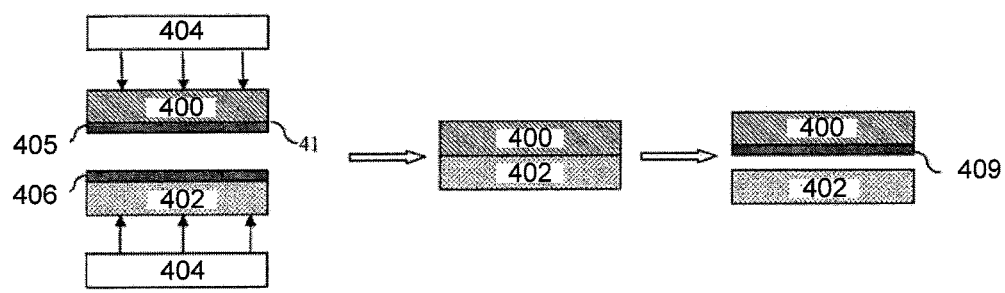
FIG. 4 is an illustration showing another exemplary method of using plate lamination for preparing a polymer sheet having a superhydrophobic surface by laminating the polymer sheet with a template coated a layer of a nanomaterial (e.g., nanoparticles or nanofibers)

In some embodiments, the nanomaterial used in the methods shown in FIG. 2 can be coated onto a template (e.g., a mesh or a fabric) before being laminated with a polymer sheet. FIG. 4 is an illustration showing an exemplary method of using plate lamination for preparing a polymer sheet having a superhydrophobic surface by laminating the polymer sheet with a template coated a layer of a nanomaterial. As shown in FIG. 4, a polymer sheet having a superhydrophobic surface can be prepared by first disposing a polymer sheet 400 having a surface 401 and a template 402 coated with a layer 406 containing a nanomaterial (e.g., nanoparticles or nano fibers) between two plates 404 such that surface 401 faces layer 406. Optionally, polymer sheet 400 can also be coated with a layer 405 containing a nanomaterial (e.g., nanoparticles or nanofibers). Polymer sheet 400 can then be laminated with layer 406 on template 402 to form a superhydrophobic surface 409 using the same approach as the methods described in connection with FIG. 1 (e.g., laminating the polymer sheet with the template, cooling the laminated material, and separating the template from the polymer sheet). In some embodiments, polymer sheet 400, template 402, and nanomaterials in layers 405 and 406 can the same as those described in connection with FIG. 1 above. In addition, in some embodiments, the lamination process (including lamination pressure, temperature, and time) can also be the same as those described in connection with FIG. 1 above.

In some embodiments, layer 405 can have a thickness of at least about 1 micrometers (e.g., at least about 5 micrometers, at least about 10 micrometers, at least about 20 micrometers, or at least about 40 micrometers) and/or at most about 800 micrometers (e.g., at most about 700 micrometers, at most about 600 micrometers, at most about 500 micrometers, at most about 300 micrometers, at most about 100 micrometers, or at most about 50 micrometers).

In some embodiments, during the lamination process, template 402 is embossed into surface 401 on polymer sheet 400 without allowing the polymer in polymer sheet 400 to penetrate the pores in template 402 and form a continuous polymer film on the back side of the template. Such an embossing process can be achieved by adjusting the lamination pressure and temperature, and can form a negative image of template 402 on surface 401, which can provide micro-sized patterns. Without wishing to be bound by theory, it is believed that such a process can create both large scale roughness (i.e., by embossing polymer sheeting 400 with template 402) and small scale roughness (i.e., by allowing the polymer in polymer sheet 400 to infiltrate into the pores in the nanoparticles on template 402 or on polymer sheet 400) on surface 401, which can improve abrasion resistance of the resulting superhydrophobic surface 409.

Without wishing to be bound by theory, it is believed that the polymer in polymer sheet 400 can flow into the pores between nanomaterials in layers 405 and 406 during the lamination process so that at least some of the nanomaterials are partially embedded and partially exposed in polymer sheet 400, thereby forming micro-sized roughness that facilitates formation of a superhydrophobic surface. In addition, micro-sized patterns on surface 401 formed by template 402 can also facilitate formation of a superhydrophobic surface. Without wishing to be bound by theory, it is believed that using a template coated with a layer of a nanomaterial can significantly improve the mechanical properties, abrasion resistance, and water pressure resistance of a superhydrophobic surface.

Without wishing to be bound by theory, it is believed that one advantage of the methods described herein is that these methods are completely free of organic solvents or toxic chemicals and therefore are environmentally friendly. Further, without wishing to be bound by theory, it is believed that another advantage of the methods described herein is that, since the template (e.g., a mesh) used in these methods is commercially available in a large format (e.g., more than 1 meter wide and/or more than hundreds of meters long), these methods can be used to manufacture superhydrophobic surfaces on a large scale. In addition, without wishing to be bound by theory, it is believed that another advantage of the methods described herein is that the template (e.g., a mesh) used in these methods can be reused and therefore can reduce production costs.

In some embodiments, the polymer sheet prepared by the methods described herein can have a hydrophobic surface that has a plurality of protrusions. In some embodiments, the protrusions can have an average length or width of at least about 2 micrometers (e.g., at least about 5 micrometers, at least about 10 micrometers, at least about 20 micrometers, or at least about 50 micrometers) and/or at most about 500 micrometers (e.g., at most about 400 micrometers, at most about 300 micrometers, at most about 200 micrometers, or at most about 100 micrometers). As used herein, the length or width of a protrusion refers to that measured substantially parallel to the surface of the polymer sheet. In some embodiments, the protrusions can have an average height of at least about 25 micrometers (e.g., at least about 50 micrometers, at least about 100 micrometers, at least about 200 micrometers, or at least about 500 micrometers) and/or at most about 1000 micrometers (e.g., at most about 900 micrometers, at most about 800 micrometers, at most about 700 micrometers, or at most about 600 micrometers). As used herein, the height of a protrusion refers to that measured substantially perpendicular to the surface of the polymer sheet. In some embodiments, the protrusions can have an average distance of at least about 5 micrometers (e.g., at least about 10 micrometers, at least about 20 micrometers, or at least about 50 micrometers) and/or at most about 500 micrometers (e.g., at most about 400 micrometers, at most about 300 micrometers, at most about 200 micrometers, or at most about 100 micrometers) between two neighboring protrusions. In some embodiments, the distance between protrusions is substantially the same across the surface. In some embodiments, the pattern of a template is replicated substantially uniformly across the surface.

In some embodiments, when a polymer sheet having a superhydrophobic surface is prepared by the methods shown in FIG. 1, the protrusions can be generated by penetration of the polymer in the polymer sheet into the pores of the template during the hot lamination process and then removal of the template. In some embodiments, when nanoparticles are used to prepare a superhydrophobic surface on a polymer sheet (e.g., as shown in FIG. 2), the protrusions can be formed from the nanoparticles partially embedded in the polymer sheet.

In some embodiments, when both a template and nanoparticles are used to prepare a superhydrophobic surface on a polymer sheet (e.g., as shown in FIG. 4), the protrusions can be formed from both the polymer in the polymer sheet and the nanoparticles partially embedded in the polymer sheet.

Figure 5:
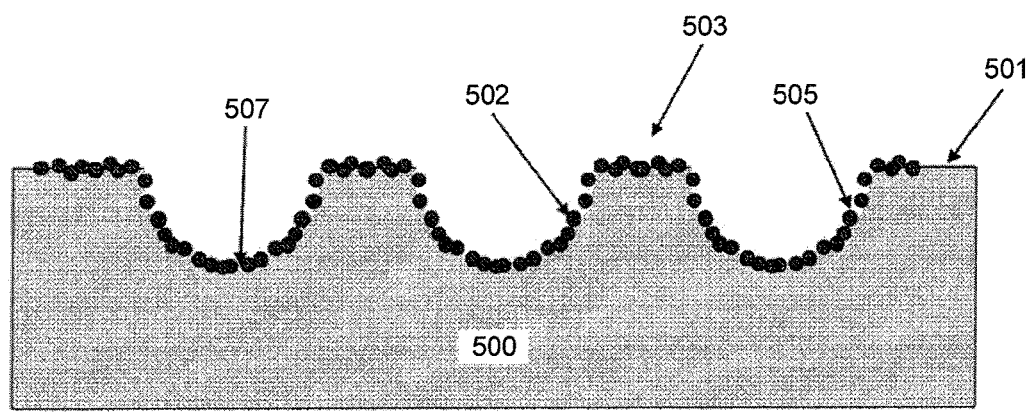

FIG. 5 illustrates an exemplary polymer sheet prepared by the methods shown in FIG. 4 when template 402 is coated with a layer of nanoparticles. As shown in FIG. 5, polymer sheet 500 has a superhydrophobic surface 501 and includes a layer of nanoparticles 502. At least some of the nanoparticles 502 are partially embedded in polymer sheet 500 and are partially exposed to air on surface 501. Surface 501 has a plurality of protrusions, each of which has a top surface 503 and a side wall 505. In addition, polymer sheet has a surface 507 between two neighboring protrusions. Nanoparticles 502 are disposed on top surface 503, side wall 505, and surface 507 between two neighboring protrusions. In some embodiments, surface 507 between two neighboring protrusions and top surface 503 of each protrusion have an average distance of at least about 2 micrometers (e.g., at least about 5 micrometers, at least about 10 micrometers, at least about 20 micrometers, at least about 30 micrometers, at least about 50 micrometers, at least about 75 micrometers, or at least about 100 micrometers) and/or at most about 800 micrometers (e.g., at most about 700 micrometers, at most about 600 micrometers, at most about 500 micrometers, at most about 450 micrometers, at most about 400 micrometers, at most about 350 micrometers, or at most about 300 micrometers). Without wishing to be bound by theory, it is believed that, if surface 501 is scratched, although nanoparticles 502 on top surface 503 may be removed by scratching, nanoparticles 502 on side wall 505 and surface 507 can remain on surface 501. Thus, nanoparticles 502 partially embedded on surfaces 505 and 507 can significantly improve the abrasion resistance and water pressure resistance of surface 501.

Figure 6:
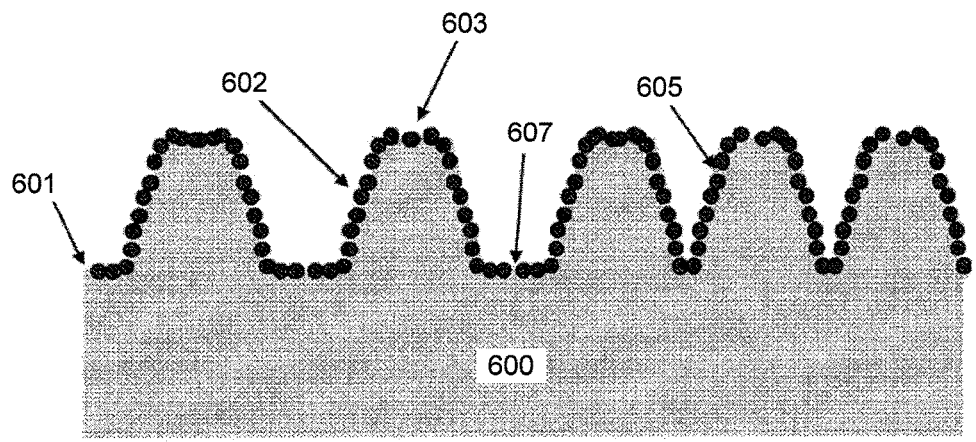
FIG. 6 is an illustration of another exemplary polymer sheet having a superhydrophobic surface.

FIG. 6 illustrates another exemplary polymer sheet prepared by the methods shown in FIG. 4 when template 402 is coated with a layer of nanoparticles. As shown in FIG. 6, polymer sheet 600 has a superhydrophobic surface 601 and includes a layer of nanoparticles 602. At least some of the nanoparticles 602 are partially embedded in polymer sheet 600 and are partially exposed to air on surface 601. Surface 601 has a plurality of protrusions, each of which has a top surface 603 and a side wall 605. In addition, polymer sheet has a surface 607 between two neighboring protrusions.

Nanoparticles 602 are disposed on top surface 603, side wall 605, and surface 607 between two neighboring protrusions.

In some embodiments, the polymer sheet prepared by the methods described herein can have superhydrophobicity. For example, the polymer sheet prepared by the methods disclosed herein can have a hydrophobic surface that has a water contact angle of at least about 150° (e.g., at least about 155°, at least about 160°, at least about 165°, at least about 170°, or at least about 175°) and/or at most about 179° (e.g., at most about 175°, at most about 170°, at most about 165°, or at most about 160°).

In some embodiments, the polymer sheet prepared by the methods described herein can have a hydrophobic surface that has a water slip-off angle of at most about 10° (e.g., at most about 5°, at most about 4°, at most about 3°, at most about 2°, or at most about 1°) and/or at least about 0.1° (e.g., at least about 0.5°, at least about 1°, at least about 1.5°, at least about 2°, or at least about 2.5°).

In some embodiments, the polymer sheet prepared by the methods disclosed herein can have superior abrasion resistance. For example, the polymer sheet prepared by the methods disclosed herein can have a hydrophobic surface that has a water contact angle of at least about 150° (e.g., at least about 155°, at least about 160°, at least about 165°, at least about 170°, or at least about 175°) after 1,000 abrasion cycles (e.g., after 5,000 abrasion cycles, after 10,000 abrasion cycles, after 50,000 abrasion cycles, or after 100,000 abrasion cycles) under a pressure of 32 KPa. As another example, the polymer sheet prepared by the methods disclosed herein can have a hydrophobic surface that has a water contact angle of at least about 150° (e.g., at least about 155°, at least about 160°, at least about 165°, at least about 170°, or at least about 175°) after the hydrophobic surface is scratched by a steel nail at least 10 times (e.g., after 20 times, after 30 times, after 40 times, or after 50 times). In some embodiments, the polymer sheet prepared by the methods disclosed herein can be touched or handled by hand without damaging its superhydrophobic surface.

In some embodiments, the polymer sheet prepared by the methods described herein has superior static water pressure resistance. For example, the polymer sheet prepared by the methods disclosed herein can have a hydrophobic surface that remains dry (e.g., having a layer of air between the superhydrophobic surface and water) under a water pressure of at least about 8 psi (e.g., at least about 10 psi, at least about 20 psi, at least about 40 psi, at least about 60 psi, or at least about 85 psi) for at least about 5 hours (e.g., at least about 10 hours, at least about 20 hours, at least about 30 hours, at least about 40 hours, or at least about 50 hours).

In some embodiments, the polymer sheet prepared by the methods described herein can have superior dynamic water pressure resistance. For example, the polymer sheet prepared by the methods disclosed herein can have a hydrophobic surface that remains dry upon impact of a water droplet at a speed of at least about 5 m/s (e.g., at least about 6 m/s, at least about 7 m/s, at least about 8 m/s, at least about 9 m/s, or at least about 10 m/s).

While a free-standing polymer sheet has been described as an example on which a superhydrophobic surface can be formed, the methods described herein can also be used to form a superhydrophobic surface on other substrates. For example, the methods described herein can be used to form a superhydrophobic surface on a free-standing polymer sheet or film first. The free-standing polymer film or sheet thus formed can then be adhered to the surface of another substrate (e.g., a metal, glass, polymer or ceramic substrate) by using an adhesive to form a composite material having a superhydrophobic surface. In one embodiment, the adhesive is an optically transparent adhesive. In some embodiments, the methods described above can be used to directly form a superhydrophobic surface on a polymer layer coated or adhered on a substrate (e.g., a metal, glass, polymer or ceramic substrate) to form a composite material having a superhydrophobic surface. In one embodiment, heat and pressure are applied to the polymer when it was in intimate contact with a glass substrate so that the polymer melts and adheres to the glass substrate without the use of an adhesive. In one such embodiment, the polymer is bonded to the glass substrate first and subsequently processed to make it superhydrophobic. In another such embodiment, the polymer surface is made to be superhydrophobic while it is simultaneously being bonded to the glass substrate (one step). For certain applications (e.g. certain solar cell panels) a glass substrate is used to ensure the hermeticity of the solar cell as polymer substrates may not be sufficient for all applications.

The superhydrophobic surface prepared by the methods described herein can be used in food-processing equipment due to its excellent non-wetting, self-cleaning properties. In addition, the superhydrophobic surface prepared by the methods described herein can be used in roofing, wind turbines, aircraft, and naval structures due to its excellent ice-repellent properties.

Isolated Photocatalytic Regions on a Superhydrophobic Surface

Also disclosed in this specification are polymer composite materials that provide isolated photocatalytic regions on a superhydrophobic surface. Although superhydrophobicity can be demonstrated with untreated metal oxide particles, these superhydrophobic properties may be lost upon exposure to ultraviolet (UV) light. In one embodiment, the stability of the superhydrophobic properties is increased by providing hydrophobic regions on the surface that are a mix of hydrophobic nanoparticles (e.g. silane treated $SiO_2$) with hydrophilic particles (e.g. $TiO_2$). Alternatively, hydrophobic particles can be bonded to select regions on the surface of a hydrophobic polymer. For example, a stable superhydrophobic surface can be formed where hydrophilic catalyst particles are isolated into specific regions, leaving a continuous web of hydrophobic material. In this way, the receding contact angle of the drop moving along the surface would be discontinuous, minimizing the energy required for droplet movement. Four methods for fabricating polymer-based hybrid superhydrophobic surfaces with isolated photocatalyst regions are shown schematically in FIGS. 8A-8F, FIGS. 8G-8H, FIGS. 9A-9C, FIGS. 10A-10E and 11A to 11C. Generally, inorganic photocatalytic nanoparticles (e.g. $TiO_2$, ZnO, $V_2O_5$ nanoparticles or nanofibers and their derivatives, or glass particles that contain photocatalytic compounds such as Si-Phthalocyanine) can be used as the photocatalyst to make isolated patterns on a hydrophobic surface. The size of the photocatalytic nanoparticles can range from 1-1000 nm. The hydrophobic area can be generated using hydrophobic nanoparticles, such as $SiO_2$ or directly using the polymer substrate, which is either intrinsically hydrophobic or modified to be hydrophobic. The size of the $SiO_2$ nanoparticles can range from 1-1000 nm. Any thermoplastic polymer, including PE, PMMA, PVC, PTFE, PS, can be used as a polymer substrate. In addition, B-staged thermosetting polymers, such as epoxy laminates or rubber, could also be used.

Figure 7:
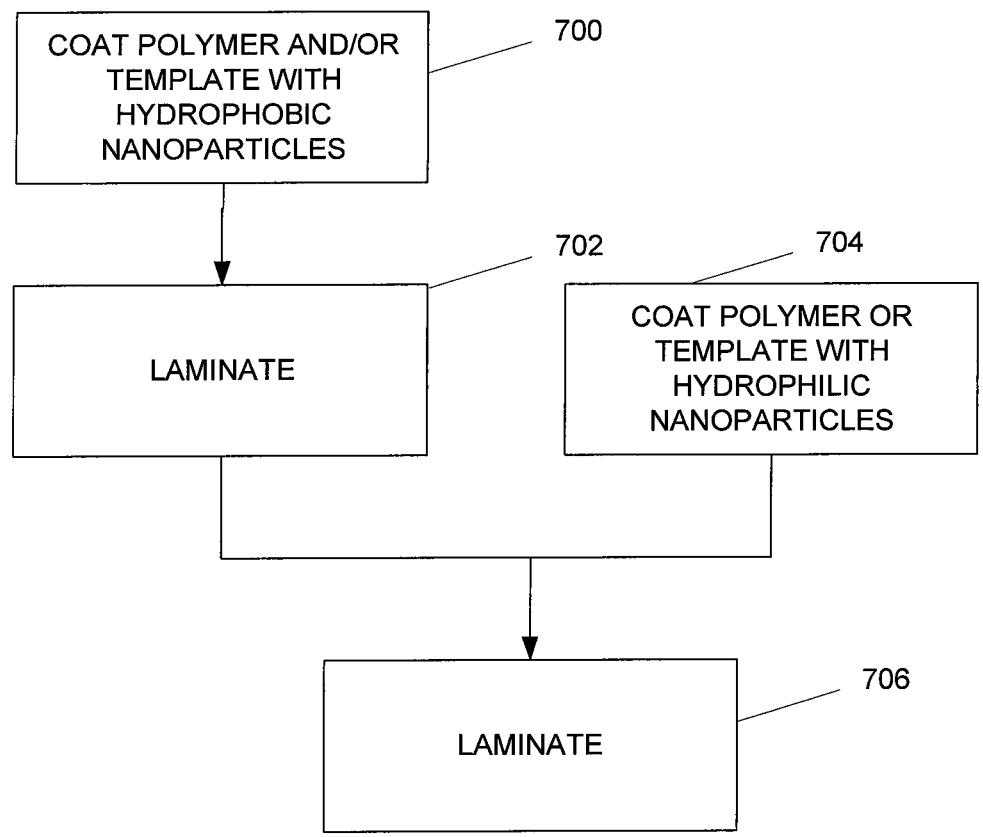
FIG. 7 is a flow diagram one exemplary method.

Referring to FIG. 7 in step 700 hydrophobic nanoparticles are spread uniformly on a laminator plate and/or a template. In step 702 the hydrophobic particles are laminated onto a polymer. Excess (non-embedded) hydrophobic nanoparticles may be removed after the lamination step. The average thickness of the layer of hydrophobic nanoparticles is at least 0.5 micrometers.

In step 704 hydrophilic nanoparticles are spread uniformly on a laminator plate. The average thickness of the layer of hydrophilic nanoparticles is at least 0.5 micrometers. The polymer sheet from step 702 is then placed on the hydrophilic particles and laminated in step 706. The temperature is above the glass transition temperature (Tg) of the polymer and, for crystalline polymer, above the melting temperature (Tm). Sufficient pressure is applied to insure that the hydrophilic particles are in intimate contact with the polymer surface, however excessive pressure is avoided as this high pressure may compact the nanoparticle layers excessively, preventing the polymer from infiltrating into the pores between particles. By controlling the lamination conditions such as the temperature, pressure, and time for each step, the surface microstructures as well as the contents of the polymer composite materials can be finely adjusted. The process can be used to make free-standing photocatalytic polymer composite films.

Figure 8A:
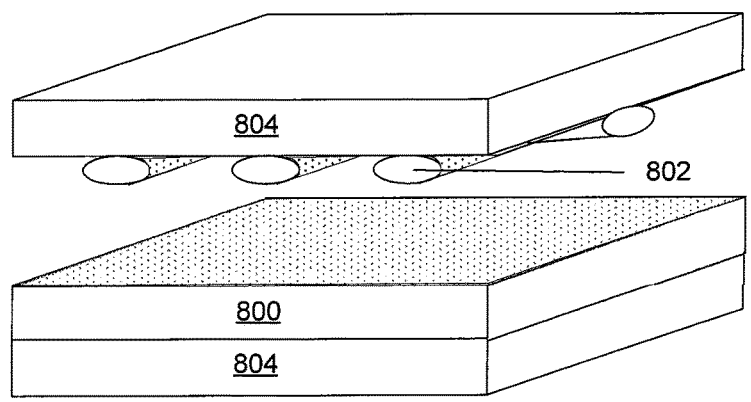
FIGS. 8A, 8B and 8C are schematic depictions of one method of forming a polymer surface.

Referring to FIG. 8A, a template is used to create a surface with hierarchical roughness. In the exemplary embodiment both a polymer 800 and the template 802 are coated with a dispersion of hydrophobic nanoparticles in a liquid carrier (for example, silica nanoparticles in alcohol).

Figure 8B:
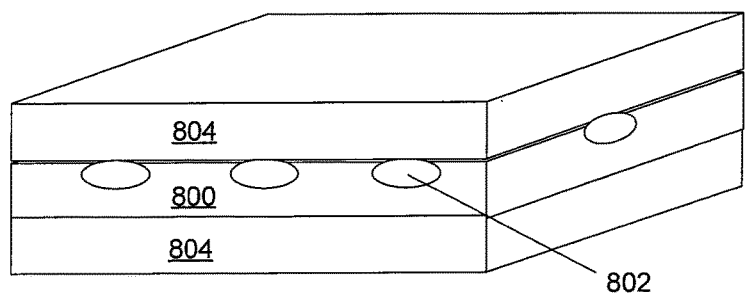

In FIG. 8B, after drying, the polymer 800 and template 802 are then stacked between plates 804 and laminated under heat and pressure for a given time.

Figure 8C:
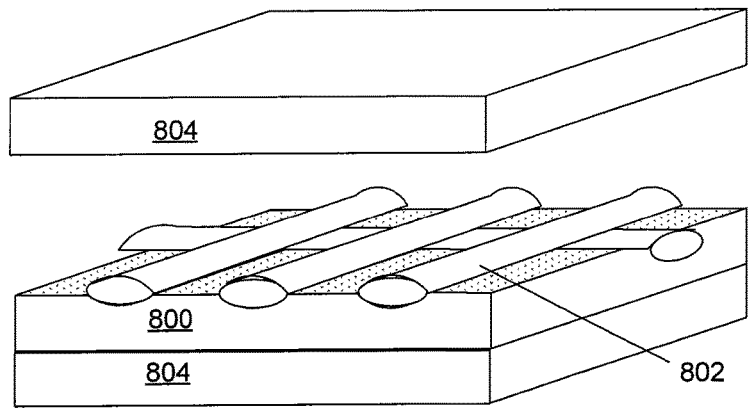

In FIG. 8C, the assembly is then cooled and excess hydrophobic particles are removed (e.g. blowing with clean compressed air), however the template 802 remains embedded into the polymer 800. At this stage of the process, before the template 802 template is removed, the surface has two layers of roughness. The primary roughness is formed by the ridges (formed as the polymer 800 flows through the pores in the template 802) and recessed grooves (visible after the mesh is removed) provided by template 802. The secondary roughness is formed by individual and aggregated hydrophobic nanoparticles adhered onto the polymer surface. In addition, the polymer 800 may flow into the pores between some hydrophobic nanoparticles. The polymer 800 adheres well to the hydrophobic nanoparticles, bonding them tightly to the surface which increases overall secondary roughness. After the first lamination step, excess hydrophobic nanoparticles may be removed, however the template is left partially embedded into the polymer 800.

Figure 8D:
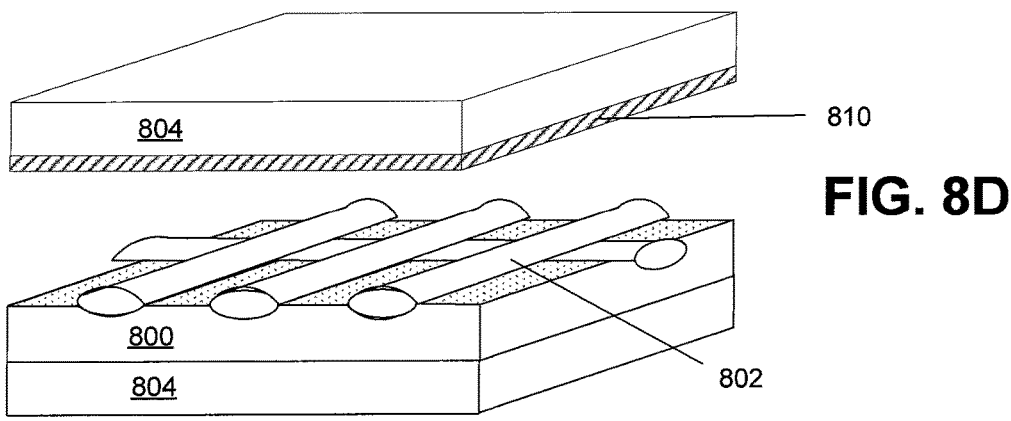
FIGS. 8D, 8E and 8F are schematic depictions of one method of modifying a polymer surface.
Figure 8E:
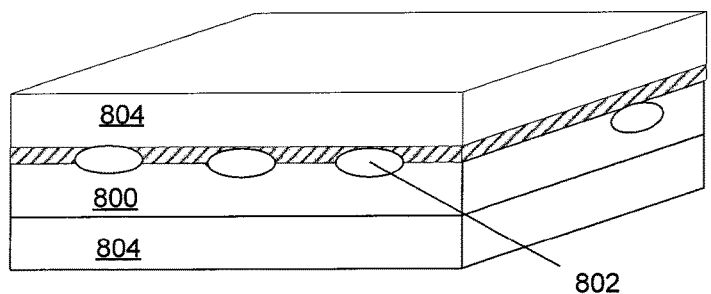
Figure 8F:
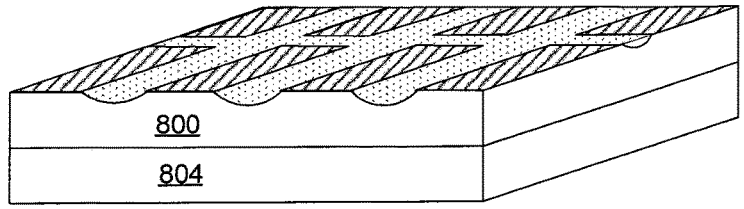

As shown in FIG. 8D, in the second lamination step, the polymer 800 (with template) is pressed against a layer 810 of catalytic nanoparticles (e.g. $TiO_2$). The catalytic nanoparticles may have either hydrophobic or hydrophilic surfaces. The layer 810 of the catalytic nanoparticles can be applied with a blade or other comparable coating method. In one embodiment, the thickness of the catalytic nanoparticles is at least 0.5 micrometers. The catalytic particles are laminated to the surface of the polymer (see FIG. 8E) only in the areas exposed by the pores in the template. The wires which form the template exclude the catalytic particles from the grooves—thus insuring that the grooves are coated only with hydrophobic nanoparticles. In the last step, the assembly is cooled and the mesh template separated from the polymer. This exposes the fabricated surface with isolated catalytic regions, which are raised relative to the grooves coated primarily with hydrophobic nanoparticles. See FIG. 8F. If desired, excess nanoparticles can be removed by washing or blowing with compressed air.

Figure 8G:
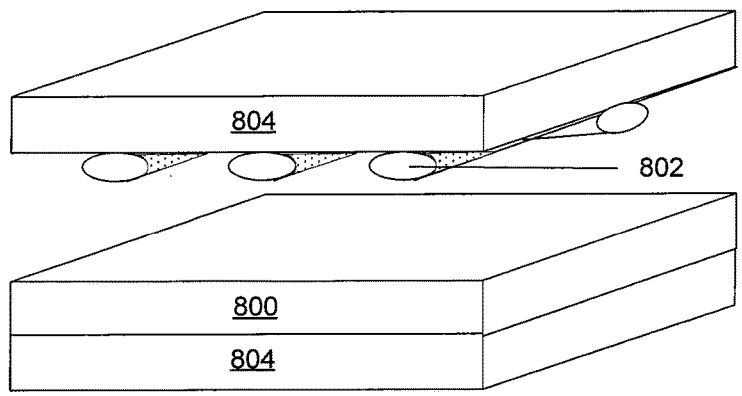
FIGS. 8G, 8H and 8I are schematic depictions of another method of forming a polymer surface.
Figure 8H:
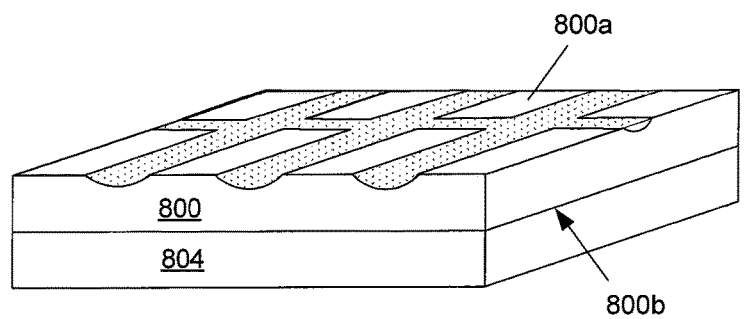
Figure 8I:
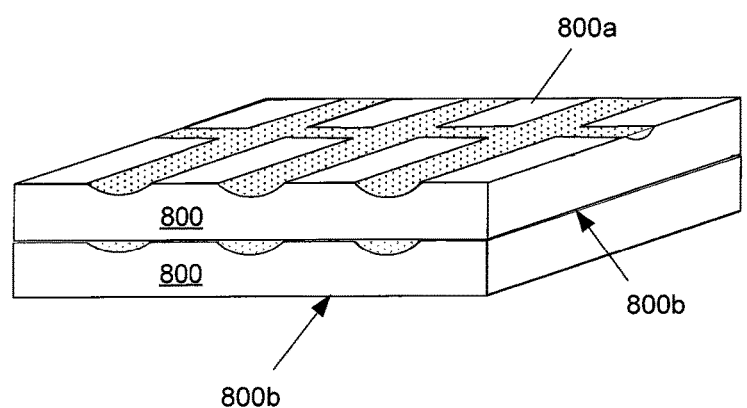

An alternative method is depicted in FIG. 8G and FIG. 8H. FIG. 8G is similar to FIG. 8A except in that only the template 802 is coated with nanoparticles. The resulting film, shown in FIG. 8H is similar to the film of FIG. 8F except in that only the grooves of the polymer 800 have been coated with nanoparticles. The top surfaces of the protrusions are substantially free of the nanoparticles. Advantageously, this permits the film of FIG. 8H to be stacked atop other polymers. See FIG. 8I.

For example, two such layers of the treated polymer 800 may be stacked. The top surface 800a of a first polymer provides an exposed surface to which a bottom surface 800b of a second polymer can adhere. This is advantageous for certain embodiments. For example, multiple rolls of the polymer film of FIG. 8F may be provided which have a predetermined width. Two such rolls may be placed adjacent one another to cover a wider area. The edges of the two rolls may be caused to overlap to prevent leaks through the crack between the rolls. However, the nanoparticles of the lower roll may cause the lower layer to not be securely attached to the upper roll. In such an embodiment, the edges of at least the lower roller may be modified in accordance with FIG. 8H to provide an exposed polymer top surface 800a. In this fashion the lower roller and the upper roll may be attached at their edges while presenting a modified surface (e.g. FIG. 8F) elsewhere on the rolls. In one embodiment, heat treatment is used to cause polymeric material within the exposed surface 800a to form a diffusion bond with the exposed surface 800b with which it is in contact. This permits two adjacent rolls to form a secure seal at their overlapping edges (e.g. FIG. 8H) while still presenting a treated surface (e.g. FIG. 8F) to be presented to the environment at the remaining portions of the rolls.

Figure 9A:
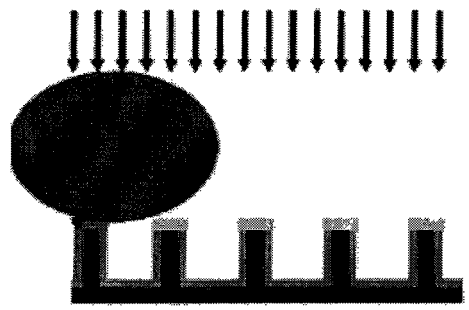
FIGS. 9A, 9B, 9C and 9D is a schematic depiction of a liquid rolling over a modified surface.
Figure 9B:
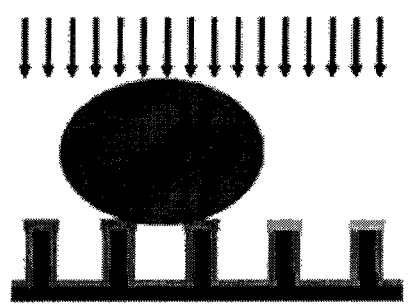
Figure 9C:
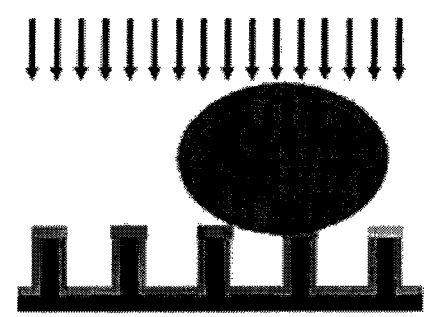
Figure 9D:
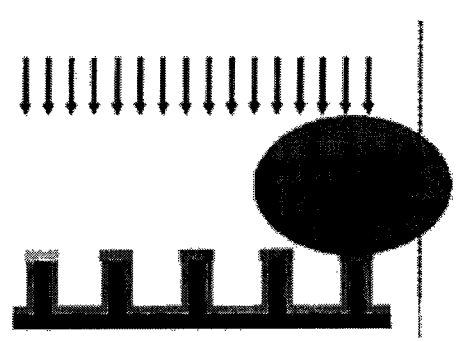

Without wishing to be bound to any particular theory, Applicant believes the hydrophilic/hydrophobic surfaces provide unusual chemical properties to the surface. For example, the surfaces disclosed in this specification can be used for efficient photooxidation of organic contaminants for the purpose of water purification. A schematic of the process is shown in FIGS. 9A, 9B, 9C and 9D. A superhydrophobic surface with isolated photocatalyst regions is illuminated with light. Water droplets containing organic contaminants are placed onto this superhydrophobic surface. When the surface is titled at a sufficient angle, these droplets can roll along the surface. As the droplet rolls, a small amount of fluid (less than or equal to 10 nanoliters) is deposited onto each of the photocatalyst regions as shown in FIGS. 9A, 9B and 9C. Such a small amount of fluid would result in the organic molecules coming into contact and/or being absorbed rapidly by the photocatalyst as the catalyst-containing regions become hydrophilic under the light illumination. This intimate contact between organic molecule and catalytic surface under ultraviolet/visible light illumination results in accelerated photodegradation rates. If the vapor pressure of water in the gas phase above the surface was sufficiently low, the water would quickly evaporate from these catalytic regions, bringing all the organic molecules into contact with the catalytic surface. The process is repeated as the next droplet interacts with the cleaned surface. Thus the retention of nanoliters of fluid leads to the concentration of organic molecules on the surface and enhanced photodegradation rates. Evaporation of the retained fluid further enhances reaction rates.

Figure 10A:
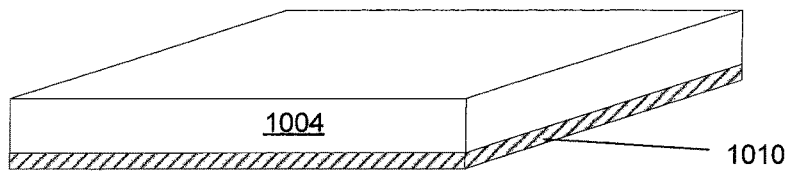
FIGS. 10A, 10B and 10C are schematic depictions of one method of modifying a polymer surface.
Figure 10B:
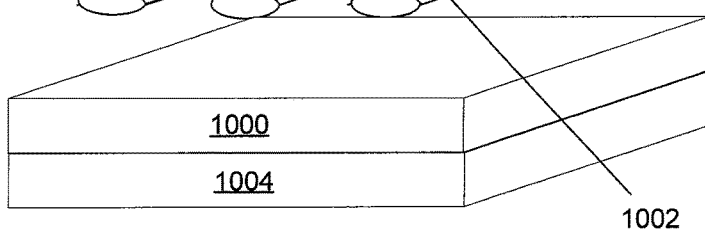
Figure 10C:
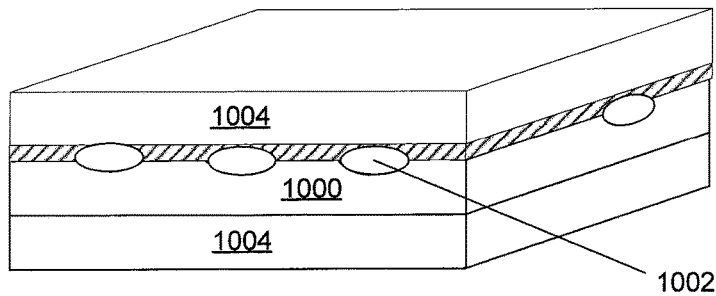

In the alternative method for forming such surfaces shown in FIG. 10A, FIG. 10B and FIG. 10C, the polymer 1000, photocatalytic nanoparticles 1010 and template 1002 are stacked. The thickness of the photocatalytic nanoparticles was at least 0.5 micrometers. After lamination between plates 1004 and cooling, a surface with two layers of roughness is formed. In the depicted embodiment, the primary roughness is created by embossing the wire mesh into the polymer surface forming an array of grooves with dimensions similar to the template and raised areas formed as the polymer flow through the relatively large pores of the template and into the fine pores between nanoparticles. In this case, the groves are not coated with nanoparticles. The secondary roughness is formed by individual and aggregated nanoparticles adhered onto the polymer surface. In addition, the polymer may flow into the pores between some nanoparticles increasing the secondary roughness. After the template is removed, the catalytic particles are isolated in the raised polymer areas (polymer posts) which are surrounded by hydrophobic polymer grooves. The dimensions of the raised polymer regions coated with catalyst nanoparticles (polymer posts), as well as the dimensions of the grooves, can be adjusted by using different templates. The photocatalytic properties rely on the isolated regions coated with photocatalytic nanoparticles, while the superhydrophobic properties mainly rely on the three-dimensional polymer post structures. Because the surface of the polymer is either intrinsically hydrophobic (FIG. 10C) or modified to be hydrophobic, the superhydrophobicity and the photocatalytic properties can be concurrently achieved by finely controlling the three-dimensional microstructures of the surface without using the hydrophobic nanoparticles.

Figure 11A:
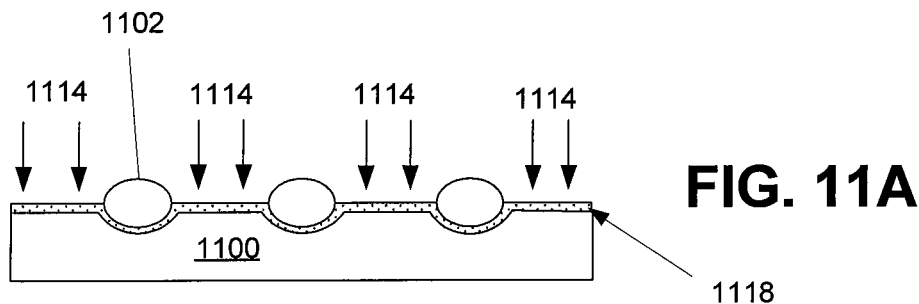
FIGS. 11A; 11B; 11C and 11D are schematic depictions of one method of modifying a polymer surface.
Figure 11B:
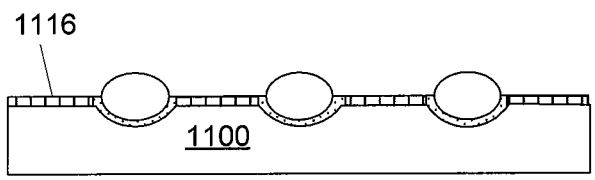
Figure 11C:
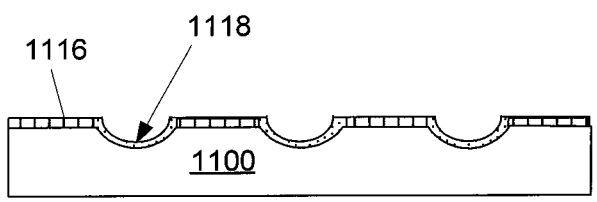
Figure 11D:
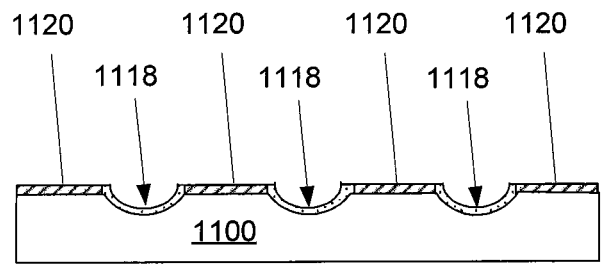

In the alternative method shown in FIG. 11A, FIG. 11B and FIG. 11C, a polymer nanocomposite surface with hierarchical roughness (e.g. primary and secondary roughness) is manufactured. An intermediate (e.g. see FIG. 8C) with a template 1102 embedded in a polymer 1102 and a hydrophobic nanoparticle surface 1118 is provided. The exposed surface 1114 is then treated with oxygen, air plasma or other suitable oxidant while the template remains embedded in the polymer to generate superhydrophilic regions 1116 (FIG. 11A). Thus the template serves two roles: as a template for embossing the polymer surface to create primary roughness and as a mask to enable the selective oxidation of the polymer surface. See FIG. 11B. Subsequently, the template 1102 is removed (FIG. 11C) to expose the superhydrophobic area 1118 under the template. Hydrophilic nanoparticles may be self-assembled onto the newly formed superhydrophilic regions by coating with an aqueous dispersion of the hydrophilic nanoparticles (for example, by rolling water droplets containing $TiO_2$ nanoparticles along the superhydrophobic-superhydrophilic hybrid surface) to produce the product of FIG. 11D. Finally the technique of percolative infiltration is used again for anchoring the self-assembled hydrophilic nanoparticles to the polymer.

Figure 12A:
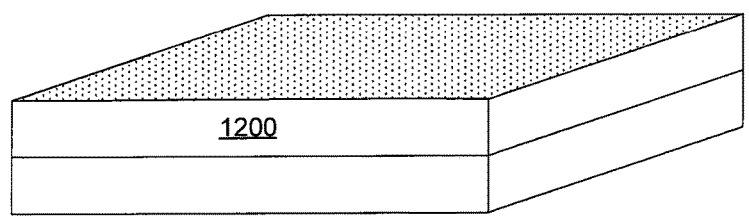
FIGS. 12A, 12B, 12C and 12D are schematic depictions of one method of modifying a polymer surface.
Figure 12B:
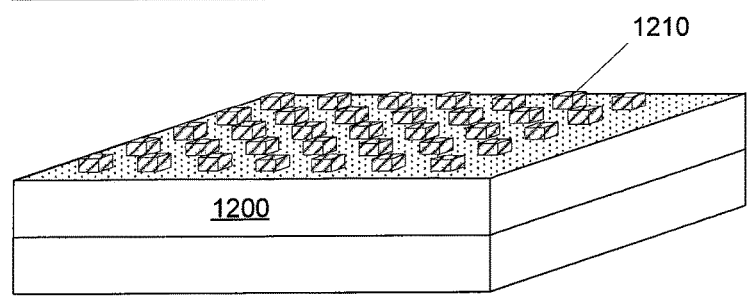
Figure 12C:
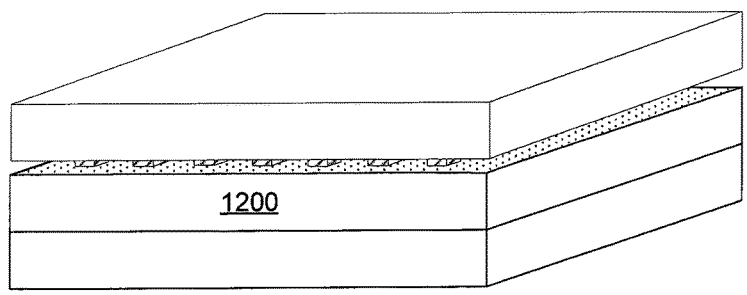
Figure 12D:
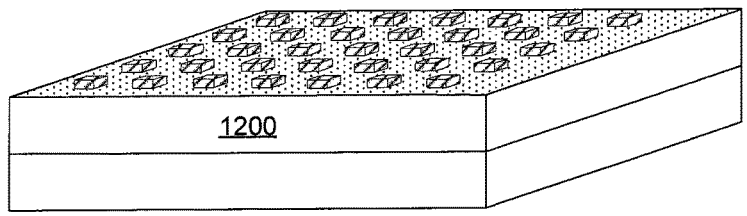

Yet another method is shown in FIGS. 12A to 12C. A coating of hydrophobic nanoparticles (see FIG. 12A) is first applied onto the polymer 1200. The thickness of the hydrophobic nanoparticles layer is controlled to be 0.5-1000 micrometers. Onto this hydrophobic surface, regions of photocatalytic nanoparticles 1210 can be formed into a dot pattern by using an appropriate printing technique (e.g. inkjet, stamp, stencil or screen printing). See FIG. 12B. The diameter of each region with catalytic nanoparticles can range from 1-1000 micrometers, and the pitch of the photocatalytic nanoparticles dots could range from 1-1000 micrometers. After printing, the hydrophobic nanoparticles are bonded to the polymer by laminating under heat and pressure (see FIG. 12C). The sample is then cooled with or without pressure. FIG. 12D.

These exemplary methods can be used to make freestanding films of hybrid superhydrophobic and photocatalytic surfaces. By including a substrate and adhesive layer, the hybrid superhydrophobic and photocatalytic surfaces could be bonded to a substrate such as metal (e.g. aluminum) or a composite (e.g. epoxy-glass). The template could be made from polymers, fabrics, or metals. The pore size of the templates may range, for example, from 1-800 micrometers and the average pitch of the pores can range from 1-800 micrometers. Templates made with finer pores and smaller wires could also be used. The lamination temperature generally is between 100-450° C. and the pressure generally between from 0.5-10000 psi. These values will depend upon the polymer used as well as the depth of the desired grooves. By controlling the lamination conditions such as temperature, pressure, and time for each step, the surface microstructures as well as the contents of the polymer composite materials can be finely adjusted for achieving the desired performance.

Application—Water Purification

Conventional photocatalytic films or powders exhibit low photooxidation efficiencies (especially at low pollutant levels, e.g. one ppm and lower). The low efficiency of these films results, in part, from the slow rate at which the organic contaminant can contact the photocatalytic particles on the surface. Since the conventional films are hydrophilic, a static boundary layer is formed as fluid flows along the surface. Once the contaminant molecules within the boundary layer are decomposed, additional molecules must diffuse across the static boundary layer. The present technique, using a superhydrophobic surface with isolated photocatalyst regions, overcomes this limitation. As a droplet moves along the surface of a conduit, fluid with contaminant molecules is continuously brought into close proximity with the catalyst.

Figure 13A:
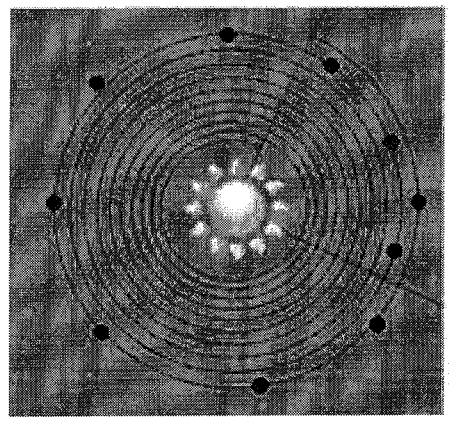
FIGS. 13A and 13B are top and side views, respectively, of an exemplary water treatment apparatus.
Figure 13B:
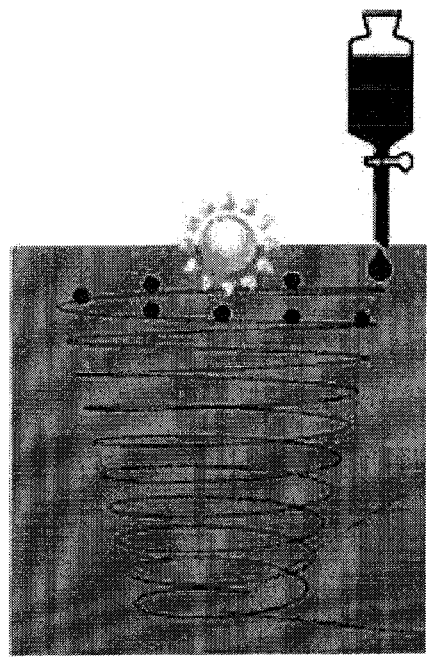

In one embodiment, a system is designed in which droplets repeatedly contact the superhydrophobic-catalytic surface. In one embodiment, the surface is mounted onto a tilting or reciprocating platform such that droplets flow either back and forth across, or in a circular motion around, the surface. In another embodiment, the surface is formed into either a helical or spiral conduit; a spiral conduit is shown schematically in FIG. 13A and FIG. 13B. In this way a continuous stream of droplets can travel along the superhydrophobic conduit where the conduit surface is continuously exposed to light. Travel of droplets along a conduit surface is greatly facilitated by the superhydrophobic properties; superhydrophobicity reduces the inclination angle required for the conduit, allowing more turns to be achieved within a given height. In addition, it avoids the formation of static boundary layers which would reduce photooxidation rates. If the fluid is not fully oxidized at the bottom of the spiral, it can be pumped back to the upper reservoir for re-treatment. Alternatively, the length of the conduit could be increased. A superhydrophobic surface can be made into a helical or spiral conduit suitable for use with the embodiment of FIGS. 13A and 13B by conducting the lamination steps using a mold, or mandrel, to form the polymer into an open conduit. For example, the lower plate could be made into the form of a curved concave surface whereas the upper steel plate could be formed into a mating curved convex surface. After processing, a curved semi-circular conduit would be formed with an interior superhydrophobic surface containing regions of a photoactive catalyst. The ends of the curved conduit sections could be joined together (either using a connector or adhesive) to form a helical conduit. Alternatively, the mold could be made such that a two-dimensional spiral could be formed. A three-dimensional spiral could then be created by stretching the 2D spiral. This would be facilitated by using a tough thermoplastic polymer such as polyethylene. The hybrid nanocomposite conduit could be bonded to a metal substrate and then bent into the appropriate form. This conduit could either be self-supporting, or attached to the inside of a cylinder, to form a continuous path where the entire surface, which contacts water, would be constantly irradiated with light. By enclosing within a cylinder, water that evaporates from the drops could be condensed and collected providing a source of purified drinking water. To accelerate this process, the vapor pressure of water would be reduced, further encouraging evaporation. This lowered vapor pressure would also accelerate the concentration of the organic chemicals, on the catalyst particles. If volatile contaminants are present, the vapor pressure of water in the gas phase could be increased to minimize water evaporation. Drops of a fluid may be introduced at the top of the conduit. The drop size, the spacing between drops and the overall length of the conduit would be controlled to insure efficient photooxidation of the organic contaminant. When droplets reached the end of the conduit they could be tested for contaminant concentration. This could be done, for example, by Raman spectrometry. If the concentration of contaminant is too high, the liquid could be pumped to the top of the helix and re-treated. Any source of radiation with sufficient energy to activate the catalyst particles could be used. For example, either natural sunlight or ultraviolet lamps could be used.

In one embodiment, a robust, transparent, self-cleaning surface is produced that exhibits water repellency, reliable resistance to dynamic and static water pressure, and mechanical and chemical stability. The nanoparticles are dispersed in an appropriate solvent. For example, a mixture of ethanol and water at nanoparticle concentrations of from 0.5 to 10% can be used. The solution is then applied to a transparent substrate. Numerous coating technologies could be used to achieve a uniform coating such as: dip-coating, spray-coating, spin-coating, Doctor Blade coating, brush coating as well as other methods. The substrate must be optically transparent and remain so after the heating process described below. A variety of thermoplastic polymers can be used including polyethylene, poly(methyl methacrylate), cyclic olefin copolymers, cyclo olefin polymers and fluoropolymers. In one embodiment, a polymer with a relatively low melt index is used. In one embodiment, the melt index is less than 5 g per 10 min. The low melt index, which corresponds to a high melt viscosity, resists nanoparticles from becoming fully encapsulated in the polymer and promotes the nanoparticles being partially embedded and partially exposed. By minimizing the amount of nanoparticles that are fully encapsulated, the formation of a transparent product is facilitated. Generally, by avoiding full encapsulation, there are substantially no nanoparticles at a depth greater than 100% of the nanoparticle's diameter. For example, when the nanoparticles have an average diameter of 100 nm, the nanoparticles are generally confined to a surface layer that is 100 nm in depth. At a depth of greater than 100 nm, there are so few nanoparticles present, that a cross-section along this depth would not exhibit superhydrophobic properties. In one embodiment, glass is used as the substrate, and higher processing temperatures are used than for polymers.

The coated substrate is then dried to remove solvent. To dry the coating, the surface can be stored at room temperature (e.g. 25° C.) for several hours or maintained at higher temperatures in an oven for less time. The coated substrate is then heated so that the particles adhere to the underlying substrate.

One method to achieve particle adhesion is to apply heat and pressure using a laminating press. In this case, the polymer substrate was melted and laminated under two flat steel plates. In one embodiment, the substrate is heated to exceed its glass transition temperature and/or its crystalline melt temperature. This causes the substrate to flow. Glass plates can also be used at low pressures. The surface of the plates may be flat and smooth to avoid introducing surface defects that could scatter light. This permits the nanoparticles to be placed in intimate contact with the substrate without completely submerged in the substrate such that the particles are covered. The intimate contact can create a chemical bond to the nanoparticle surface or enable flow into facets on the particle surface thereby mechanically entrapping the particles. After lamination, the substrate is cooled to room temperature either with or without pressure. This process is similar to the previously described processes, except for the more stringent requirement on the smoothness and the parallelism of the two inside surfaces of the laminating plates. The resulting products are significantly more robust than previous transparent superhydrophobic products.

The nanoparticles can be an inorganic oxide material such as $SiO_2$, $Al_2O_3$, ZnO, $TiO_2$, and so on. In one embodiment, the particles are optically transparent. The surface of the particles may be rendered hydrophobic by coating with a hydrophobic material (e.g. silane). The particles can be of any shape and size distribution, including monodispersed spheres, rough columnar shapes, or agglomerates of several to hundreds of nanoparticles. The size of the nanoparticles could range from 1 nm to 100 nm or any size less than one-fourth the wavelength of light being transmitted (generally 390 to 700 nm).

The nanoparticles may be treated after the lamination to insure hydrophobicity (e.g. with a silane). This would be true when untreated hydrophilic particles were used or if the lamination temperature was higher than the degradation temperature of the original hydrophobic surface groups.

Application—Fabric

The methods described may be combined with the simultaneous adhesion of such a polymer surface to a fabric to form a superhydrophobic fabric with unique properties. By carefully selecting the fabric structure (e.g. weave), strong adhesion between the superhydrophobic polymer and the fabric can be obtained. Also, by carefully selecting the fabric chemistry (i.e. surface chemistry of the fibers used to make the fabric) superhydrophobic fabrics can be prepared with controlled water transmission properties. Thus superhydrophobic fabrics can be made that either (1) prevent both liquid water as well as water vapor transmission through the fabric or (2) prevent only liquid water transmission while promoting water vapor transmission through the fabric. Depending on the application, one or the other set of properties would be preferred.

Figure 14:
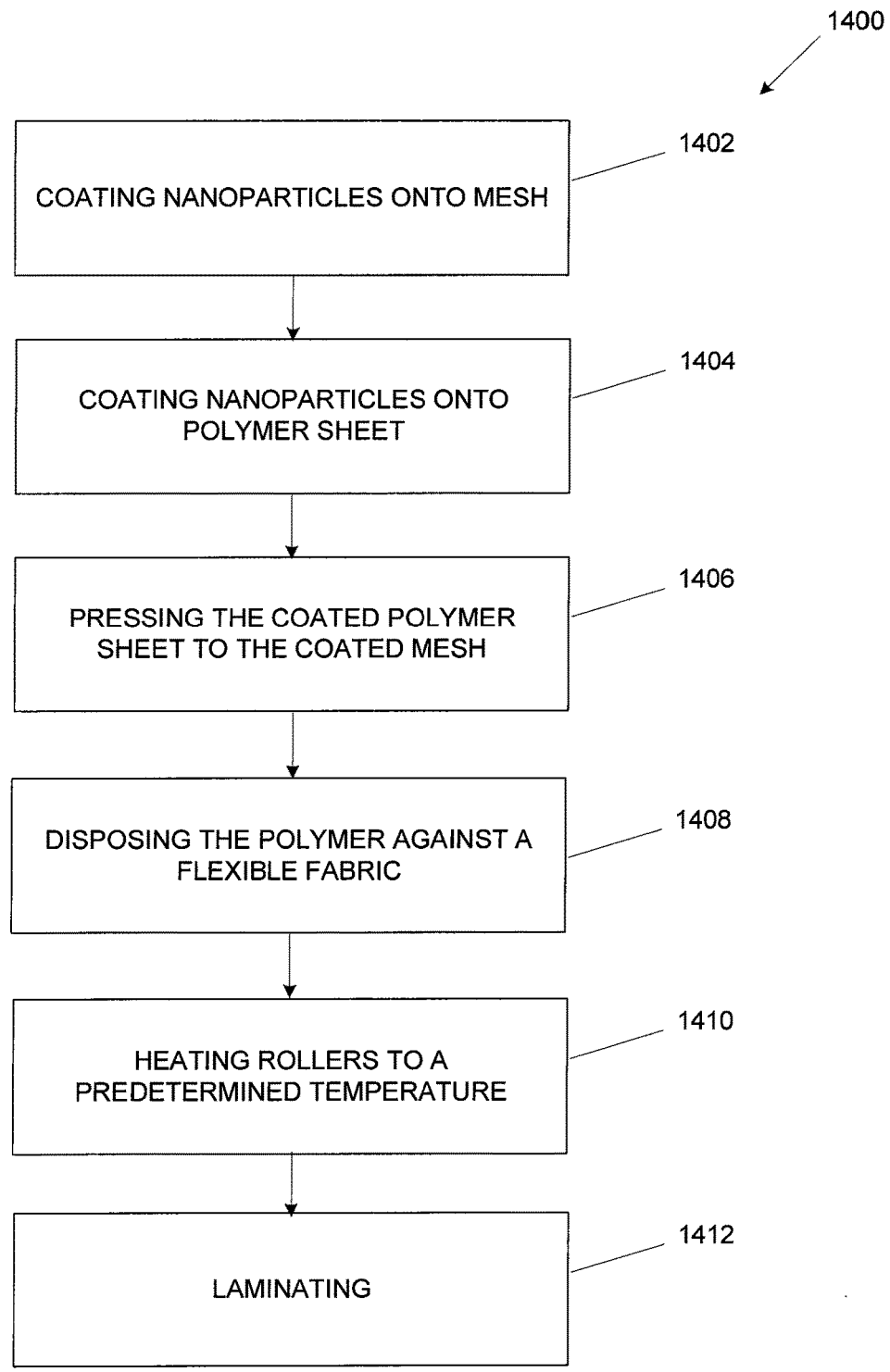
FIG. 14 is a flow diagram depicting one method of forming a superhydrophobic fabric.
Figure 15:
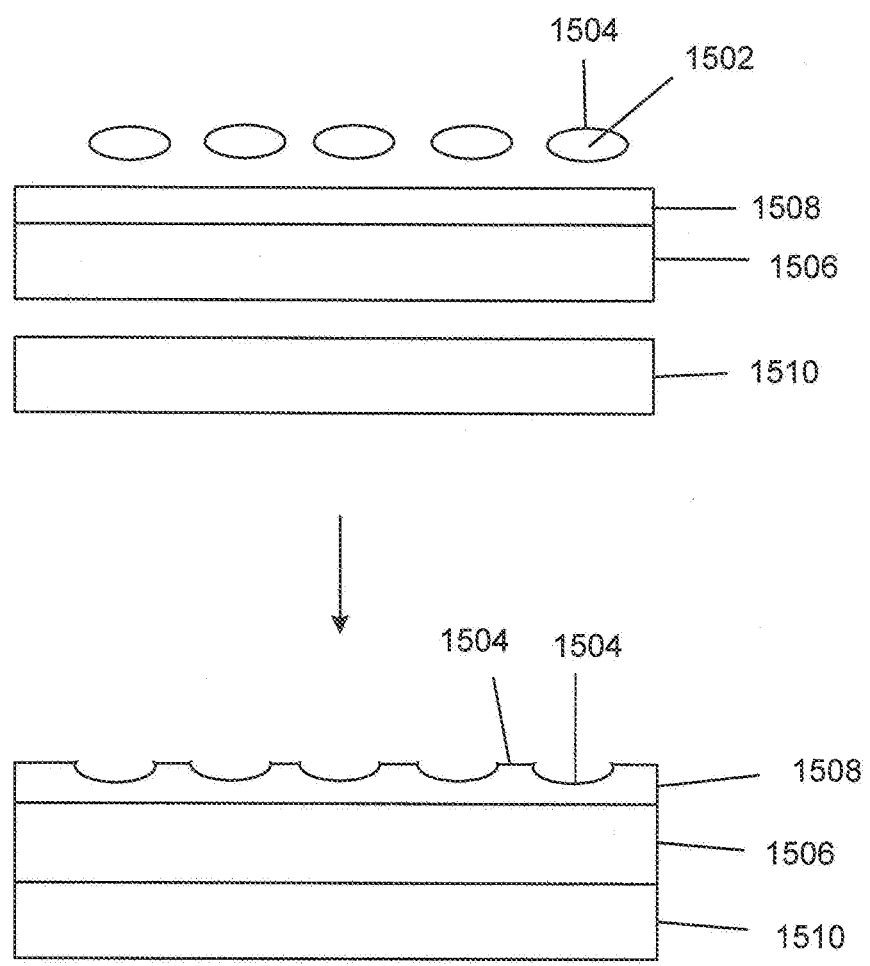
FIG. 15 is a schematic depiction of the method of FIG. 14.

Referring to FIG. 14 and FIG. 15 a method 1400 for coating a fabric with a superhydrophobic layer is depicted. In step 1402 of method 1400, a mesh 1502 is coated with a layer of nanoparticles 1504 as previously described. In one embodiment, the nanoparticles 1504 are silane-treated nanoparticles. In step 1404, a polymer sheet 1506 is coated with a layer of nanoparticles 1508 on a first side of the polymer sheet 1506. The nanoparticles can be applied to the polymer sheet as well as the mesh by dispersing the particles in a solvent and applying the solution to the surface using standard solution-coating techniques including brushing, spraying, dipping, spin coating and the use of a doctor blade technique. In another embodiment, the nanoparticles are coated as a dry powder.

In step 1406, the coated polymer sheet and the coated mesh are pressed against one another such that the coated mesh contacts the first (coated) side of the polymer sheet. In step 1408, the polymer sheet is disposed against a flexible fabric such that a second (uncoated) side of the polymer sheet contacts a fabric 1510 to form an assembly. In step 1410 rollers are heated to a predetermined temperature. In step 1410 the assembly is laminated using the rollers.

Figure 16:
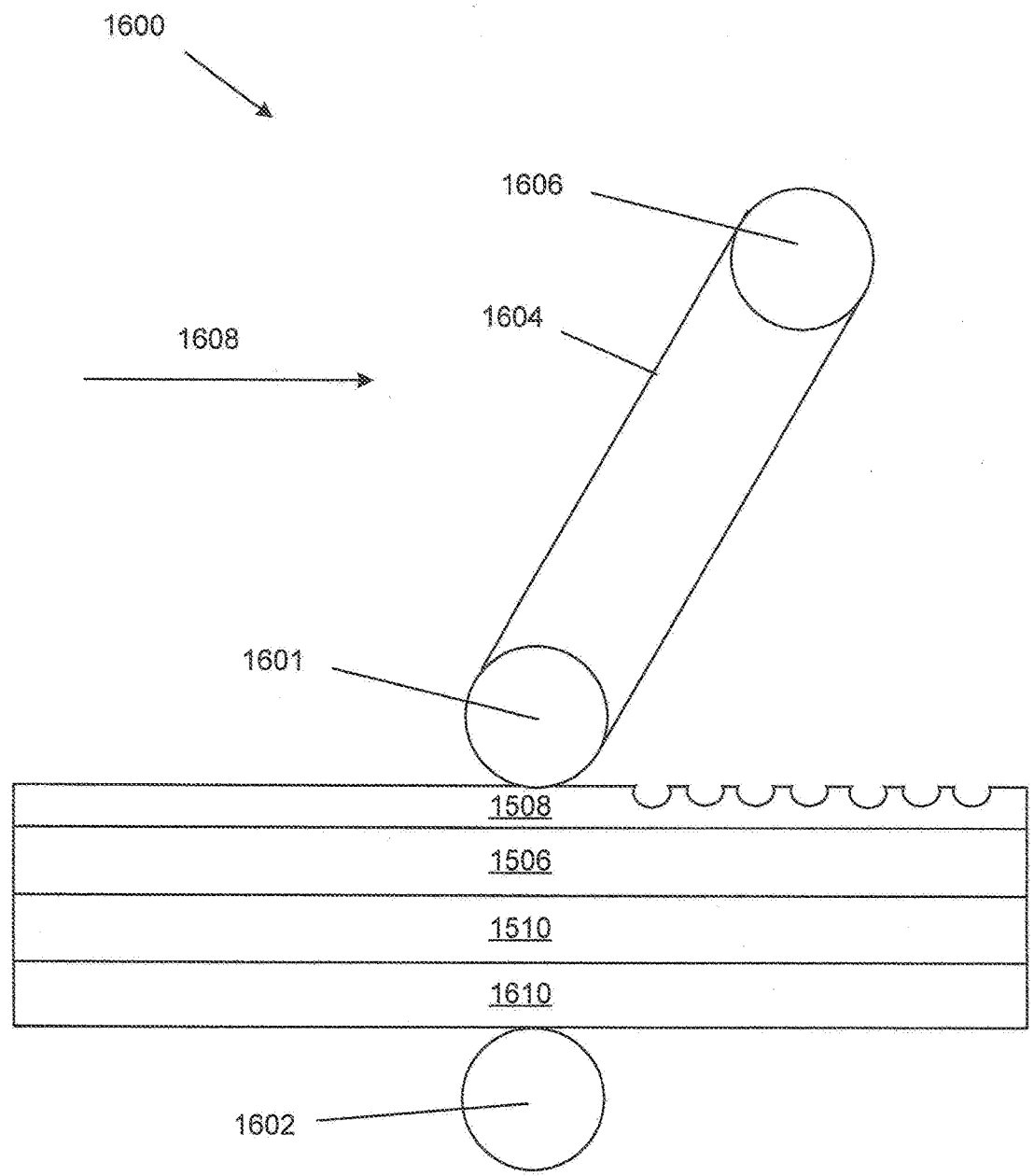
FIG. 16 is a schematic depiction of a device for performing the method of FIG. 14.

An example of a device 1600 for performing method 1400 is depicted in FIG. 16. Device 1600 comprises a first roller 1601 and a second roller 1602, at least one of which has been heated to a predetermined temperature. A flexible belt 1601 supports a mesh (not shown) that has nanoparticles disposed thereon. The flexible belt 1601 is stretched between the first roller 1601 and a third roller 1606. Such a configuration permits continuous manufacturing. In use, the pressed assembly is laminated in processing direction 1608 through the first and second rollers 1601, 1602 where a constant temperature and pressure are applied. In some embodiments, a support layer 1610 is provided on the undersurface of the fabric 1510 to provide a barrier between the fabric 1510 and the second roller 1602. Examples of suitable support layers include PET films, polyimide film as well as paper film The nanoparticles applied to the polymer sheet 1506 and the mesh 1502 may be inorganic oxides, such as $SiO_2$, $Al_2O_3$, ZnO, $TiO_2$ and the like. The particles can be of any shape and size distribution, including monodispersed spheres, rough columnar shapes, or agglomerates of several to hundreds of nanoparticles. In some embodiments, the nanoparticles are hydrophilic nanoparticles that are treated (e.g. with silane) after lamination to ensure hydrophobicity. The particles may be hydrophobic silane-treated silica (TS-530 from Cabot Corporation). In general operation, particles that are manufactured with a hydrophobic silane surface are used and these particles are stable during processing and require no additional treatment with silanes or other hydrophobilizing agent.

The mesh 1502 may have an average pore size ranging from about 2 micrometers to about 800 micrometers and may be formed from any material that is stable in the processing temperature range. In one embodiment, a 100× 100 mesh woven stainless steel wire mesh cloth is used, the mesh cloth having wires with a diameter of 115 microns (establishing the pore spacing) that forms pores with a pore size of about 150 microns. Using different mesh cloths has shown to have different results. For example a more coarse mesh (60×60) has been shown to exhibit greater abrasion resistance while a finer mesh (200×200) has been show to exhibit lower slip angles).

Examples of suitable polymer sheets include various thermoplastic or B-staged pre-preg materials that can be heated to reduce the polymer viscosity sufficiently to enable the polymer to flow into the pores of the fabric as well as the pores between particles. When B-staged thermosets are used, their viscosity must remain low for a sufficiently long period of time to form the desired hierarchical structures during the lamination process and turn to a solid form when cooled back to room temperature. Examples include polyethylene, polypropylene, cyclic polyolefins, and the like. Thermoset materials such as B-staged rubber can also be used. Polymer inks, such as acrylic inks, can be pressed by a printing process directly to the fabric. The polymer sheet may be a free-standing film that is adhered to the fabric substrate during the method 1400. Alternatively, the polymer sheet may be pre-applied to one or both surface of the fabric in a separate process. The polymer sheet may also be applied to the fabric from a solution using a coating or printing process. To maintain fabric flexibility and porosity, the polymer sheet should have a processing temperature (e.g. a glass transition temperature or crystalline melt temperature) lower than the comparable thermal softening temperature of the fabric. The polymer sheet can be applied to one surface (as shown in FIG. 15 and FIG. 16) or to both surfaces of the fabric. In those embodiment where both surfaces of the fabric are coated with a polymer sheet, either one or both of the coated polymer sheets may be rendered superhydrophobic. For example, the second roller 1602 may also be equipped with a mesh and both sides of the fabric are rendered superhydrophobic.

In certain embodiments, a hierarchical surface roughness is created on a fabric by using a fabric's ability to present a surface layer that functions as a polymer sheet. For example, in some embodiments the surface of the fabric can be heated sufficiently such that the surface flows into pores of the mesh as well as adheres to the nanoparticles directly without using a distinct polymer sheet. This is especially true when the fabric is composed of synthetic thermoplastic polymer fibers.

Examples of suitable fabrics include woven or non-woven fabrics with a pore size ranging from 1 to hundreds of microns. Fabrics can be made with hydrophilic fibers (e.g. cotton, nylon or polyester) or hydrophobic fibers (e.g. polyethylene, polypropylene). The type of fabric affects both the durability and wetting behavior of the final fabric.

The weave of the fabric will affect the thickness, drape and porosity (distance between adjacent fibers) of the fabric. During the roll lamination method, the polymer sheet needs to adhere strongly to the fabric. In some cases the polymer sheet may not form strong chemical bonds to the fabric (for example HDPE film and nylon fabric) in which case mechanical adhesion of the polymer sheet to the fabric is required. To achieve mechanical adhesion, the polymer sheet should be able to flow between the filaments of the fabric (i.e. into the fabric pores). To promote this, the filaments of the fabric should not be woven too tightly together, otherwise the polymer sheet will not be able to effectively penetrate and poor adhesion would result. For example, when "down-proof" nylon was used as the fabric, the tightly woven nylon filaments prevented the penetration of molten polyethylene. After lamination, the HDPE could be easily removed from the nylon. In contrast, when a woven fabric with an open structure (e.g. nylon mosquito netting) was used, the HDPE adhered strongly to the fabric and could not be separated without damaging the fabric. The filaments used to make the fabric need not be woven together. Non-woven fabrics may also be used to make superhydrophobic fabrics such a TYVEK® or other non-woven polymers. However if strong chemical bonds cannot be formed, then porosity in the non-woven fabric is required to insure good adhesion.

The fabric surface energy of the fabric will affect the performance of the resulting fabric. Effect of fabric surface energy: Either hydrophobic or hydrophilic fabrics can be used. When a hydrophobic fabric is used, the treated surface becomes superhydrophobic and the opposite surface remains hydrophobic. This type of treatment has advantages for making fabrics that are highly impermeable to water. For example such a fabric would be useful for an umbrella where the overall fabric thickness should be kept thin, to minimize weight and facilitate folding. In other cases, it may be preferable to use a fabric that is hydrophilic such as nylon or polyester. In one case, the open weave of a fabric made from nylon monofilaments may be desired to minimize fabric thickness and maximize adhesion as well as light penetration. However if only one side of a nylon fabric is treated, then the back side will be hydrophilic and absorb water. If water absorption is not desired, the both sides of the nylon fabric can be treated with a hydrophobic polymer film. One side of the hydrophilic fabric can be made superhydrophobic and the other side of the hydrophilic fabric would be made hydrophobic. Alternatively both surfaces could be made superhydrophobic. In another case, a knitted polyester fabric may be used. Again, only one side may be treated to make the fabric surface superhydrophobic while the back side will remain hydrophilic. Alternatively, both sides of the knit fabric can be treated with a polymer film so that one or both surfaces were superhydrophobic depending upon the process conditions.

In one embodiment, a breathable liquid barrier is provided. A fabric with one hydrophilic surface and one superhydrophobic surface can be advantageous. From the direction of the superhydrophobic surface, the fabric acts as an effective liquid barrier, preventing liquid water from entering the cloth. From the opposite (hydrophilic) surface, liquid water would be absorbed into the fabric and as the liquid evaporated, the water vapor could be readily transported through the porous cloth and through the porous polymer layer and either evaporate into the air or be absorbed by a layer of liquid resting on the superhydrophobic posts. For such water vapor permeability to work effectively, the superhydrophobic layer should be porous.

Figure 17A:
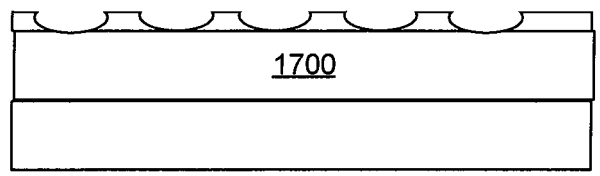
FIGS. 17A-D are schematic depictions of various embodiments of superhydrophobic fabrics.
Figure 17B:
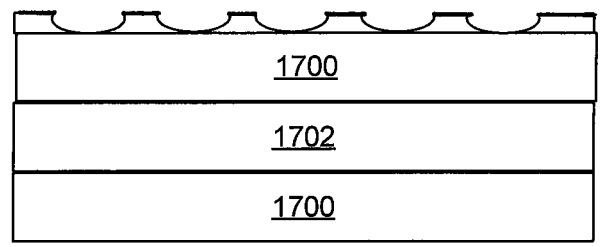

In FIG. 17A the superhydrophobic fabric has low or even no permeability to water vapor if the obtained polymer sheet 1700 is not porous or breathable. In FIG. 17B, a superhydrophobic fabric that has low or even no permeability to water vapor is also obtained by using a polymer sheet 1700 coated on an underside of the fabric 1702.

Figure 17C:
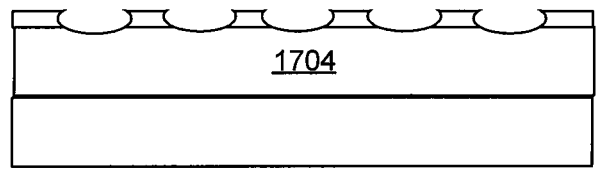
Figure 17D:

Porosity of the superhydrophobic polymer layer can be achieved by using different techniques. In one approach, a polymer 1704 with high permeability to water vapor can be used as shown in FIG. 17C. In another approach a thin polymer sheet 1706 is used in which perforations (such as voids, or cracks, or punched holes) enable the free flow of gas through the fabric as shown in FIG. 17D. In FIG. 17D, the pores formed by the mesh penetrate the depth of the polymer sheet 1706. A knit fabric could be advantageous as stretching of the fabric could promote the formation of pores in the polymer film and thus enhance the porosity. The size of the pores in the polymer film are smaller than the grooves formed by the mesh and so the superhydrophobicity is maintained in the presence of these perforations. Indeed, the regions where the woven wires cross can focus the lamination pressure sufficiently such that the mesh penetrates the polymer film in these regions and so form small openings in the polymer film. Using a thin polymer layer and compliant fabric can facilitate this process. Using a thicker polymer film and/or a thinner, less compliant fabric, can prevent pore formation. Pores can also be formed by punching small holes through the fabric and polymer film after lamination with, for example, an array of needles or an array of laser beams.

In one embodiment, a housewrap material is provided. Housewrap materials need to be waterproof and breathable. These barrier materials exclude water from penetrating from the exterior to the interior of the dwelling while allowing water vapor to easily escape from the interior walls of the house. Some housewrap materials accomplish this by closely packing hydrophobic polymer fibers together into a non-woven fabric with small pores between the fibers. The pores are sufficiently small as to exclude liquid water while enabling water vapor to readily permeate. Another approach is to perforate a polymer film or polymer non-woven paper with many holes. However such an approach is problematic as the relatively large holes can enable water to penetrate through the material. Another alternative is to coat a porous non-woven hydrophobic polymer fabric with a permeable hydrophobic polymer coating. Commercial materials include CERTAWRAP® (Saint Gobain Performance Materials) and TYVEK® (DuPont). Water contact angles on the housewrap materials are often below 130°, and water droplets firmly adhere to the surfaces even when orientated vertically. Thus these housewrap materials don't exhibit superhydrophobicity. By constructing micro/nano hierarchical structures onto the housewrap, a novel housewrap material with superhydrophobicity could be generated, which should provide better waterproof ability and better breathability. It could open new market opportunities in this field. These materials could be used for other applications like breathable apparel, umbrella fabric, selectively permeable membranes and the like.

Several approaches are available to fabricate a porous superhydrophobic material. In one example, a standard housewrap material from CertainTeed was used as a substrate. This standard housewrap is mainly composed of nonwoven fibers with one side coated with a polymer coating.

Application—Molding

Figure 18:
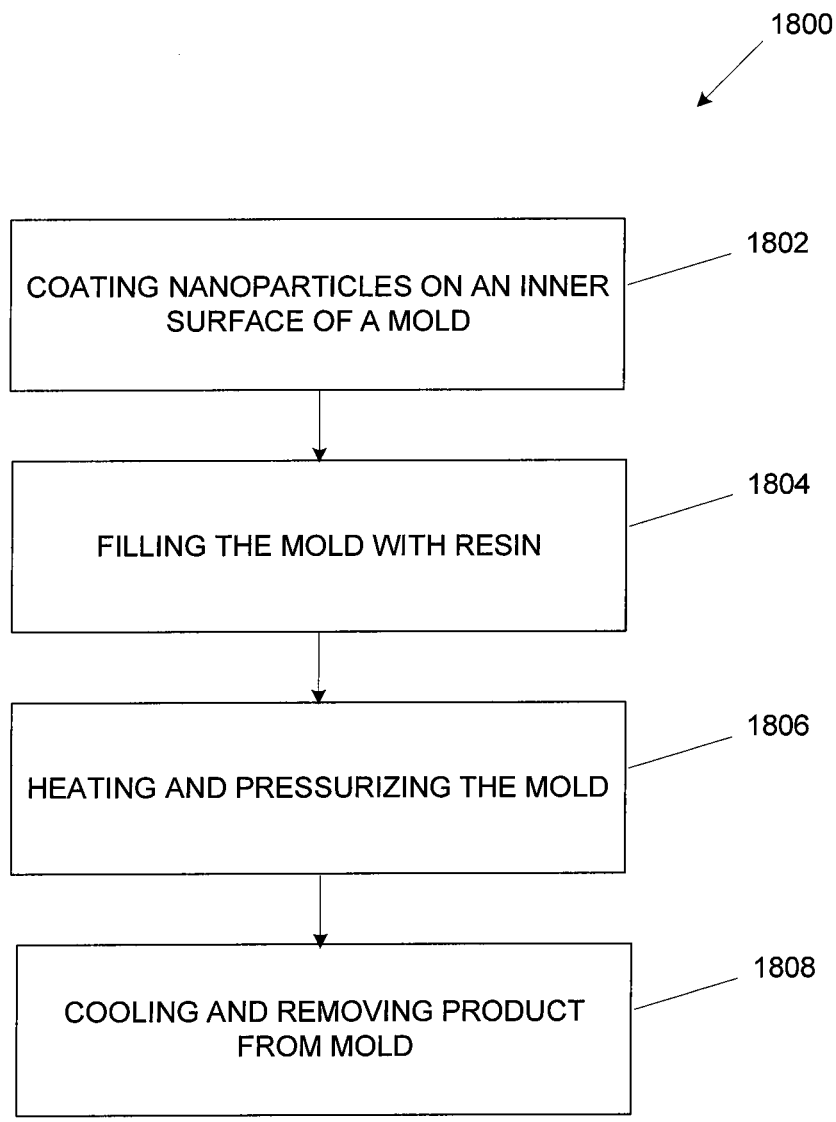
FIG. 18 is a flow gram depicting on method of forming a superhydrophobic product during a molding process.

FIG. 18 depicts a method 1800 for forming a superhydrophobic surface during a molding process. In step 1802 of method 1800 an inner surface of a mold is coated with a layer of nanoparticles. In some embodiments, prior to step 1802, the surface of the mold is roughened (e.g. sandblasted) to anchor the nanoparticles. In step 1804, the mold is filled with molten or solid resin. In step 1806, heat and pressure is applied to force the resin into the mold and conform to the details of the mold surface. In step 1808, the product is cooled to a temperature below the glass transition or gel temperature of the resin. The product is then removed from the mold.

The coating of the nanoparticles in step 1802 may be accomplished by, for example, spray-coating a dispersion of nanoparticles in an appropriate solvent. In another embodiment, the nanoparticles are coated by dry powder coating methods such as electrostatic or tribocharging spray guns. A superhydrophobic surface comes from the nanoparticle coating on the mold surface. As the rubber fills the mold, it percolates through the nanoparticle layer thereby forming hierarchial structures and strongly adheres to the nanoparticles.

Hierarchical structures were formed mainly during steps 1804, 1806 and 1808 when the resin is melted, forced to flow into the pores between the nanoparticles and their agglomerates, and finally cured in place or during cooling. As a result the nano/micro hierarchical structures are nanocomposite or alloy materials and are monolithic bonded onto the component, which is essential for achieving high robustness.

The particles may be 1-20 nm in size and form agglomerates ranging in size from 50-500 nm. The nanoparticles may be treated with a hydrophobic coating before being deposited on the inside of the mold. They may, for example, be treated with a silane or polydimethylsiloxane layer. Alternatively, the particles may be treated after the lamination to insure hydrophobicity (e.g. with a silane or PDMS). This would be true when untreated hydrophilic particles were used or if the lamination temperature was higher than the degradation temperature of the original hydrophobic surface groups. For some types of nanoparticles, no surface treatment is required.

The thickness of the coating nanoparticles can ranging from 0.2 to 300 micrometers, depending on the melt viscosity of the resins and the pressure used during molding. In one embodiment, the particle coating thickness ranges from 25 to 150 micrometers.

The resins can be composed of any type of thermoplastic or thermosetting polymer or B-stage pre-preg materials. Rubber materials are especially well suited for this application as these polymers, such as polybutadiene, copolymers of butadiene and silicone rubber compounds, are inherently hydrophobic, exhibit low melt viscosity and are easily molded.

The molding temperature is related to the rheological properties of the resins and can range from room temperature to 500° C. More commonly, a temperature range from 75 to 250° C. is used. The pressure is also determined primarily by the rheology (e.g. melt viscosity) of the resin and the dimensions of the mold, and can range from 5 to 5,000 psi.

This process can be used to form a superhydrophobic surface onto any arbitrarily shaped object that can be produced by molding. By applying the particles selectively to the mold surface, specific regions of the molded part can be made superhydrophobic whereas other regions can be hydrophobic or hydrophilic, depending upon the base polymer used.

One application that would benefit from this disclosure is the production of EPDM rubber roofing. Large area sheets of rubber resin combined with a cross-linking agent and appropriate filler materials are extruded into a film. This extruded B-staged rubber could be coated with nanoparticles, then heated under pressure to both cure the rubber and bond the nanoparticles to the rubber surface. During this heating step, the rubber could be pressed against a template that is textured so that the superhydrophobic surface has a texture which imparts abrasion resistance (as described in our previous patents). By incorporating particles that can effectively scatter light (both in the B-stage rubber as well as onto the mold surface) the roofing membrane will be useful as a "cool roofing" material as it would scatter/reflect light, preventing sunlight from being absorbed and heating the roof and, ultimately, the interior of the building. A commercial roof would be prepared by overlapping layers of the roofing membrane. An adhesive is used to bond the two layers together. This approach would be advantageous as the adhesive would be formulated to wet and bond strongly to the superhydrophobic surface forming a strong, water-tight seal. The roughness created during the membrane fabrication process would enhance adhesive bond strength.

Application—Tires

Another application that would benefit from this disclosure is the production of tires. In particular, the inside surface of the treads could be made to be superhydrophobic. One purpose of the treads is to eject water as quickly and efficiently as possible to avoid hydroplaning. However, tread area should be minimized to provide adequate adhesion between the tire and road surface and so insure good handling and traction. To balance these competing needs, a superhydrophobic tread could be used. For a given size tread, the superhydrophobic surface would shed water more efficiently. Alternatively, a more narrow tread could be used while shedding a quantity of water comparable to the original tread design. The nanoparticles could be coated only into the tread areas of the mold to make a tire with a conventional rubber surface which comes into contact with the road while creating superhydrophobic treads that are recessed and so would not contact the road surface directly. This technology may be especially useful for automobile racing tires. The process may be readily transferred to industrial applications as the process is compatible with current tire manufacturing processes and the material costs are low.

Application—Insulator Components

Another application that would benefit from this disclosure is the production of high voltage insulator components (HVIC). In particular, the surface of the HVIC could be made to be superhydrophobic. Water droplets on the HVIC could lead to leakage current, local heating, dry band arcing and eventually flashover, resulting in serious damage to hardware. Superhydrophobic treated HVIC could shed off water droplet extremely fast by bouncing, rolling, slipping or even automatically jumping due to the energy releasing during merging of two droplets. Therefore, for a given area, the superhydrophobic surface would shed water more efficiently, thus could increase the expectancy life of the HVIC. The process may be readily transferred to industrial applications as the process is compatible with current manufacturing processes and the material costs are low.

EXAMPLES

Example 1

Fabricating Polymer Sheets Having a Superhydrophobic Surface by Using a Template Materials, methods and surface fabrication: A commercially available thermoplastic sheet of low density polyethylene (LDPE) manufactured by Berry Plastics (Evansville, Ind.) from 97% recycled polyethylene, 2% calcium carbonate and 1% slip oleamide and sold through McMaster-Carr was used as the polymer substrate. The thickness of the LDPE film was 100 micrometers and 10 layers of the LDPE film were used at each time to make free-standing superhydrophobic sheets that were approximately 1 mm thick. The polymer film softens at 106° C. and melts over the range from 1 13-120° C. Three types of stainless steel mesh (i.e., M1, M2, and M3) and one type of nylon mesh (i.e., M4) (all from McMaster-Carr) with different wire diameters and pore sizes were used as templates. The structures and details of the mesh are shown in Table 1 below.

TABLE 1

Parameters of mesh templates for fabricating superhydrophobic surfaces.

| Mesh NO. | Wire Diameter 1 (µm) | Wire Diameter 2 (µm) | Square pore side length (µm) | Open Area (%) |
|---|---|---|---|---|
| M1, 325 mesh | 28 | 28 | 50 | 41 |
| M2, 400 mesh | 25 | 25 | 38 | 36 |
| M3, 200 × 1400 mesh | 71 | 41 | 10 | 2 |
| M4, 371 mesh | 33 | 33 | 36 | 28 |

The procedure for fabricating superhydrophobic surfaces involved two processing steps. In the first step, a stack of LDPE sheets and a mesh template are laminated together under heat and pressure with the targeted polymer surface facing the mesh template. The stack-up was heated above its softening temperature under pressure for 3-30 minutes. The laminated stack was then cooled to 25° C. In the second step, the mesh template was separated from the polymer film by peeling. The superhydrophobic surface was formed and exposed during the peeling process. As the LDPE did not adhere to the stainless steel or Nylon mesh, the template could be reused. The fabrication conditions of the above process are summarized in Table 2.

TABLE 2

Fabrication conditions for surface 1-4 and their superhydrophobic properties.

| Surface # | Mesh # | Lamination Conditions | | | Peel Temp ° C. | Superhydrophobicity | | | |
|---|---|---|---|---|---|---|---|---|---|
| | | Temp ° C. | Pressure kPa | Time Min | | $\theta_{Static}$ | $\theta_{Adv}$ | $\theta_{Rec}$ | $\theta_{Slip}$ |
| S1 | M1 | 115 | 1400 | 30 | 25 | 125° | — | — | — |
| S2 | M1 | 120 | 1400 | 30 | 25 | 160° | — | — | 3° |
| S3 | M1 | 125 | 1400 | 3 | 25 | 160° | — | — | 5° |
| S4 | M2 | 125 | 69 | 15 | 25 | 160° | 163° | 155° | 5° |
| S5 | M3 | 125 | 69 | 15 | 25 | 158° | — | — | 3° |
| S6 | M4 | 125 | 69 | 15 | 25 | 160° | 162° | 157° | 5° |

Figure 19:
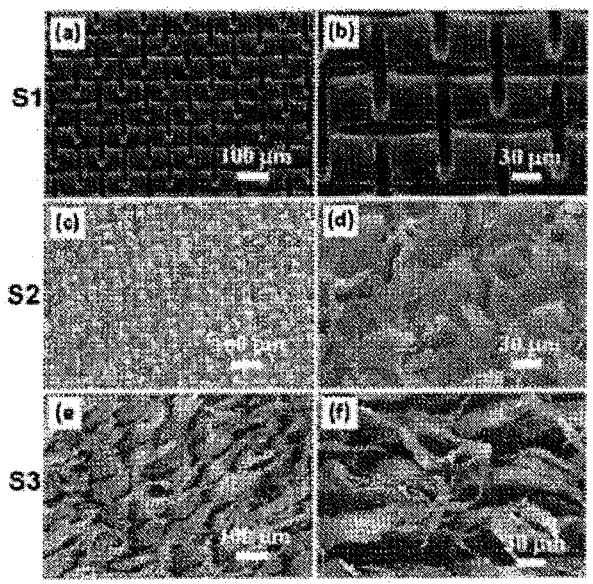
Figure 20:
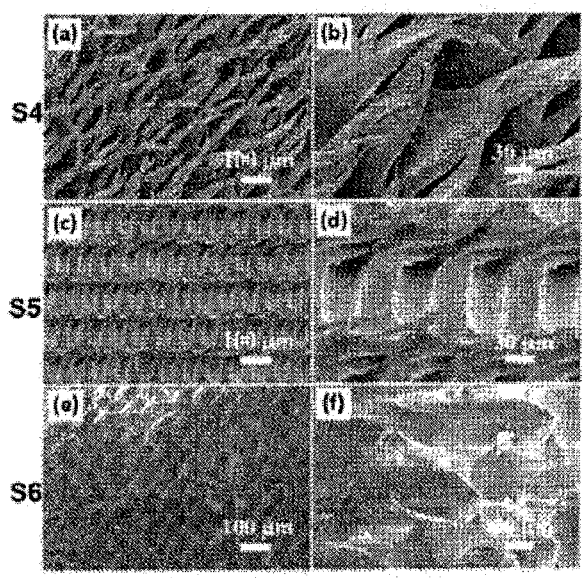
FIG. 20 illustrates six panels (a-f) of SEM images of surfaces fabricated in Example 1 by using different mesh templates at the same lamination temperature and pressure: (a,b) surface S4 made from mesh 2 (M2), (c,d) surface S5 made from mesh 3 (M3), and (e,f) surface S6 made from mesh 4 (M4). Panels b, d, and f are the higher magnifications of panels a, c, and e, respectively.

Characterization: The surface structures were studied by field emission scanning electron microscopy (FESEM, Amary) and optical microscopy (Nikon-SMZ 1500 and Laborlux-12ME). The SEM images are shown in FIG. 19 and FIG. 20.

The static contact angles (CAs) and roll-off angle were measured with a goniometer (250-F1, Rame-Hart Instruments Co). Droplets of distilled water, with a volume of 2-5 microliters, were placed gently onto the surface at room temperature and pressure. The static CA and advancing and receding CAs were measured five times at different locations such that the measurement variance was ±2°. The slip-off angle was determined by measuring the substrate angle at which water droplets (about 10 microliters,) placed on the surface with a micro syringe needle would roll-off the surface. The results are summarized in Table 2. As shown in Table 2, surfaces S2-S6 were superhydrophobic surfaces having a water contact angle ranging from 158-160° and a water slip-off angle less than 5°. Without wishing to be bound by theory, it is believed that S1 did not form a superhydrophobic surface because the lamination temperature was not sufficiently high to allow the mesh template to be fully embedded into the LDPE. Since the polymer did not flow through the pores of the mesh, the polymer was not stretched and torn when the mesh was peeled off the polymer. As a result, the aspect ratio of the embossed features is not sufficient to create roughness adequate to exhibit superhydrophobicity.

Figure 21:
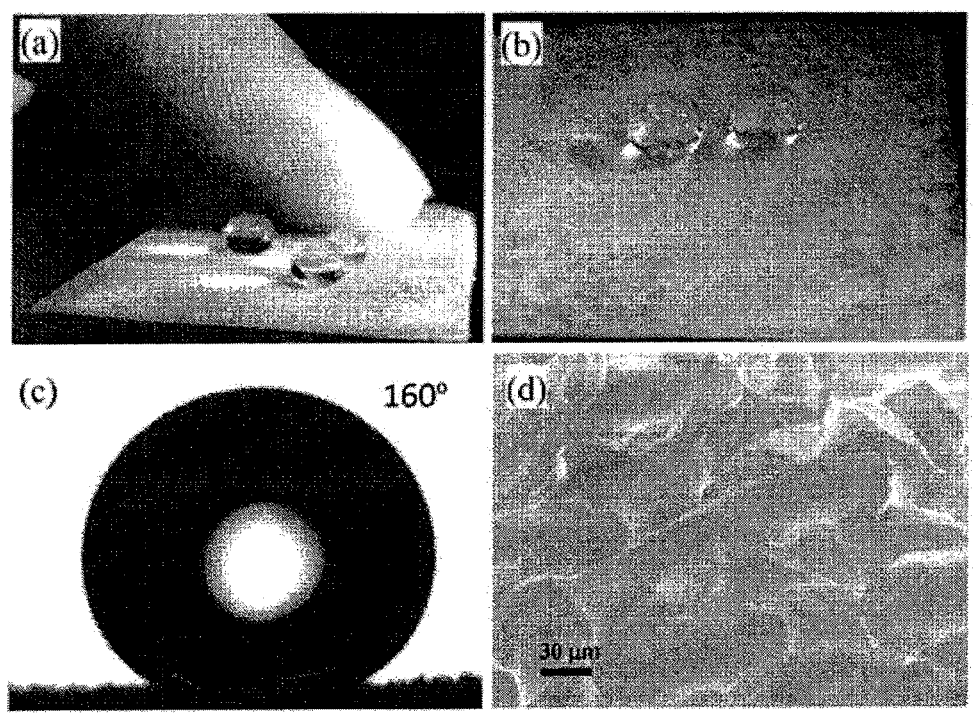
FIG. 21 illustrates four images (a-d) of surface S6 in Example 1 after manual abrasion testing: (a) being an image of S6 touched with a bare finger, (b) being an image of water droplets on a partly dried surface S6 after a multi-step manual test, (c) being an image of water contact angle of surface S6 after the same multi-step manual test, in which the surface was rinsed with water and dried before measuring, and (d) being a SEM image of the surface structure of S6 after the same multi-step manual test, in which the surface was rinsed, dried and coated with gold before imaging.
Figure 22A:
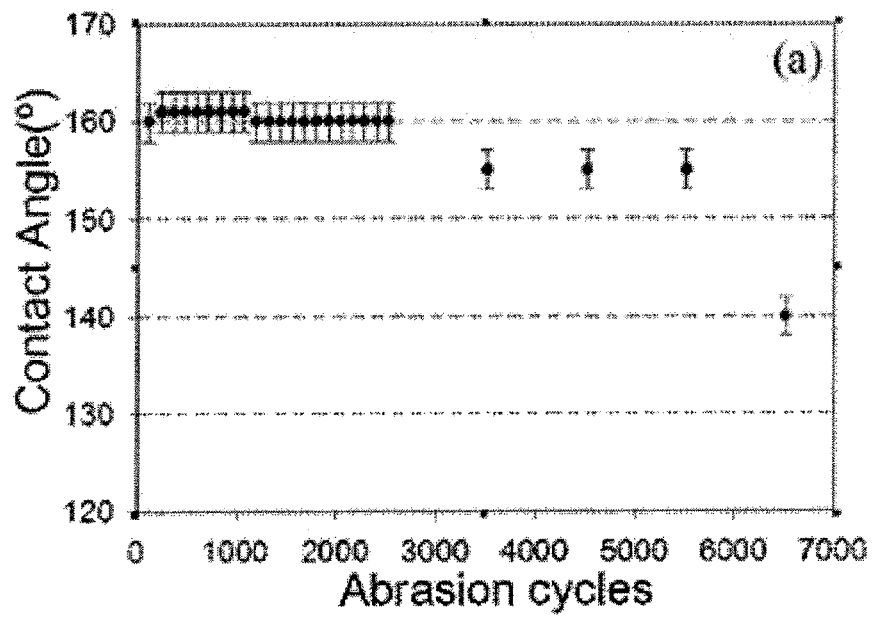
FIG. 22A is a graph showing that the water contact angle of superhydrophobic surface S4 in Example 1 as a function of abrasion cycles using the Taber reciprocating abraser under a pressure of 32.0 kPa.
Figure 22B:
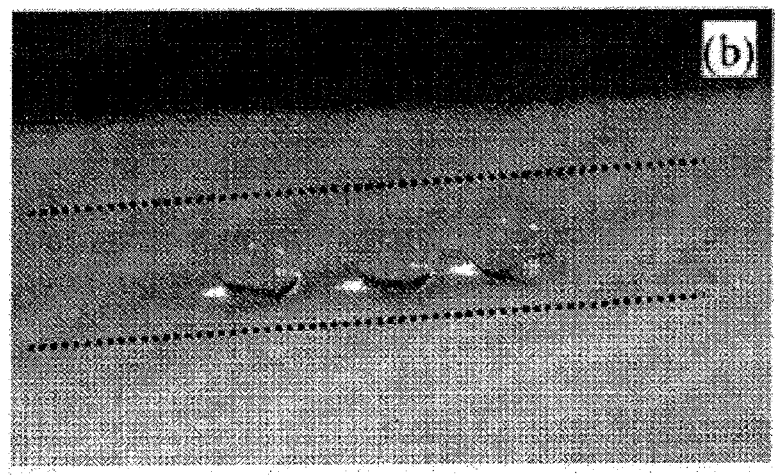
FIG. 22B is an image of water droplets on surface S4 after 2000 cycles of mechanical abrasion testing. The abrasion region lies between the two parallel dashed lines.

Abrasion tests: First, the surfaces S2-S6 were assessed qualitatively by simply pressing with a bare hand. It was found that the superhydrophobicity of surfaces S2 and S5 decreased dramatically as water droplets were pinned in the touched area, while the superhydrophobicity of surfaces S3, S4 and S6 remained unchanged after pressing with a bare hand as shown in FIG. 21, panel (a) (surface S6). Without wishing to be bound by theory, it is believed that the relative lack of stability of surfaces S2 and S5 may be due to the fact that S2 had relatively thin petal-like features, whereas S5 had a very low concentration of small features. By contrast, without wishing to be bound by theory, it is believed that surfaces S3, S4 and S6 had a superior stability as they had a higher surface density of larger, higher aspect ratio features.

The chemical and abrasion resistance of surfaces S4 and S6 was then studied further using a manual, multi-step test that includes a sequence of four steps: (1) dry abrading firmly with a gloved hand (Showa Best Glove part#6005PF) using a back and forth movement for 50 times, (2) dry abrading firmly with a hand wearing an industrial cotton glove back and forth for 50 times, (3) wet scrubbing manually with a gloved finger for 1 hour (20 cycles @ 2-4 minutes/cycle) with a saturated industrial cleaner solution (ALCONOX—Powdered Precision Cleaner, containing 7-13% sodium carbonate, 10-30% sodium dodecylbenzenesulfonate, 10-30% tetrasodium pyrophosphate, and 10-30% sodium phosphate), and (4) ultrasonicating in the same saturated industrial cleaner solution for 5 hours (Branson 1200 ultrasonic cleaner, −150 watts). After this sequence of tests, the surfaces were rinsed with tap water and dried with filtered dry compressed air. Unexpectedly, the superhydrophobicity of surfaces S4 and S6 remained unchanged. As shown in FIG. 21, panel (b), two water droplets maintained a spherical shape on surface S6, which had been only partially dried with compressed air after testing. The static water contact angles of surfaces S4 and S6 remained essentially unchanged as shown in FIG. 21, panel (c). The slip-off angles of 10 microliters, water droplets on surfaces S4 and S6 increased slightly from 5° to 10°. Without wishing to be bound by theory, it is believed that the increased slip-off angle may result from a partial disordering of the polymer protrusions after these abrading and scrubbing tests as shown in FIG. 21, panel (d). The disorder would result in protrusions of varying heights and therefore at least some protrusions may be partially wetted by water droplets.

A mechanized abrasion test was conducted with a Taber model 5900 reciprocating abraser using a CS-8 WEAR-ASER abradant to measure the abrasion resistance of surface S4. The following conditions were used for the abrasion test: the stroke length was 4 cm, the abrasion linear speed was 8 cms 1, and the applied pressure was 32.0 kPa (4.64 psi). The change in static contact angle on surface S4 with increasing abrasion cycles is shown in FIG. 17A. As seen in this figure, the static contact angle remained essentially unchanged at 160° over the first 2520 abrasion cycles and then decreased slowly to 155° with increasing cycles. The slip-off angle remained unchanged after 2520 cycles and increased slowly with increasing abrasion cycles. After 5520 cycles, water droplets on the surface still appear as transparent balls (as shown in FIG. 17B. When the total number of abrasion cycles was increased to 6520, the contact angle decreased to 140° and then maintained this level with further abrasion cycles. Both the manual multi-step test and the mechanized reciprocating test demonstrate that the superhydrophobic surfaces possess good mechanical and chemical stability as well as excellent abrasion resistance.

Water pressure stability test: The water pressure stability of surface S2 was tested as follows: A piece of the fabricated superhydrophobic polymer sheet with a size of 25 mm×38 mm was placed inside a Nordson-EFD polypropylene syringe barrel, immersed in water, and capped with a piston. The syringe was then pressurized, using a Nordson-EFD regulated dispenser. The reflectivity at the interface between water and the superhydrophobic surface was monitored visually and recorded using a digital camera. After the pressure was relieved, the sample was removed from the water filled syringe and the wetting properties of the surface were measured using optical microscopy (Nikon-SMZ 1500 and Laborlux-12ME).

The results showed that, the reflectivity remained relatively stable to 140 kPa of applied pressure, but the reflected intensity gradually became weaker with increasing pressure. The reflective interface significantly faded when the applied pressure was increased to 550 kPa over a period of 90 seconds. In addition, the results show that, at a lower pressure of 55 kPa (i.e., 8 psi or the pressure at a depth of 5.6 m of water), surface S2 remained completely dry when it was removed after 5 hours of under-water immersion. In sum, the water pressure stability of the superhydrophobic surfaces described herein is significantly better than that of lotus leaves, as well as other reported polymeric superhydrophobic surfaces.

Example 2

Fabricating Polymer Sheets Having a Superhydrophobic Surface by Using a Porous Nanoparticle Layer Ultra-high-molecular-weight polyethylene (UHMWPE, McMaster Carr, Elmhurst, Ill.), was used as the polymer substrate as it is a well-known tough material with high abrasion resistance, a high level of crystallinity (up to 85%), and the highest impact strength of any thermoplastic polymer. In addition, the high melt viscosity limits the infiltration of the UHMWPE into the porous nanoparticle layer, thereby minimizing the number of particles engulfed (i.e., fully embedded) into the polymer during the lamination process. Experiments were conducted to characterize the effect of the lamination pressure on the morphology and wetting properties of UHMWPE nanocomposite surfaces prepared by the percolative infiltration of the polymer into the porous nanoparticle layer A total of nine samples were prepared under different conditions. Sample 1 was an original, untreated UHMEPE sheet. Sample 2 was made by heating a UHMWPE sheet to 154.4° C. for 30 minutes to melt the crystalline polymer without applying any pressure, and then cooling it to room temperature in air. Sample 3 was made by heating a UHMWPE sheet covered by a layer of nanoparticles (3 mm thick) to 154.4° C. for 30 minutes without applying any pressure, and then cooling to room temperature in air. Samples 4-9 were made by heating a UHMWPE sheet covered by a layer of nanoparticles (3 mm thick) to 154.4° C. for 30 minutes while being laminated under a pressure of 83 psi, 830 psi, 3,000 psi, 5,000 psi, 8,000 psi and 13,000 psi, respectively, and then cooling it to room temperature in air.

Figure 23:
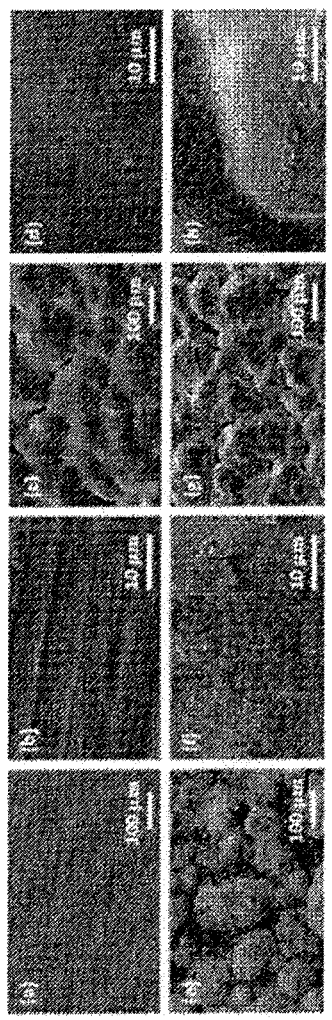
Figure 24:
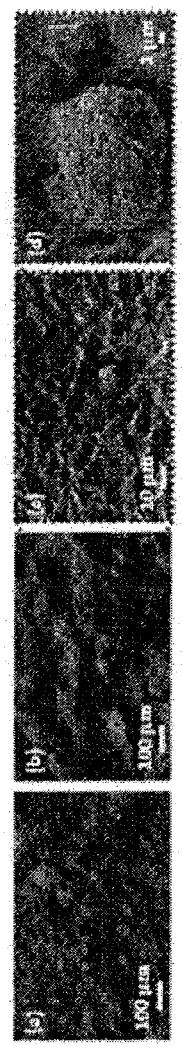
FIG. 24 depicts four panels (a-d) of SEM images of Sample 4 in Example 2 in which a polymer sheet and a layer of nanoparticles were laminated under a pressure of 83 psi: before (a) and after (b, c, and d) being etched with a 49% HF acid. Panel c is a higher-magnification view of panel b and panel d is the higher-magnification view of panel c.
Figure 25:
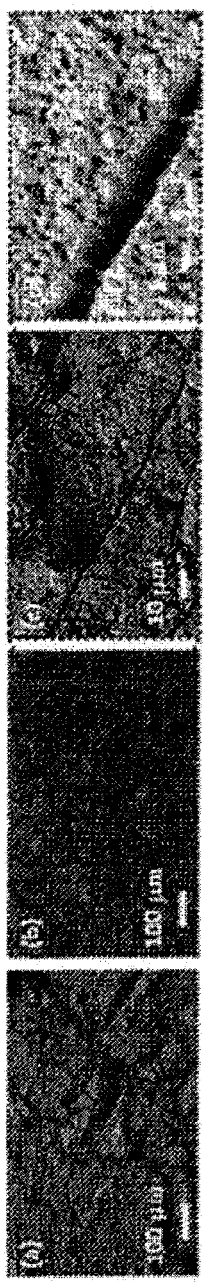
FIG. 25 illustrates four panels (a-d) of SEM images of Sample 8 in Example 2 in which a polymer sheet and a layer of nanoparticles were laminated under a pressure of 8000 psi: before (a) and after (b, c, d) being etched with a 49% HF acid. Panel c is the higher-magnification view of panel b and panel d is the higher-magnification view of panel c.

The lamination conditions and hydrophobic properties of these samples are shown in Table 3. The SEM images of the polymer sheet formed in Samples 1-4 and 8 are shown in FIGS. 23-25.

TABLE 3

Water contact angles and slip-off angles on different samples

| Samples# and Conditions | Water contact angle | Slip-off angle of droplets of 8 µL |
|---|---|---|
| 1. Original UHMW PE | 105 ± 2° | Not slip, |
| 2. Heating and Cooling | 123 ± 2° | Not slip, |
| 3. Heating and Cooling under the covering of Nanoparticles | 153 ± 2° | 30° ± 2° |
| 4. Laminating at 83 psi | 170 ± 2° | ~0 |
| 5. Laminating at 830 psi | 170 ± 2° | ~0 |
| 6. Laminating at 3000 psi | 170 ± 2° | ~0 |
| 7. Laminating at 5000 psi | 170 ± 2° | ~0 |
| 8. Laminating at 8,000 psi | 149 ± 2° | 25° ± 2° |
| 9. Laminating at 13,000 psi | 135 ± 2° | Not slip |

As shown in FIG. 23 panels (a) and (b), the original untreated UHMWPE substrate in Sample 1 was relatively flat with striations from the extrusion process remaining on the surface. The surface became more highly structured after heating in Sample 2 as shown in FIG. 23, panels (c) and (d). The recrystallization of UHMWPE occurred under these conditions, forming micro bumps on the order of 100 microns as shown in these figures. Static water contact angles on Samples 1 and 2 were 105±2° and 123±2°, respectively. The higher static water contact angle for the heat treated surface was consistent with increased roughness based on the Wenzel equation known in the art. As shown in Table 3, small water droplets could not slip off the surface of either Sample 1 or 2. Thus, no superhydrophobicity was observed for these two samples and their surfaces could be fully wetted.

In Sample 3, a layer of hydrophobic silica nanoparticles (TS 530, Cabot Corporation) was used to cover the polymer substrate and the assembly was heated using the same conditions as those used in treating the neat UHMWPE substrate in Sample 2. As shown in FIG. 23 panels (e) and (f), the nanoparticles decorated the polymer substrate after heating. A surface structure similar to the uncoated polymer was observed, however nanoparticles created an additional fine-scale roughness. Indeed, the underlying polymer micro-texture was revealed by removing the nanoparticles by etching in a 49% HF for 8 hours. As shown in FIG. 23 panels (g) and (h), UHMWPE not coated with nanoparticles showed a similar micro-texture to that observed in the UHMWPE not coated with nanoparticles (comparing FIG. 18 panels (c) with 11(g)), while the presence of nanoparticles created a layer of fine-scale roughness (comparing FIG. 23 panels (d) and (h)). Thus, even without applied pressure, percolative infiltration of UHMW PE into nanoparticles could be observed. As a result, Sample 3 exhibited superhydrophobicity as evidenced by a water contact angle of 153±2°, but some wetting could occur in Sample 3 as small water droplets could not slip off the surface.

To further investigate the effect of process conditions of the percolative infiltration of UHMWPE into nanoparticles for the control of hierarchical surface structures, pressure was applied during heating. SEM images of samples made under different pressures are shown in FIGS. 24 and 25. The same method of wet etching was applied to remove the nanoparticles after lamination so as to more clearly observe the underlying polymer structures. At a relatively low pressure of 83 psi, micro bumps (on the order of 100 microns) that formed during the recrystallization of UHMWPE could still be detected on the surface in Sample 4 (FIG. 24 panel (a)). However, any micro-cracks were effectively eliminated. After etching away the embedded nanoparticles, micro bumps on the order of 10 microns with fine nano-structures were revealed (as shown in FIG. 23, panels (b)-(d)). This nanostructure was far more extensive than that observed when no pressure is applied (as shown in FIG. 23 panels (g) and (h)), indicating the enhanced percolation length of UHMWPE under pressure. The surface in Sample 4 prepared at 83 psi exhibited excellent superhydrophobic properties with a contact angle of about 170° and a slip-off angle of about 0°. Water droplets less than 5 could not be placed onto the surface from a steel micro syringe tip, and larger water droplets could easily slip off the surface. Similar properties were observed for Sample 5 prepared at 830 psi.

As shown in Table 3, polymer sheets prepared by lamination at 83 psi, 830 psi, 3000 psi, and 5000 psi (i.e., in Samples 4-7) exhibited the best superhydrophobic properties among the nine samples. Without wishing to be bound by theory, it is believed that further increasing the lamination pressure could increase the extent of polymer percolation into the porous nanoparticle layer and could force the nanoparticles to be fully embedded into the polymer sheet, thereby reducing the roughness (e.g., the micro-texture at a scale of about 100 microns) generated by the nanoparticles on the surface of the polymer sheet. As a result, at higher lamination pressures, the superhydrophobic properties of the polymer sheets began to become adversely affected with a decrease in the contact angle and an increase in the slip-off angle as shown in Table 3. Specifically, when the lamination pressure was increased to 8,000 psi, solid blocky structures were formed on the surface of the polymer sheet in Sample 8 as shown in FIG. 25 panel (a). After removing the silica particles by etching with hydrofluoric acid, a relatively flat surface with fine pore structures were detected. See FIG. 25 panels (b)-(d). Although these surfaces exhibited hierarchical structures with a sub-micron scale roughness, they did not exhibit superhydrophobicity. As shown in Table 3, the water contact angles of the surface of the polymer sheets in Samples 8 and 9 were lower than 150° and water droplets could not readily slip off the surfaces of these two samples.

The above characterization study demonstrated that the percolative infiltration of polymer into porous nanoparticles can produce superhydrophobic surfaces by creating a multi-level, hierarchical roughness layer on the surface of the polymer. Without wishing to be bound by theory, the levels of roughness could arise from the nanoparticles and nanoparticle agglomerates (e.g., having a length scale of 20-200 nm) to nanoparticle coated polymer filaments formed during the percolative infiltration process (e.g., having a length scale of 1-10 microns) and polymer micro-textures (micro-moguls) formed during relaxation and recrystallization of the polymer substrate (e.g., having a size about 100 microns). Moreover, the process conditions could have a significant effect upon the microstructure and thus the wetting properties of the surface.

Example 3

Dynamic Water Pressure Resistance Test

A superhydrophobic polymer sheet was prepared using low density polyethylene (approximately 10 layers where each layer was 0.005" thick). The polymer sheet was placed on a steel plate and put into a press. The polymer sheet was then heated at 123° C. under a pressure of approximately 30 psi to form a polymer sheet approximately 1 mm thick. This polymer sheet was subsequently cooled. A layer of silane treated silica nanoparticles (Cabot TS-530) was placed on a piece of paper to make a uniform layer approximately 100 microns thick. The particle coated paper was placed on a lower steel plate. After the 1 mm polymer sheet was placed on the particles, an upper steel plate was placed on top of the polymer sheet. The entire stack-up was placed into a press and heated at 123° C. at –30 psi for –20 minutes. The press was then opened and the sample was allowed to cool to room temperature.

Water droplets (5 mm diameter) were released from a height of 8.5 meters onto a free-standing superhydrophobic film and the impact was recorded using a Phantom high speed camera from Vision Research at a frame rate of 20,000 frames/second. Impact velocity was estimated at 8.8 m/second based on the height and by tracking the droplet within individual video frames. The drop hit the surface, spread significantly then broke apart into numerous smaller droplets. The surface was not wetted by the drop and remained superhydrophobic after multiple impacts. In addition, pumping water onto the surface at a rate of 100 gallons/hour for 45 hours did not significantly degrade the surface properties. Similarly, the superhydrophobic properties were retained when the polymer sheets were ultrasonicated for 30 minutes in water.

Example 4

Test of a Superhydrophobic Surface Against Super-Cooled Water Droplets

Silica nanoparticles (Cabot TS-530) were dispersed in a solution of methanol and stirred. The solution was then dried at 150° C. and the particles were placed in the bottom of a steel plate with sidewalls to retain the particles. The thickness of this layer was approximately 3 mm. After a HDPE sheet having a thickness of approximately 0.01 inch was placed on the particles, a flat steel plate was placed on top of the polymer sheet. The stack-up was then laminated at 138° C. at a pressure of 300 psi for 30 minutes. The sample was removed from the press and allowed to cool to room temperature. The polymer was then removed from the nanoparticle layer and washed to remove any excess or loose particles.

The ability of the superhydrophobic surfaces of the polymer sheet described above to repel super-cooled water droplets was demonstrated using liquid water droplets 13 microliters in volume (3 mm in diameter) cooled to –5.1° C. A portion of the polymer sheet having a superhydrophobic surface prepared above was mounted onto a sloped aluminum block at a 20° angle relative to a horizontal surface. The temperature of the surface was controlled with a closed-loop refrigeration system capable of cooling the aluminum block to a temperature as low as –70° C. Deionized water in a 10 cc syringe with a stainless steel syringe tip was cooled to –5.1° C. using a Neslab chiller and kept at that temperature for 1 hour before use. Once the surface of the aluminum block was cooled to an appropriate temperature, the syringe was removed from the chiller, mounted at a location 11 cm above the surface, and the super-cooled droplets were allow to impinge upon the cooled surface. When the surface was cooled to temperatures as low as –32° C., a supercooled droplet would bounce off the surface without forming ice. By contrast, when an unprocessed polyethylene sheet was used, the super-cooled droplets froze onto the surface and ice began to accrete immediately after the droplet impinged on the surface.

The experimental results showed that the ability of a superhydrophobic surface to mitigate ice accumulation depended upon the temperature of the surface. Specifically, when the superhydrophobic surface was cooled to temperatures above –13° C., all super-cooled droplets were repelled and no ice was formed on the surface. At lower surface temperatures, however, ice began to accumulate after a certain number of droplets impacted the surface. When the surface was maintained at –32° C., the first 5 drops could bounce off the surface before ice began to accumulate. Below –40° C., all super-cooled droplets froze upon impact. In addition, the results showed that the icephobic properties of a superhydrophobic surface also depended upon droplet size. Ice formation began at higher temperatures when 50 microliters (about 5 mm diameter) droplets were used. Since the average super-cooled water droplet in the atmosphere is below 0.5 mm, ice accumulation is not expected to occur if the surfaces are maintained at normal atmospheric temperatures (e.g., above –32° C.). At these temperatures, superhydrophobic surfaces described herein would be especially resistant to ice accumulation.

Example 5

Test of a Superhydrophobic Surface Against Ice Accumulation

A superhydrophobic polymer film was made by laminating LDPE against a layer of nanoparticles (TS530) with a thickness of about 100 micrometers at 123° C. under a pressure of about 30 psi for 1 hour using the same process described in Example 3 except that a metal mat is placed between the lower plate of the press and the steel plate supporting the sheet of nanoparticles. The mat was used to distribute the pressure more uniformly, as is commonly done in plate lamination processing. A longer heating time was used as the mat impedes the conduction of heat from the plate to the polymer sheet. To test the icephobic properties of the superhydrophobic polymer film described above when exposed to small super-cooled liquid water droplets of average size (5-40 micrometers), the free-standing polymer film was placed on the windshield of a parked car overnight during an ice storm with its superhydrophobic surface exposing to air. Ice accumulated on all exposed surface of the windshield that was not covered by the polymer film. Although some ice did coat a portion of the polymer film, especially the edges, the central portion of the film remained ice-free. By contrast, a film made from untreated polyethylene that was also placed on the windshield was difficult to see as it became encrusted in ice.

Example 6

Fabricating Polymer Sheets Having a Superhydrophobic Surface by Using a Template Coated with a Porous Nanoparticle Layer In this example, a template was coated with dry particles before a polymer sheet was laid atop the template. A commercially available thermoplastic sheet of low density polyethylene (LDPE) manufactured by Berry Plastics (Evansville, Tenn.) and sold through McMaster-Carr was used as the polymer sheet. The polymer sheet contained 97% recycled polyethylene, 2% calcium carbonate and 1% slip oleamide. A nylon mesh with a pore diameter of 40 micrometers and a wire width of 40 micrometers was coated with silane treated nanoparticles (TS530, Cabot Corporation). During the coating treatment, the pores of templates were partially filled with the nanoparticles. The lamination of the polymer sheet with the template coated with nanoparticles was conducted at 123° C. under a pressure of 200 psi for 20 minutes. The cooling and peeling steps were the same as the procedures in Example 1.

The nanoparticles coated on the template generated rough nanostructures on the polymer posts after lamination resulting in surfaces which exhibited improved superhydrophobic properties, such as increased stability towards impinging water droplets compared to samples made in Example 1. By incorporating the nanoparticles, the static water contact angle of the fabricated surface increased from 160° to 165° and the slip-off angle of water droplets decreased down to 3°. Without wishing to be bound by theory, it is believed that surfaces prepared from nanoparticle-coated templates have three levels of roughness. Two roughness levels are similar to those surfaces made in Example 1, albeit less well defined, and correspond to the pores in the template and the filaments used to weave the template. A third level of nano-roughness is added upon these features from the nanoparticles. The nanoparticles were either incorporated into the polymer surface, or create grooves into the surface during the lamination-peel process.

Quantitative testing demonstrated that the superhydrophobicity of the surface prepared above remained unchanged after washing numerous times with a saturated soap solution made with a soap powder (ALCONOX—Powdered Precision Cleaner, from VWR International, containing 7-13% sodium carbonate, 10-30% sodium dodecylbenzenesulfonate, 10-30% tetrasodium pyrophosphate, and 10-30% sodium phosphate) or ultrasonication in the same solution for 5 hours. The results showed that the superhydrophobicity of the fabricated surface possessed good stability under high water pressures. Static pressure tests demonstrated that the superhydrophobic surface remained dry even under a water pressure of 8 psi (5.6 m water) for more than 5 hours, showing a significantly greater water pressure resistance than that of a lotus leaf.

Example 7

Fabricating Polymer Sheets Having a Superhydrophobic Surface by Using a Template Coated with a Porous Nanoparticle Layer and a Polymer Sheet Coated with a Layer of Porous Nanoparticle Layer The same Ultra-high-molecular-weight polyethylene (UHMWPE, McMaster Carr, Elmhurst, Ill.) used in Example 2 was used as the polymer sheet. A steel mesh with a pore size of 309 micrometers and a wire diameter of 114 micrometers was used as the template. First, a thixotropic solution was prepared by dispersing silane-treated hydrophobic nanoparticles (e.g. TS-530 from Cabot Corporation) into an appropriate solvent (e.g. a mixture of 30 wt % water and 70 wt % methanol). Subsequently, the polymer sheet and the mesh template were coated with the prepared solution and dried at 150° C. for 10 minutes. The thickness of the nanoparticles on the polymer sheet was around 150 micrometers. The coated mesh and the coated polymer sheet were placed between two flat stainless steel plates. The assembly was then laminated at 200° C. and under a pressure of 800 psi for 2 hours. During lamination, the polymer melted and infiltrated the pores between nanoparticles coated on the polymer. With reduced viscosity, the polymer penetrated into the pores of the templates, forming micron sized patterns (0.5 to 10 microns) on the surface of the polymer sheet. As the polymer cooled, a micro-textured roughness is formed to which particles strongly adhered.

The fabricated UHMW PE superhydrophobic surface exhibited excellent water repellency. The static water contact angle was higher than 170° and the slip-off angle of 10 microliters water droplets was just above 0°. The polymer surface maintained its superhydrophobicity with a water contact angle of 155° after 100,000 abrasion cycles under a pressure of 32 kPa using the mechanized abrasion test described in Example 1. Moreover, the superhydrophobic surface exhibited excellent scratch resistance. Specifically, water droplets maintained a contact angle higher than 160° after the surface was scratched 50 times using a sharp steel nail.

Example 8

Superhydrophobic Polymer Composite Materials with Self-Cleaning Properties and Photo-Induced Wetting and Dewetting Properties A commercially available thermoplastic sheet of high density polyethylene (HDPE) from McMaster-Carr was used as the polymer substrate. A precision woven nylon mesh (371×371, from McMaster-Carr) was used as the template to create microstructures on the polymer surface. The wire diameter and the pore size of the nylon mesh were 33 micrometers and 36 micrometers, respectively. $TiO_2$ nano particles (from Sigma-Aldrich) with a size ranging from 20-100 nm were used to create nanostructures on the polymer surface. According to the supplier, the phase of the $TiO_2$ particles was a mixture of rutile and anatase. The hybrid photocatalytic-superhydrophobic surfaces were fabricated using Method 3 described above. The thickness of the $TiO_2$ particles layer was about 100 micrometers, and the thickness of the HDPE polymer sheet was 0.03 inch. The stack-up was heated up to 138° C. under a pressure of 4000 psi for 30 min. In the second step, the mesh template is separated from the polymer film. The laminated stack was cooled to room temperature (25° C.) and then the mesh was separated from the polymer surface. The fabricated superhydrophobic surface is formed and exposed during the peeling process.

The fabricated superhydrophobic surfaces were mounted on a movable stage driven by a motor at a speed of 1 mm·per sec. The tilt angle of the surface was fixed at 13°. Water droplets were pumped out using a syringe pump (from KD Scientific Syringe Pump Company) at speeds ranging from 1-8 microliters per·sec. The distance between the surface and tip was adjusted from 5-100 mm. Both coarse $Al_2O_3$ grit with a size ranging from 50-130 micrometers and fine carbon powders with an average size of 1 micrometers were used as test contaminates. The self-cleaning process was recorded by a high speed camera (EX-FH25, Casio) at 120 frames per second.

UV light was generated by a UV spot lamp (Bluewave 200, Dymax). The wave length of the UV light ranged from 320 nm to 450 nm with a peak of 365 nm. The change of the CA with the UV illumination time was monitored. The surface after UV illumination was heated at 105° C. for 1.5 h for recovery.

The thermal properties of the HDPE were tested by Differential scanning calorimeter (DSC). The surface structures were studied by field emission scanning electron microscopy (FESEM, Amary) and optical microscopy (Nikon-SMZ 1500 and Laborlux-12ME). The static CAs and slip-off angle were measured with a goniometer (250-F1, Rame-Hart Instruments Co). Droplets of distilled water, with a volume of about 5 microliters, were placed gently onto the surface at room temperature and pressure. The static CA, advancing and receding CAs were measured five times at different locations such that the measurement variance was ±2°. The slip-off angle was measured by placing water droplets of about 10 microliters on an initially horizontally substrate and then tilting the substrate until the water droplet rolled off the surface. The distribution of $TiO_2$ particles on the fabricated surfaces were detected by energy-dispersive X-ray spectroscopy (EDX) at a scanning voltage of 10 KV.

Figure 26:
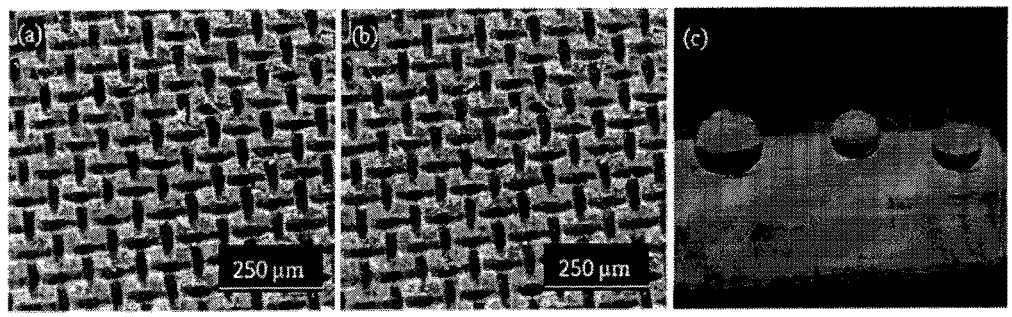
FIG. 26 illustrates three images (a-c) of an exemplary surface.

The surface structure is shown in FIG. 26. The raised areas were created when the polymer flowed into the pores of the mesh. The recessed areas were formed as the wires of the mesh were forced into the polymer substrate. The pitch of the posts structures is about 65 micrometers. To investigate the concentration of the $TiO_2$ nanoparticles and their distribution on the surface, the technique of energy-dispersive X-ray spectroscopy (EDX) was used for directly mapping the nano $TiO_2$ particles on the surface. The surface was coated with carbon to improve the conductivity of the surface for imaging. As shown in FIG. 26, panel b, the nano $TiO_2$ particles are mainly dispersed on the posts, and a very few of $TiO_2$ particles can be detected at the bottom grooves surrounding the posts. Although the surface was pre-coated with carbon for imaging, the detected weight ratio of Ti element to C element is about 37:53, indicating a high concentration of nano $TiO_2$ particles on the posts. It is estimated that the nano $TiO_2$ particles covered about 20% area of the top surface of each post. As shown in FIG. 26, panel c, water droplets with different volumes beads up on the surface, forming a sphere shape, indicating an excellent superhydrophobicity.

Figure 27:
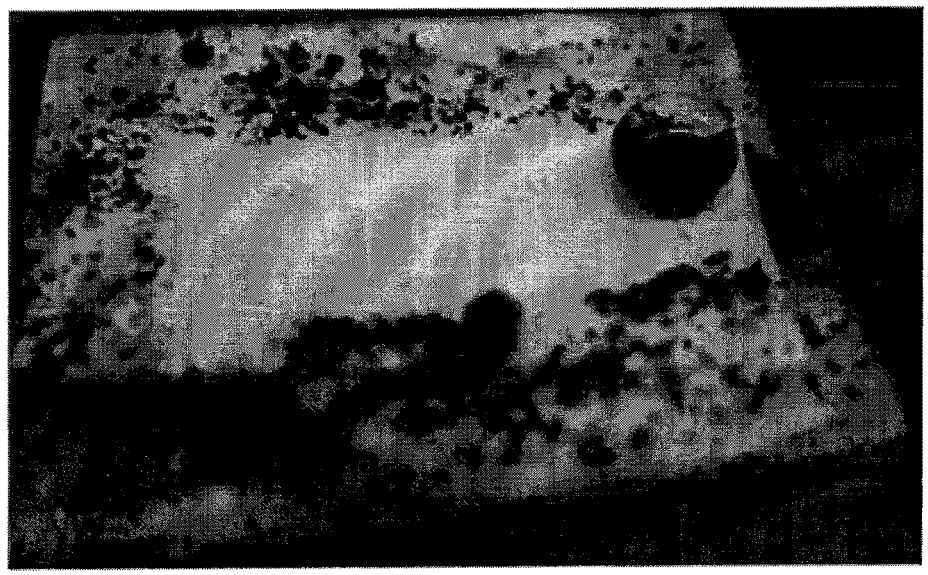
FIG. 27 is an image of an exemplary surface.

The self-cleaning effect of the fabricated hydrophobic-hydrophilic surface was demonstrated using two types of test contaminant particles: coarse $Al_2O_3$ grit with a size ranging from 50-130 micrometers and fine carbon powders with an average size of 1 micrometers. As shown in FIG. 27, the black carbon particles were absorbed into water droplets as the droplets rolled along the tilted substrate. As the substrate was translated across the syringe pump outlet, the carbon particles were removed and the surface was cleaned. This result demonstrated that the hydrophilicity of the $TiO_2$ particles did not impede the self-cleaning effect when using water to remove inorganic particles. The self-cleaning effect on a superhydrophobic surface mainly depends on the ability of water droplets to roll easily across the surface and not be bound to the surface where the droplets could evaporate, concentrating the particles. Before this experiment was conducted, the hydrophilic regions could have been expected to contribute a force for binding the water to the solid surface. However, this did not occur to any significant extent, and so the self-cleaning effect was observed.

One unique feature of this hydrophilic-hydrophobic patterned nanocomposite surface is that it exhibits reversible wettability. After the surface is fabricated, the surface exhibits good superhydrophobic properties. However, upon exposure to UV light, the superhydrophobic properties are degraded and eventually lost, depending upon UV does. Superhydrophobicity was restored after heating the surface at 105° C. for 1.5 hours. The original water CA of the fabricated surface was measured to be 158°; after UV illumination at a powder density of 50 mW per square cm for 30 min with water introduced on the surface, the CA was reduced 120°. The decrease of the CA is caused by the photo induced hydrolysis of the $TiO_2$ nanoparticle surface. The basic photochemical reactions on $TiO_2$ are outlined in equations 1-4. Electrons ($e^-$) and positive holes ($h^+$) are generated on the surfaces under UV illumination. Water molecules absorbed by the solid surface or from the surrounding air would react with the positive holes, and the oxygen molecules could react with the electrons. Both of the two reactions greatly contribute to enhancing the hydrophilicity of the photocatalyst surface by facilitating the hydrolysis of the $TiO_2$ surface. The ions and radicals formed in the presence of $TiO_2$ are capable of oxidizing organic compounds as well as deactivating plants and organisms. The schematics of the changes of hydroxyl groups on $TiO_2$ film under UV light irradiation and in the dark is shown below.

$$TiO_2 + h\nu \longrightarrow TiO_2 (h^+ + e^-) \quad (1)$$

$$TiO_2(h^+) + H_2O \longrightarrow TiO_2 + OH\bullet + H^+ \quad (2)$$

$$TiO_2(e^-) + O_2 \longrightarrow TiO_2 + O_2^- \quad (3)$$

$$O_2^- + H^+ \longrightarrow HO_2\bullet \quad (4)$$

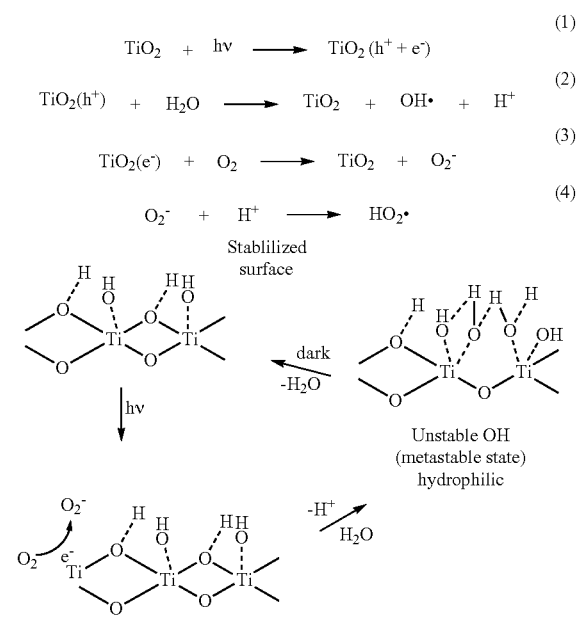

Figure 28:
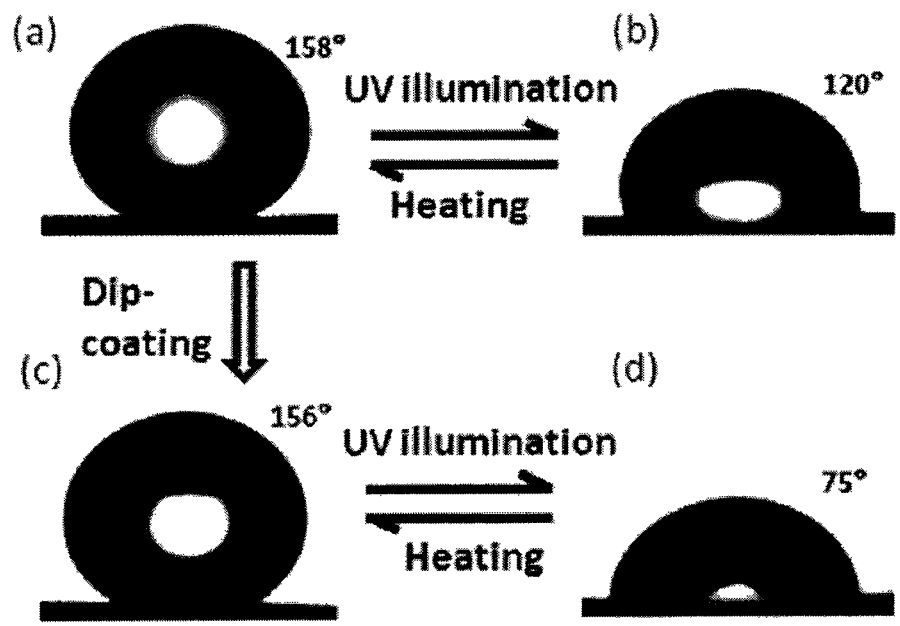
FIG. 28 depicts contact angle being altered under certain conditions while FIG. 29 provide XPS data concerning this alternation.
Figure 29:
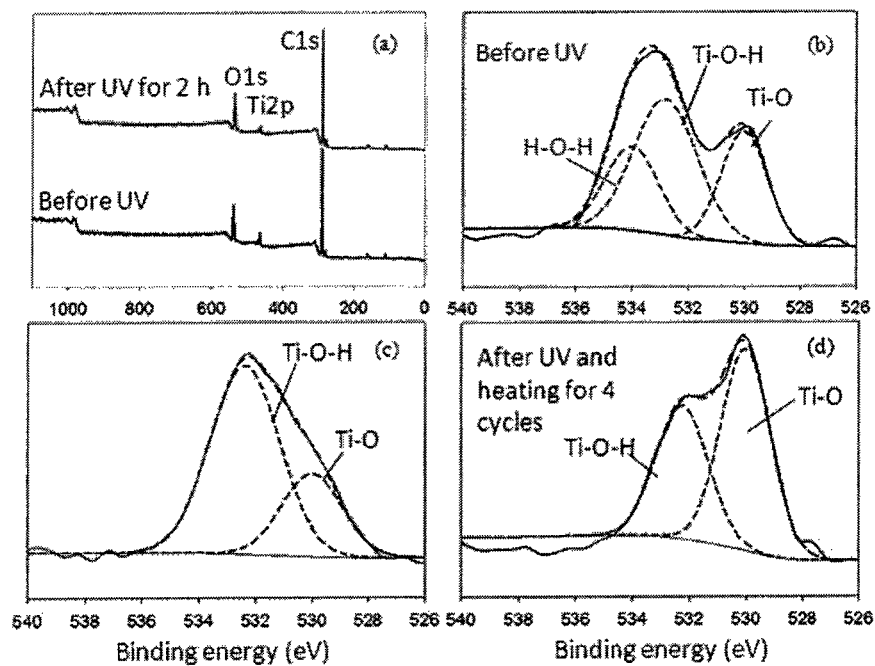

In order to enhance the wetting state under UV illumination, additional $TiO_2$ nano particles were coated onto the surface by dip-coating using a methanol solution containing 2.5% nano $TiO_2$ particles. The surface was immersed 5 times followed by drying in room temperature for about 2 minutes after each immersion. After this treatment, a slight decreased of the contact angle from 158° to 156° was observed on the as-prepared surface (FIG. 28, panels a and c). After UV illumination on this surface, the contact angle decreased to 75°. The superhydrophobicity could be restored by heating at 105° C. for 1.5 h. The reversible wetting properties are due to the reversible hydrolysis of the $TiO_2$ particle surface as shown by XPS results in FIG. 29. The hydrolyzed surface is more hydrophilic whereas the surface becomes dehydrated, and more hydrophobic, after baking in an oven at 105° C.

Example 2

Hybrid Superhydrophobic Polymer Composite Materials with Enhanced Photocatalytic Properties for Self-Cleaning and Water Droplet Purification A hybrid photocatalytic-superhydrophobic surface was fabricated using Method 1 described above. An industrial ultra-high molecular weight polyethylene (UHMW PE) from McMaster-Carr with a thickness of 0.8 mm and a melt point of about 130° C. was used. $SiO_2$ nanoparticles (Cabot TS-530) with an average agglomerate particle size of 200-300 nm were dispersed in a mix solution of 70% methanol and 30% water, and the concentration of the $SiO_2$ was adjusted to be about 5%. The concentration of $SiO_2$ particles was 5%. $TiO_2$ nanoparticles (Evonik, P90) with an average diameter of about 14 nm was used as photocatalyst. A steel mesh with a pore size of 309 micrometer and a wire diameter of 114 micrometer was coated with the silica particle dispersion. The silica particles were coated onto the UHMWPE sheet using a Doctor Blade with a gap of 0.006" and dried at 60° C. for 10 min. After assembly of the stack-up, lamination was performed at 200° C. and 800 psi for 120 min. After lamination, excess silica particles were removed and the UHMWPE nanocomposite (with embedded mesh still in place) was laminated against a layer of $TiO_2$ nanoparticles to fabricate a superhydrophobic surface with isolated photocatalyst regions. The $TiO_2$ layer was made by Doctor Blade and the thickness was controlled to be 200 micrometers. The assembly was laminated again at 200° C. and 800 psi for 120 min. The sample was cooled to room temperature under pressure, and the mesh was peeled off to expose the fabricated surface.

Figure 30:
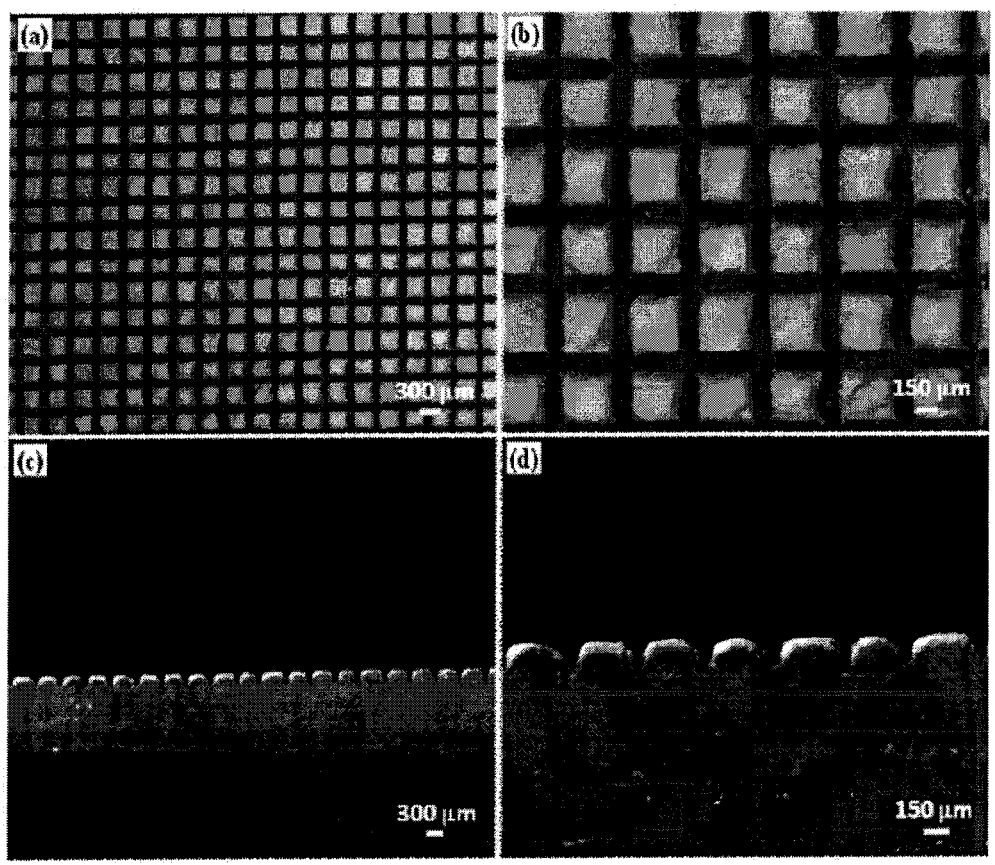
FIG. 30 are micrographs of an exemplary fabricated surface.

Micrographs of the fabricated surface are shown in FIG. 30. It can be seen that the mesh template was embossed into the polymer surface creating a negative image of the wire mesh. In this case, the mesh template was used for embossing (creating the primary roughness). During the embossing step, the polymer infiltrated into pores between nanoparticles causing the nanoparticles to adhere to the polymer, both along the groove surfaces as well as the raised areas formed in the pores of the mesh (isolated regions between the grooves). This process created a secondary, fine-pitch roughness.

In the second lamination step, the polymer could infiltrate into the pores between $TiO_2$ nanoparticles, but only in the raised regions (i.e. the pores in the wire mesh) forming isolated photocatalyst regions. The embedded mesh acts as a mask, preventing $TiO_2$ particles from adhering into the grooved regions. During lamination, the polymer adheres strongly to the nanoparticles at the surface. The $SiO_2$ particles present in the raised regions from the $1^{st}$ lamination step, remain, but may become more deeply embedded below the surface. After the second lamination step the mesh is removed to produce the final surface.

Figure 31:
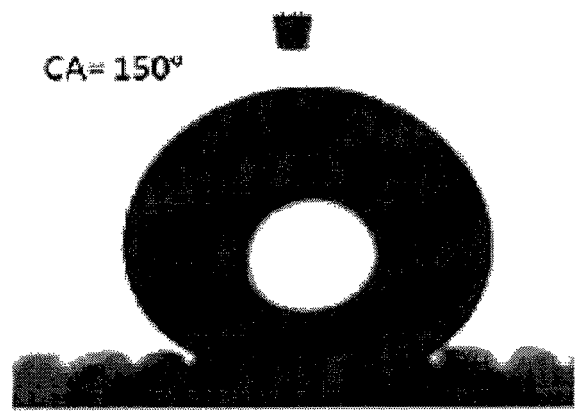

The $TiO_2$ regions are clearly visible and appear white in FIG. 30. The water contact angle of this surface is shown in FIG. 31. The white points under the water droplet demonstrate that air is trapped under the water droplets, thus the water droplets are maintained in Cassie state. The superhydrophobic groove is helpful for preventing the transition from Cassie state to Wenzel state. This transition would cause the droplet to adhere to the surface and form a static boundary layer of fluid. Thus the water droplet is movable on such a superhydrophobic surface even though the droplet can wet the catalytic region. Varying the dimensions of the mesh will change the relative area fraction of $SiO_2$ superhydrophobic grooves to raised $TiO_2$ hydrophilic-photocatalytic regions. A larger area fraction of $TiO_2$ regions will increase overall catalytic activity, but decrease drop mobility.

The ability of the fabricated surface to photooxidize organic contaminants in water was tested using an aqueous solution of Rhodamine B dye. Dyes are recognized as industrial pollutants that are especially difficult to remove using conventional wastewater treatment technologies due to their low molecular weight and high water solubility. In addition, the photooxidation of dyes is straightforward to measure using UV-visible spectroscopy. The UV-Vis spectra of 1.5 mL droplets of dye solution were measured as a function of surface composition, UV exposure time and droplet motion as shown in the UV spectra. For all experiments, a droplet (1.5 mL) of a Rhodamine B solution (13 mg/L Rh B) was used as the probe fluid and exposed to a broad spectrum UV light source (Dymax Bluewave 200 lamp connected via a 5 mm diameter liquid waveguide). The surface was irradiated with a total power of 50 mw per square cm. On a superhydrophobic surface composed of only $SiO_2$ (no $TiO_2$ particles) a droplet of dye solution exhibits no significant degradation after 2 hours. However, when the dye containing droplet was placed on a hybrid superhydrophobic surface composed of $TiO_2$ particles as prepared by Method 1 and described above, the dye molecules are mostly decomposed in 3 hours as shown in the UV spectra. In this case the droplet remained in the same position throughout the UV exposure. This demonstrates that the as-prepared catalytic superhydrophobic surface exhibits significant catalytic activity. This type of surface would be useful for many water purification applications and is unique in its ability to immobilize commercially available $TiO_2$ particles on a surface while maintaining their catalytic activity.

Figure 32:
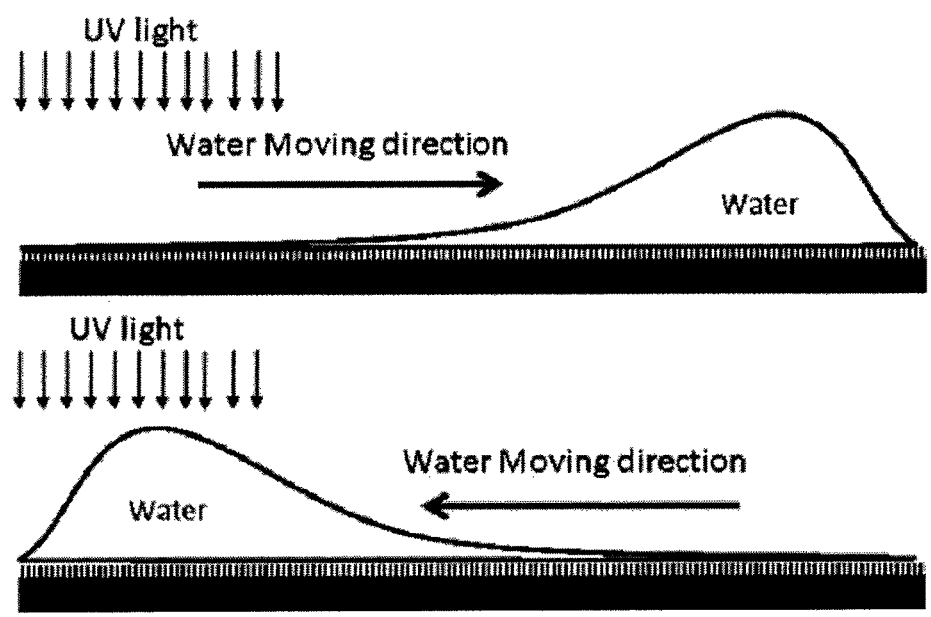
FIG. 32 depicts water movement on an exemplary surface.

To further increase the photooxidation rate, the droplet was made to move back and forth under UV illumination by mounting the substrate onto the table of a Taber Reciprocating abraser machine. As the table moved back and forth, the droplet moved back and forth across the surface while the light source remained fixed. Walls of a superhydrophobic material where placed around the substrate to allow the drop to bounce off the walls at the end of each cycle without adhering to them. Because the drop became pinned in the $TiO_2$ catalyst regions, the drop did not completely roll freely across the surface, but moved in an oscillatory fashion as shown in FIG. 32. Similar to rolling along a superhydrophobic surface, this technique allowed the drop to leave behind a thin layer of solution that could be rapidly photooxidized. In no case did the dye containing solution wet into the $SiO_2$ grooves. These regions remained superhydrophobic throughout the experiment. We anticipate that by adjusting the relative areas of raised $TiO_2$ to grooved $SiO_2$ regions, higher drop mobility can be achieved.

Figure 33:
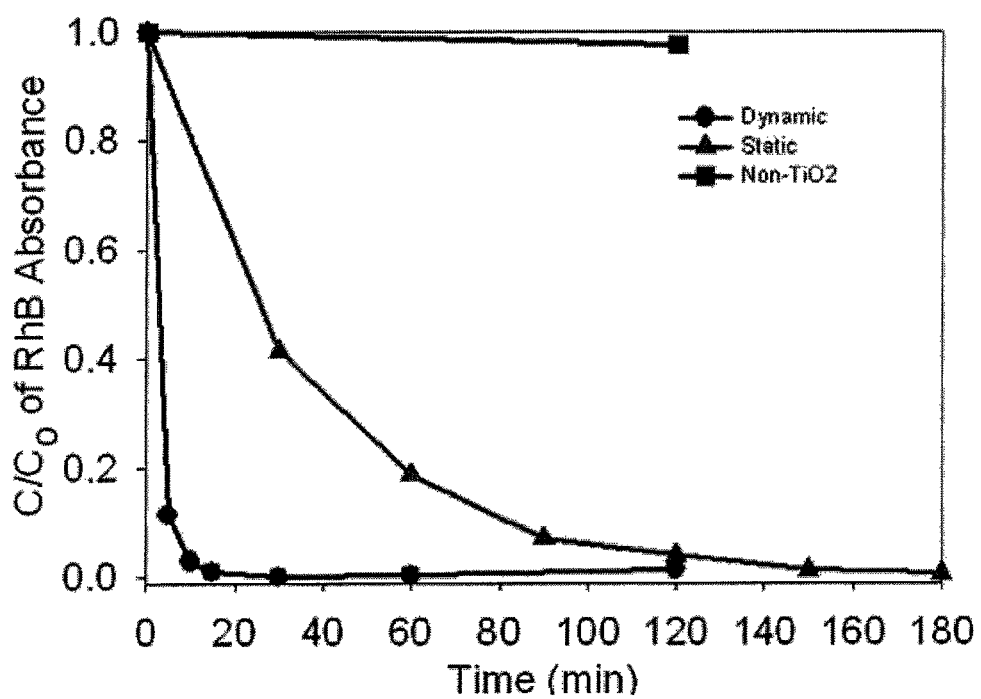
FIG. 33 is a graph comparing photoxidation rates.

In this arrangement, the degradation efficiency of the surface was dramatically improved. The dye was completely photooxidized after 0.5 hours, less than one-sixth the time required to photooxidize the dye in a static drop. Photooxidation rates for the three cases are compared in FIG. 33. These results clearly demonstrate the advantage of the disclosed hybrid superhydrophobic-photocatalytic surface technology. It is interesting to note that the drop was illuminated for only about half the time in the dynamic experiment as compared to the static drop experiment. Although the exposure time was reduced by 50%, the degradation rate was significantly enhanced.

Example 3

Photocatalytic Polymer Composite Materials for Waste Water Purification and Drinking Water Disinfection This example is intended to illustrate how such a material could be used for the photo-oxidation of an organic dye for water purification.

An industrial ultra-high molecular weight polyethylene (UHMW PE) from McMaster-Carr with a thickness of 0.02 inch and a melt point of about 130° C., a layer of $TiO_2$ nanoparticles (P90, from Evonik) with a thickness of about 14 nm and two smooth caul plate are assembled and laminated at 500 psi, 310 F for 30 min using the lamination process described in our previous invention (FIG. 2, Lyons, A. M. and Xu, Q. F. Polymers Having Superhydrophobic Surface, 27541-0062WO1, filing date Feb. 28, 2012). After lamination, excess $TiO_2$ nanoparticles were removed by rinsing with tap water and blow the surface dry with compressed air. No mesh was used to create large scale roughness.

Figure 34A:
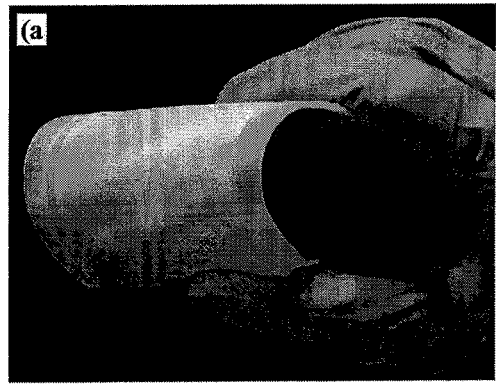
FIGS. 34A, 34B and 34C illustrate macro structures and microstructures of a fabricated surface.
Figure 34B:
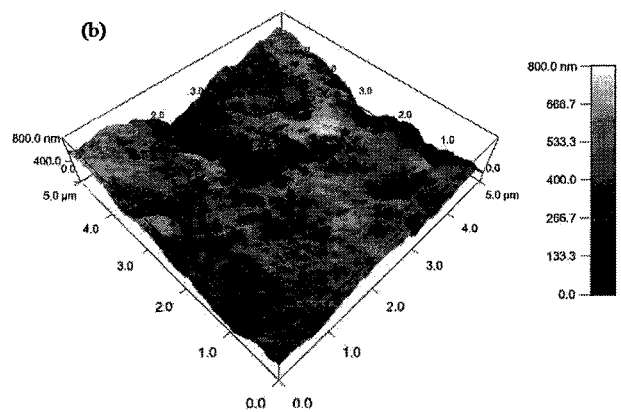
Figure 34C:
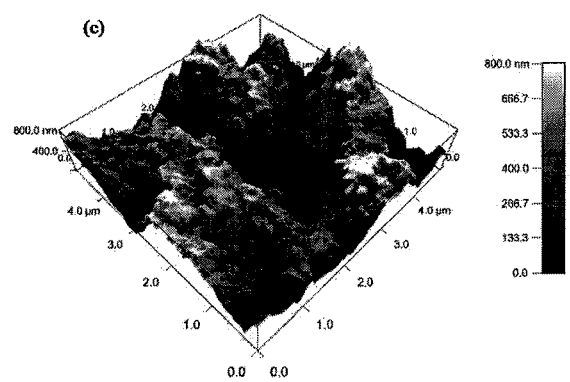

An optical image and AFM images showing the three-dimensional Micrographs of the fabricated surface are shown in FIG. 34A-34C. From FIG. 34A, it can be seen that the film is highly flexible and the fabricated polymer-$TiO_2$ nano composite film can be bent or rolled without damage. The flexibility of this robust film makes it suitable for constructing portable photocatalytic reactors, such as a photocatalytic plastic bag.

The 3D microstructures of the as-prepared surface and the interface between the $TiO_2$ particles and the polymer substrate have been imaged using AFM using a high resolution Z (height) mode as shown in FIG. 34B and FIG. 34C. The top layer of the as-prepared surface is shown in FIG. 34B. A micron-scale waviness to the surface can be seen, along with a fine scale, sub-micron roughness from the particles. After etching the $TiO_2$ particles using 49% HF acid for 24 h. the structure of the underlying polymer interface is revealed as shown in the AFM image in FIG. 34C. From FIGS. 34B and 34C, it can be seen that the film possess a very rough hierarchal structure on the micron and nanometer scales. The $TiO_2$ nanoparticles are tightly bound to the surface and so form a stable polymer-$TiO_2$ nano composite film. Combining the high surface area of the nanoparticles with the hierarchical roughness of the polymer-nanoparticle surface creates an overall $TiO_2$ surface area which is significantly larger than the projected surface area of the substrate. This increased surface area is beneficial for achieving high photodegradation efficiency for both organic pollutants as well as pathogenic microorganisms. In addition, because the surface of the $TiO_2$ particles on the film is not contaminated or covered by any organic chains or groups, the activity of the immobilized particles is significantly greater than that found in conventional polymer-$TiO_2$ nanoparticle composites. Enhanced photodegradation efficiency and durability can be expected according to the hierarchical micro-nano structure.

The fabricated surface was superhydrophobic immediately after the fabrication process and the water contact angle was measured to be 155°. This was because during the hot lamination process, most of the hydroxyl groups on the $TiO_2$ nanoparticles were removed and the $TiO_2$ particles exhibited their intrinsic contact angle, which is larger than 70°. Combined with the hierarchical roughness of the polymer nanoparticles composite, the surface exhibited superhydrophobicity. After immersion in water for 24 h, the surface became superhydrophilic.

Figure 35:
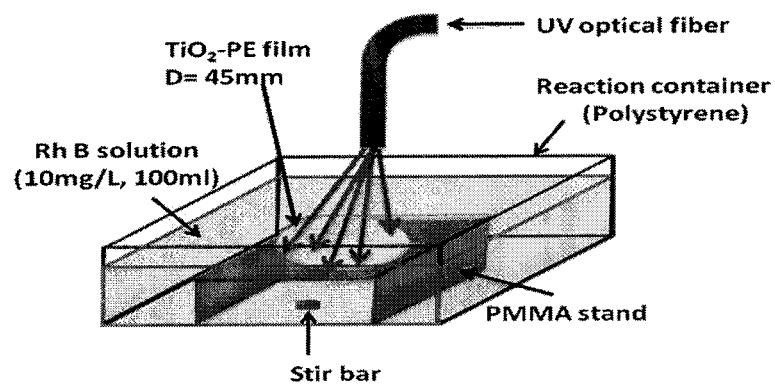
FIG. 35 is a depiction of an experimental setup for a photodegradation experiment.

The photodegradation evaluation experiment was conducted using a set-up as shown in FIG. 35. A solution of Rh B (100 mL) with a concentration of 10 mg per L was used to test the photodegradation efficiency of the $TiO_2$-polyethylene surface. The average power density of the UV light on the $TiO_2$-PE surface was measured to be 12 mW per square cm using a UV intensity meter (ACCU-CAL 50), and the area of the $TiO_2$-PE film was 16 square cm. A Perkin-Elmer UV-Vis spectrometer was used to analyze the degradation of the Rh B using the characteristic absorption peak at a wavelength of 554 nm. It can be seen from the photobleaching that most of the Rh B was decomposed by photocatalysis after 6 h of illumination under a UV source. According to this data, it is reasonable to deduce that when using a $TiO_2$-PE film with an area of 1 square m, more than 10 liters of water can be purified in 1 h under UV illumination at a moderate power density of 12 mW per square cm.

Example 4

Figure 36:
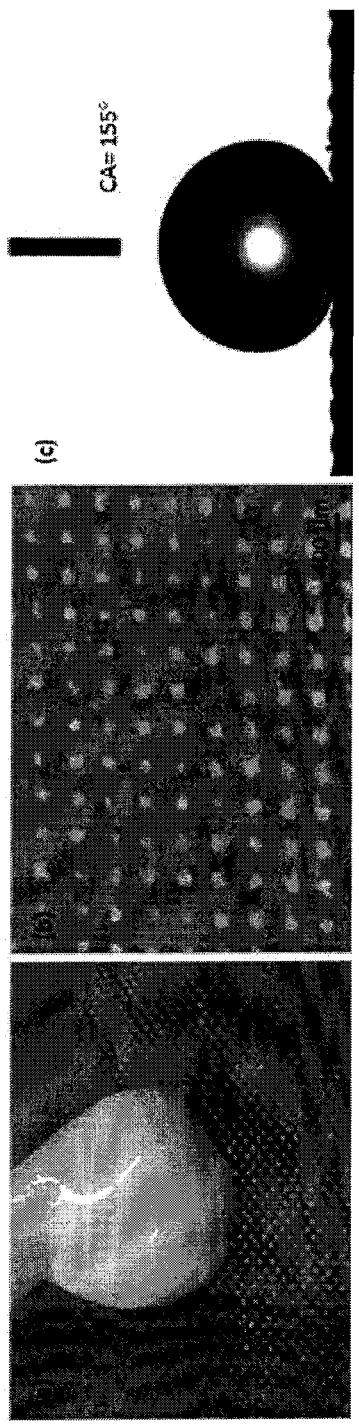
FIG. 36 provides three views of a surface exposed to water.

Hybrid Superhydrophobic Polymer Composite Material with Enhanced Photocatalytic Properties for Self-Cleaning and Water Droplet Purification An industrial ultra-high molecular weight polyethylene (UHMW PE) from McMaster-Carr with a thickness of 1/32 inch and a melt point of about 130° C. was used as polymer substrate. $SiO_2$ nanoparticles (Cabot TS-530) with an average agglomerate particle size of 200-300 nm were dispersed in a mix solution of 70% methanol and 30% water, and the concentration of the $SiO_2$ in the mixed solution was about 5%. The UHME PE sheet was coated with the $SiO_2$ solution using a Doctor Blade with a gap of 0.006". A steel mesh (60×60, from McMaster-Carr) was coated by wiping with the same 5% $SiO_2$ solution using a scraper. Both the treated polymer sheet and the mesh were dried in room temperature (25° C.) for 30 min. The coated polymer sheet and mesh, and the two smooth caul plates were then assembled and laminated at a pressure of about 200 psi and 310 F for 1 h. After the lamination, excess silica particles were removed and the UHMWPE nanocomposite was treated in an $O_2$ plasma reactor with the embedded micromesh used as a solid mask. For safety, the metal mesh should be connected to ground. Otherwise, fire could be generated. After the plasma treatment, the mesh was separated from the polymer and the superhydrophilic-superhydrophobic hybrid pattern was fabricated. The self-assembly of $TiO_2$ nanoparticles (P25, from Evonik) was conducted by moving water droplets containing 20% of $TiO_2$ nanoparticles along the surfaces. Small water droplets were deposited onto the superhydrophilic dots as shown in FIG. 36, panel a. After drying, the $TiO_2$ nanoparticles were self-assembled onto the surface forming photocatalytic regions. Then the deposited $TiO_2$ nanoparticles were laminated again at 40 psi and 310 F for 30 min. The structure of the photocatalytic-superhydrophobic materials after second lamination is shown in FIG. 36, panel b.

Since the coarse features of this sample are relatively large, 10 microliter water droplets were used to measure the water CA. As shown in FIG. 36 panel c, the water CA on this sample can reach 155°. Water droplets can be moved easily under the influence of a syringe tip. Moreover, the impingement test showed that the water droplets could bounce off the surface completely, no wetting was observed. These results indicate that the manufactured hybrid sample maintains good superhydrophobicity for self-cleaning, in spite of the localized hydrophilicity.

Figure 37:
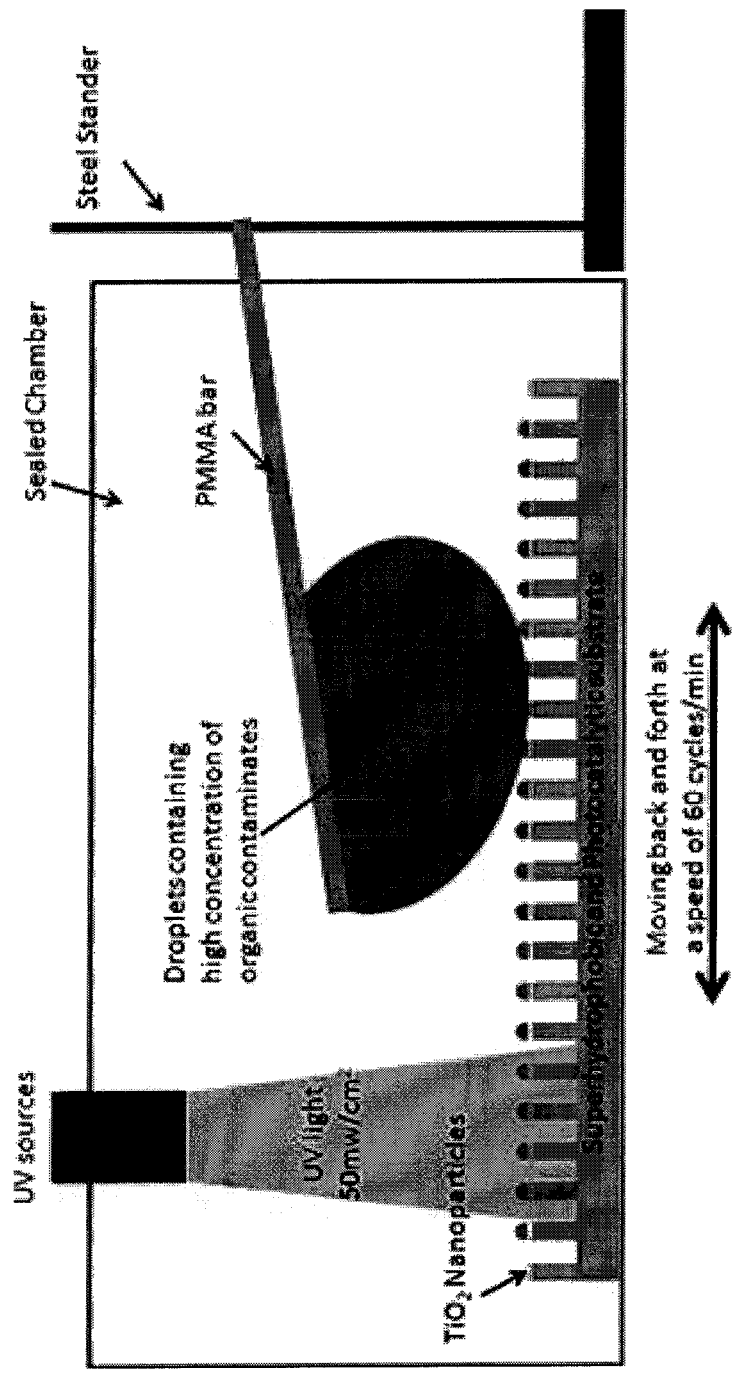
FIG. 37 is a depiction of an experimental setup for a water exposure experiment.

The photocatalytic activity of the surface was tested using a system as shown in FIG. 37. Water droplets (200 microliters) containing concentrated organic dye Rhodamine B (RhB, 100 mg per L) were used as a test contamination source. The droplet was kept in motion (60 Hz) under the UV light source to simulate a continuous stream of droplets (a UV transparent, hydrophilic PMMA bar was attached to a reciprocating table to drive the droplet). A mercury lamp was used as UV light source (300-450 nm with a peak at 365 nm), and the power density was set at 50 mW per square cm. The sample was fixed onto a chamber saturated with water vapor and sealed to minimize evaporation. Water droplets were collected and analyzed by UV-Vis spectroscopy. The concentration of RhB dramatically decreased with the illuminating time; more than 90% of RhB was photodecomposed after illuminating for 180 min (10800 cycles of back and forth). These results demonstrate a relatively higher photocatalytic activity as compared to droplets held in the same position. These tests also demonstrate a good stability of the manufactured hybrid materials.

Example 5

Optically Transparent Substrate

A transparent cyclic olefin polymer film with a melting point of 165° C. was used as the substrate. The thickness of the film was about 190 μm. Commercially available hydrophobic silica nanoparticles (AEROSIL, R202) were dispersed in methanol (1% by weight). According to the manufacturer, the average diameter of the silica particles is about 14 nm. The polymer substrate was dipped into this solution to create a thin coating and dried in air at room temperature for 5 min after each dip cycle. This process was repeated 3 times to increase the particle layer thickness. The lamination was then conducted at 175° C. for 30 mins under a pressure of 16.7 psi. The contact angle increased from 102° (prior to lamination) to 165° (subsequent to lamination), and the slip angle decreased from more than 90° to a value as low as about 1°. Compared to the original film (about 90% of visible light was transmitted), the transparency of the coated substrate decreased by approximately 3% after treatment, but still maintained higher than 87% at 500 nm.

Example 6

Optically Transparent Substrate

A transparent cyclic olefin polymer film with a melting point of 165° C. was used as the substrate. The thickness of the film was about 190 μm. Commercially available hydrophobic silica nanoparticles (AEROSIL, R202) were dispersed in ethanol to make a 2% solution by weight. The polymer substrate was dip-coated and dried in air at room temperature for 5 min after each dipping. This process was repeated 5 times. The lamination was then conducted at 185° C. for 30 minutes under a pressure of 42 psi. The contact angle of the fabricated film is as high as 168°, and the slip angle was as low as about 1°. The transparency of the coated substrate was as high as 87% at 500 nm.

The stability of the surface was tested using a recirculating water tunnel test. The fabricated film was mounted inside a square tube, and water was pumped through the tube at a flow rate of about 1 liter per second. Superhydrophobicity of the fabricated surfaces was maintained for about 5 h under this test condition. During the course of test, the optical transmittance of the material increased slightly.

Example 7

Fabric

A coating solution was first prepared by mixing 3% nanoparticles (TS530, Cabosil) with 24.25% distilled (DI) water and 72.75% ethanol (by weight). A 100×100 mesh made of stainless steel was used to make the coarse pattern. A nylon fabric, purchased from Spandex House INC. was used as substrate. Low density polyethylene (LDPE) film with a thickness of about 50 micrometers was used as polymer film to bond the nanoparticles as well as the fabrics. Both the stainless steel mesh and the LDPE film were spray-coated using a hand-held sprayer (Devilbiss, FLG-4) with the prepared nanoparticle dispersion; the thickness of the nanoparticle coating was about 50 micrometers. The coated mesh and polymer film were dried at room temperature. The coated LDPE film was placed onto the nylon fabric with the coated side facing the mesh. The stack-up was laminated using the developed roll system at 200° C. with a feeding speed of 1 mm/s.

The surfaces of the treated and untreated fabrics were observed using an optical stereo-zoom microscope (Nikon-SMZ 1500) and the results are shown in FIG. 38A-D. The woven fibers of the untreated fabric are very easily seen (FIG. 38A and FIG. 38B). After the lamination, the fibers become somewhat blurred (FIG. 38C FIG. 38D) using the same imaging conditions. This is due to light scattering caused by the rough structures formed by the polymer and nanoparticles that were bonded to the fabric during lamination. The fine nanostructures on the fabricated surface cannot be seen at such low magnification but have been observed by scanning electronic microscopy at higher magnifications (not shown).

During processing, the melted polymer is forced to flow into the pores between the fibers. However, when the polymer layer is thin (e.g. less than or equal to 50 micrometers) and mesh template is rough and porous, there is not sufficient polymer available to fully fill the pores of the fabric. Thus the treated fabric maintains porosity and good breathability. The pores could be completely sealed by using a thicker polymer film.

The untreated fabric is intrinsically hydrophilic, so a water droplet would spread and wet the fabric completely. After processing, the treated surface shows excellent superhydrophobicity. Water droplets exhibit a contact angle greater than 155° and a low slip angle less than 10° (using a 20 microliter water droplet). Superhydrophobicity and breathability could be concurrently achieved when a polymer film with a thickness of 50 micrometer was used.

Example 8

Housewrap Material

A layer of nanoparticles was spray-coated onto the polymer-coated side of the housewrap material as well as onto a 100×100 stainless steel mesh using the same coating solution and the same conditions as in Example 7. The coated housewrap film was laminated using the roll lamination system at 200° C. with a feeding speed of 1 mm/s.

The microstructures of the untreated and treated housewrap were examined with an optical microscope (Nikon-SMZ 1500) as shown in FIGS. 39A-D. It can be seen that the mesh pattern was partially transferred onto the surface of the housewrap after the lamination process. The mesh patterning obscures the fibrous structure of the substrate in these images, however the fibers are not significantly affected by the processing. One advantage of using this type of coated non-woven housewrap material is that the polymer coating can be processed at a temperature sufficiently low that the polymer fibers in the non-woven substrate are not significantly affected. During roll lamination processing, the heat and pressure cause the coating to flow. Polymer flow accomplishes two important tasks. First the polymer will flow into the pores between nanoparticles insuring good adhesion of the particles to the polymer coating surface. Second the polymer coating material will flow into the pores of the mesh, creating a course scale roughness similar to the mesh structure. A 100 mesh template would have about 100 wires/inch that measure about 120 microns in diameter and have pores that measure about 150 microns square. Thus the polymer coating material would create posts that measure about 150 microns on a side with 120 wide channels between them. These posts create a second layer of roughness (course roughness) in addition to the fine roughness created by the nanoparticles (about 20 nm in diameter) and nanoparticle agglomerates (about 100-200 nm in diameter). The coarse rough structures provide the surface with significant abrasion resistance (e.g. high robustness) as they prevent contact with the nanoparticle surfaces formed along the channels embossed by the wires.

The untreated fabric is intrinsically hydrophobic. After processing, the untreated surface remains hydrophobic whereas the treated surface shows excellent superhydrophobicity and abrasion resistance. Water droplets bead up on the surface and exhibit a contact angle >165° and a low slip angle less than 5° (using a 20 microliters water droplet). In addition, the breathability of the housewrap materials was maintained.

Example 9

House Wrap Material

The housewrap from CertainTeed, described in Example 8, is manufactured with a thin polymer layer coated onto a non-woven polypropylene fabric substrate. In Example 8, this coating was used as the thermally deformable polymer layer for both particle adhesion and flow into the pores of the mesh template. However, the polymer coating in Example 8 is not unique. Any polymer film with a melting point lower than the melting point of the fibers used to form the substrate can be used. As such, any fabric made from non-woven (or woven) polypropylene fibers can be used as a substrate to fabricate a breathable superhydrophobic fabric.

To demonstrate the use of an uncoated, non-woven polymer fiber fabric, the back (uncoated) surface of the CertainTeed housewrap was used as the substrate and a thin layer of low density polyethylene (LDPE) was used as the thermally deformable polymer layer. A coating of nanoparticles was spray-coated onto the LDPE film (50 micrometer thick) and the 100×100 stainless steel mesh using the same coating conditions and the same drying process as described in Example 7 and Example 8. The coated LDPE film was placed on the uncoated fiber-side of the housewrap material with the nanoparticle coating facing the mesh. The stack-up was then laminated using the roll laminator at 200° C. with a feeding speed of 1 mm/s.

The microstructures of the untreated and treated non-woven polymer fiber fabric were examined by optical microscopy (Nikon-SMZ 1500) as shown in FIGS. 40A-D. The mesh pattern was partially transferred onto the surface. The nanoparticles and the LDPE film adhere to the nonwoven mesh strongly after processing.

The non-woven fabric was made from polypropylene which is intrinsically hydrophobic. After the treatment, the surface shows an excellent superhydrophobicity and abrasion resistance. Water droplets bead up showing a contact angle greater than 165° and a low slip angle of less than 5° (using a 20 microliter water droplet). In addition, the breathability of the housewrap materials was also maintained.

Similar to Example 8, this approach creates a fabric with one surface that is superhydrophobic and the opposite surface that is hydrophobic.

Example 10

A nonwoven fabric (100% polypropylene, 1 oz/square yard, about 200 micrometer thickness) from Hanes Companies Inc. was used as the substrate and a thin film (about 0.050 mm thick) of low density polyethylene (LDPE) was used as the thermally deformable polymer layer. A coating of nanoparticles was spray-coated onto the LDPE film (50 micrometer thick) and the 100×100 stainless steel mesh using the same coating conditions and the same drying process as described in Example 7, Example 8 and Example 9. The coated LDPE film was placed on the nonwoven fabric material with the nanoparticle coating facing the mesh. The stack-up was then laminated using the roll laminator at 200° C. with a feeding speed of 1 mm/s.

The microstructures of the untreated and treated nonwoven polypropylene fabric were examined by optical microscopy (Nikon-SMZ 1500) as shown in FIG. 41A-D. The untreated fabric (FIG. 41A, FIG. 41B) is composed of a central layer and two exterior layers of non-woven fabric. The exterior layers are composed of disordered fibers with parallelogram-shaped openings with a size of 500×1000 micrometers arranged in a hexagonal close packed (hcp) style. These holes are blind holes (terminating at the central, continuous layer) with a depth of about 80 micrometers. After the lamination surface treatment, the mesh pattern was fully transferred into the nanoparticle/LDPE which adhered onto the top surface of the non-woven fabric. Micro posts with a width of 150 micrometers were created on the top surface of the non-woven fabric in a square array conforming to the 100×100 mesh. The nanoparticle/LDPE polymer flowed into the blind holes during lamination and bonded strongly to the bottom surface of the holes after cooling. Because the bottom of the holes was lower than the top surface, the mesh pattern could only be partially transferred onto the nanoparticle/LDPE surface in the hole regions. Finer hierarchical structure as described in Example 7, were formed onto the posts (fully and partially transferred) and the grooves between them. The nanoparticles and the LDPE film adhere to the nonwoven fabric strongly after processing.

Using this type of non-woven polypropylene substrate, a superhydrophobic fabric with excellent mechanical robustness and abrasion resistance can be prepared. This is due, in part, to an additional level of hierarchical roughness. Because of the blind holes in the fabric, there are essentially 5 levels of hierarchical structures, including: (a) large holes in the fabric (500-1000 μm); (b) posts made by template-lamination (150 μm), (c) micro fibers of the fabric (20 μm), (d) micro bumps formed by polymer percolative penetration (1-10 μm) and (e) nano particles and their agglomerates (20-200 nm).

The non-woven fabric was made from polypropylene which is intrinsically hydrophobic. After the treatment, the surface shows excellent superhydrophobicity and abrasion resistance. Water droplets bead up showing a contact angle >165° and a low slip angle of <5° (using a 20 μL water droplet).

Similar to Example 8 and Example 9 this approach creates a fabric with one surface that is superhydrophobic and the opposite surface that is hydrophobic. Fabrics that exhibit high or low porosity to water vapor, can be made by this technique, depending upon the thickness and continuity of the LDPE film. Because of the high flexibility of the non-woven polypropylene substrate, a superhydrophobic fabric with especially good drape and flexibility can be prepared using this technique.

Example 11

Molding Process

Figures 41A, 41B, 41C, 41D:
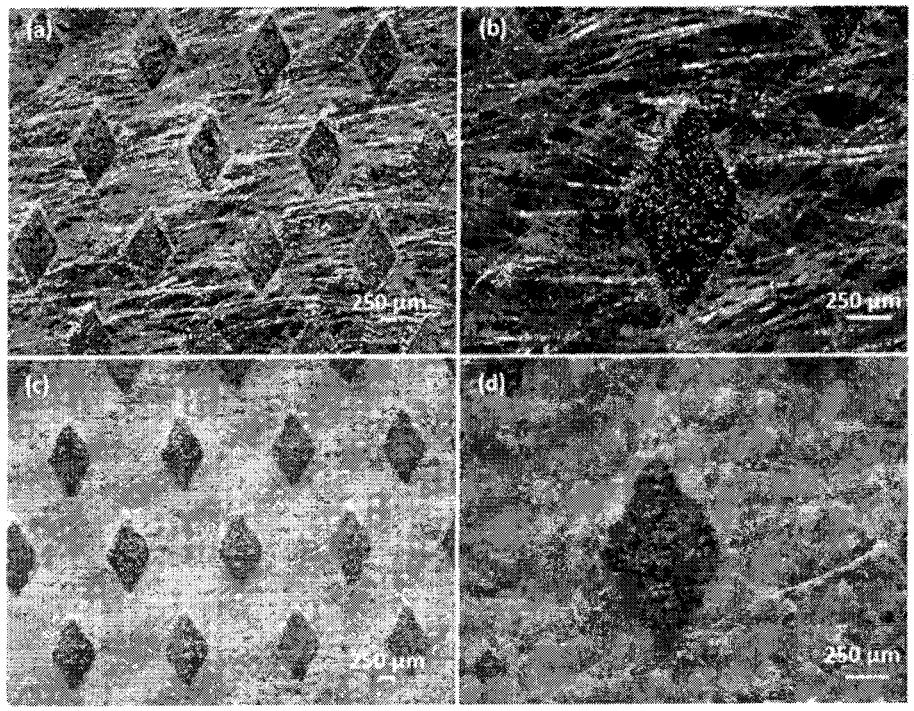
FIGS. 41A-D are microstructures of the untreated (41A, 41B) and treated (41C, 41D) nonwoven fabric materials.
Figure 42A:
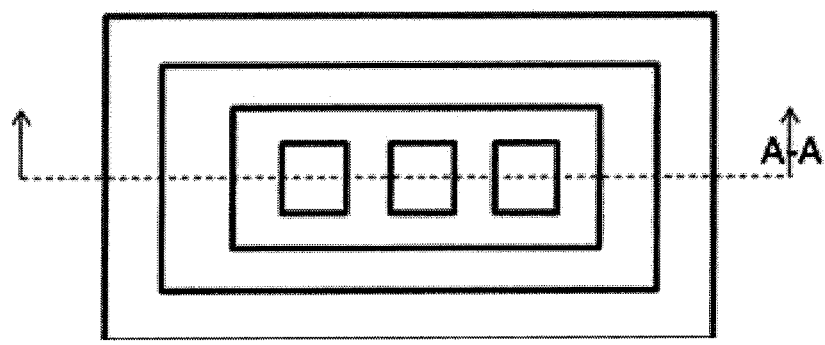
Figure 42B:
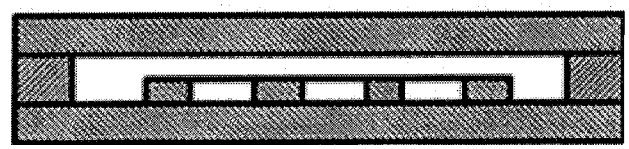
FIG. 42B is a cross section of the mold along line A-A'.

Raw rubber sheet from Goodyear was used. A stainless steel mold was used to form the component. The structure of the mold is shown in FIG. 41A and FIG. 42B. FIG. 42A is a top view of the mold while FIG. 42B is a cross section of the mold along line A-A'.

Figure 43:
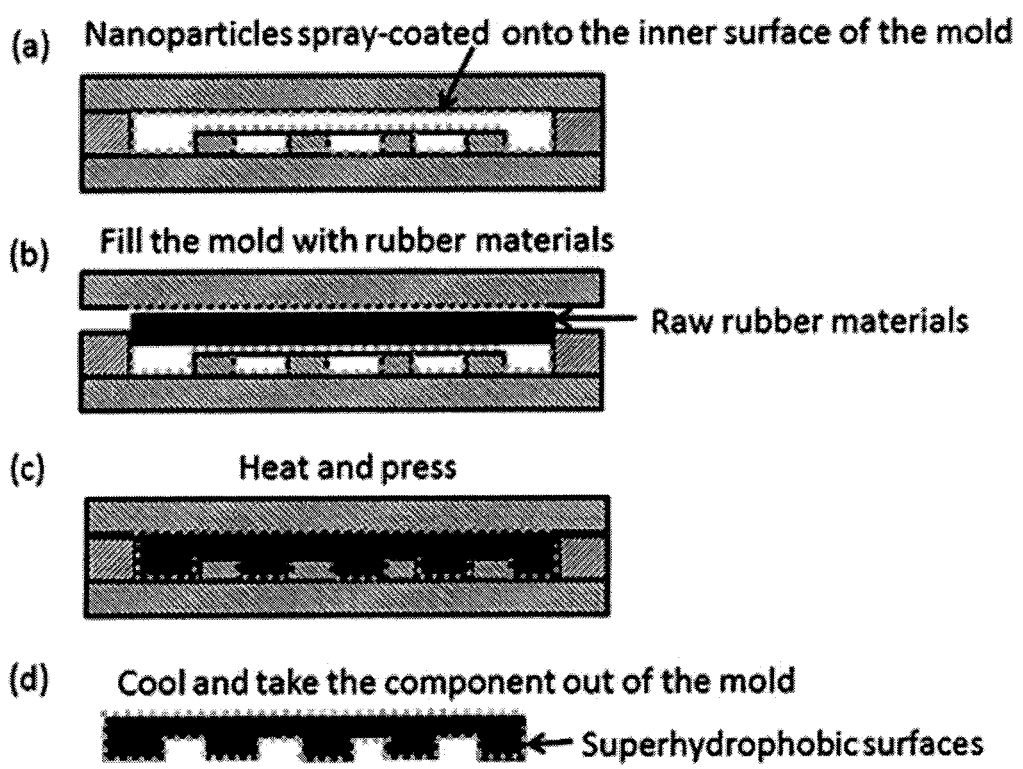
FIG. 43 is a schematic depiction of a molding process.

In the first step, a nanoparticle dispersion was spray-coated onto the inner surfaces of the mold to form a coating about 100 micrometers thick after drying as shown schematically in FIG. 43. The raw rubber sheet was cut to fit the mold. The stack up was then heated to 160° C. and cured for 50 min under a pressure of about 13 psi. After cooling to room temperature, the rubber component was taken out of the mold. All surfaces of the molded article were superhydrophobic.

The molded rubber article exhibits superhydrophobic surfaces because of the low surface energy of the surface as well as the hierarchy of rough surface features. The hierarchical structures on the surface of the component are shown in FIG. 44A-D. As shown in FIGS. 44A-D, the first coarse level structures are composed of bumps ranging from 50 to 300 μm. The second level structures, ranging from 5 to 50 μm, are formed either on the coarse bump or in the grooves between the coarse bumps. These relatively large scale roughness values can be formed either by the polymer itself during the molding process, or by texturing the surface of the mold. Thus the scale of these features depends upon the materials and process and/or the pattern of the mold surface.

The third level of hierarchical structures, ranging in size from 0.1 to 5 μm, are formed by the polymer percolating through pores between particles. The fourth level of roughness depends upon the particles themselves. In this example, the particles are 20 nm in size and form agglomerates that are 100-300 nm in size.

Water contact angle on the obtained surface was higher than 165° and the slip angle of droplets with a volume of 10 μL was less than 5°.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. A flexible article comprising:
   a flexible fabric comprising a first side and a second side, opposite the first side;
   a polymer laminated to the first side of the flexible fabric, the polymer comprising a first surface and a second surface, wherein the first side of the flexible fabric is contiguous with the second surface of the polymer; and
   a plurality of nanoparticles partially embedded and partially exposed on the first surface, wherein the polymer has extruded between agglomerates formed by the nanoparticles to provide a plurality of polymer filaments ranging in length from about 1 microns to about 100 microns and in diameter from 20 nm to 500 nm, to provide a superhydrophobic surface, the nanoparticles having an average diameter of less than 100 nm.

2. The flexible fabric as recited in claim 1, wherein the polymer is unperforated such that the flexible fabric resists vapor permeation.

3. The flexible fabric as recited in claim 1, wherein the polymer comprises pores such that the flexible fabric permits vapor permeation while maintaining the superhydrophobic surface.

4. The flexible article as recited in claim 1, wherein the superhydrophobic surface is comprised of multi-level hierarchical structures formed by the nanoparticles partially embedded into the polymer filaments emanating from the polymer where the multi-level hierarchical structures range in size from 20 nanometers to 100 microns.

5. The flexible article as recited in claim 4, where the multi-level hierarchical structures comprise nanoparticle agglomerates formed by the nanoparticles and the nanoparticle agglomerates range in size from 20 to 200 nm.

6. The flexible article as recited in claim 1, wherein the flexible fabric is polypropylene and the second side of the flexible fabric is coating-free.

7. The flexible article as recited in claim 1, further comprising a plurality of protrusions in the first surface of the polymer, the plurality of protrusions comprising top surfaces separated by grooves, wherein neighboring protrusions in the plurality of protrusions are separated by corresponding grooves of at least about 5 micrometers and less than about 500 micrometers.

8. The flexible article as recited in claim 7, wherein the grooves extend into the polymer to form pores in the polymer that permits vapor permeation through the flexible article while maintaining the superhydrophobic surface.

9. The flexible article as recited in claim 1, wherein the flexible fabric is selected from the group consisting of cotton, nylon, polyester, polyethylene, polypropylene and combinations thereof.

10. The flexible article as recited in claim 1, wherein the nanoparticles are silica nanoparticles that have been surface-treated with silane or polydimethylsiloxane (PDMS).

11. A flexible article comprising:
    a flexible fabric comprising a first side and a second side, opposite the first side;
    a first polymer laminated to the first side of the flexible fabric, the first polymer comprising a first surface and a second surface, wherein the first side of the flexible fabric is contiguous with the second surface of the first polymer;
    a plurality of nanoparticles partially embedded and partially exposed on the first surface, wherein the first polymer has extruded between agglomerates formed by the nanoparticles to provide a plurality of first polymer filaments ranging in length from about 1 microns to about 100 microns and in diameter from 20 nm to 500 nm, to provide a superhydrophobic surface, the nanoparticles having an average diameter of less than 100 nm; and
    a second polymer laminated on the second side of the flexible fabric.

12. The flexible article as recited in claim 11, wherein the second polymer has a composition substantially identical to the first polymer such that the second polymer is superhydrophobic.

13. The flexible fabric as recited in claim 11, wherein the first polymer and the second polymer are unperforated such that the flexible fabric resists vapor permeation.

14. The flexible article as recited in claim 11, wherein the first polymer and the second polymer each comprise respective pores that extend into the flexible fabric such that the flexible article permits vapor permeation while maintaining the superhydrophobic surface of the first polymer.

15. The flexible article as recited in claim 14, wherein the second polymer is a hydrophilic polymer, thereby providing the superhydrophobic surface on the first side and a hydrophilic surface on the second side while permitting vapor permeability through the flexible article.

16. The flexible article as recited in claim 11, further comprising a plurality of protrusions in the first surface of the first polymer, the plurality of protrusions comprising top surfaces separated by grooves.

17. The flexible article as recited in claim 16, wherein neighboring protrusions in the plurality of protrusions are separated by corresponding grooves of at least about 5 micrometers and less than about 500 micrometers.

18. The flexible article as recited in claim 17, wherein the grooves extend into the polymer to form pores in the polymer that permits vapor permeation through the flexible article while maintaining the superhydrophobic surface.

19. The flexible article as recited in claim 11, wherein the superhydrophobic surface is comprised of multi-level hierarchical structures formed by the nanoparticles partially embedded into the polymer filaments emanating from the polymer where the multi-level hierarchical structures range in size from 20 nanometers to 100 microns.

\* \* \* \* \*